(12) United States Patent
Conwell

(10) Patent No.: US 9,330,427 B2
(45) Date of Patent: May 3, 2016

(54) SMARTPHONE-BASED METHODS AND SYSTEMS

(71) Applicant: Digimarc Corporation, Beaverton, OR (US)

(72) Inventor: William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 63 days.

(21) Appl. No.: 14/157,108

(22) Filed: Jan. 16, 2014

(65) Prior Publication Data

US 2014/0320021 A1    Oct. 30, 2014

Related U.S. Application Data

(60) Division of application No. 13/299,140, filed on Nov. 17, 2011, now Pat. No. 8,819,172, which is a continuation-in-part of application No. PCT/US2011/059412, filed on Nov. 4, 2011, and a (Continued)

(51) Int. Cl.
*H04B 10/00*    (2013.01)
*G06T 1/00*    (2006.01)

(Continued)

(52) U.S. Cl.
CPC ............ *G06T 1/0021* (2013.01); *G06K 9/6217* (2013.01); *G06Q 30/0269* (2013.01); *G06T 1/0064* (2013.01); *H04M 1/0264* (2013.01);

(Continued)

(58) Field of Classification Search
CPC ............ H04B 10/116; H04B 10/1143; H04B 10/1149
See application file for complete search history.

(56) References Cited

U.S. PATENT DOCUMENTS 4,807,031 A    2/1989    Broughton et al.
6,259,476 B1    7/2001    Greene (Continued)

FOREIGN PATENT DOCUMENTS

WO    WO2012127439    9/2012
WO    WO02014083363    6/2014

OTHER PUBLICATIONS

Liu, Positioning Beacon System Using Digital Camera and LEDs, IEEE Trans. on Vehicular Technology, Vo. 52, No. 2, 2003.

(Continued)

*Primary Examiner* — Dzung Tran
(74) *Attorney, Agent, or Firm* — Digimarc Corporation

(57) ABSTRACT

Arrangements involving portable devices (e.g., smartphones and tablet computers) are disclosed. One arrangement enables a content creator to select software with which that creator's content should be rendered—assuring continuity between artistic intention and delivery. Another utilizes a device camera to identify nearby subjects, and take actions based thereon. Others rely on near field chip (RFID) identification of objects, or on identification of audio streams (e.g., music, voice). Some technologies concern improvements to the user interfaces associated with such devices. Others involve use of these devices in connection with shopping, text entry, sign language interpretation, and vision-based discovery. Still other improvements are architectural in nature, e.g., relating to evidence-based state machines, and blackboard systems. Yet other technologies concern use of linked data in portable devices—some of which exploit GPU capabilities. Still other technologies concern computational photography. A great variety of other features and arrangements are also detailed.

12 Claims, 23 Drawing Sheets

Related U.S. Application Data continuation-in-part of application No. 13/174,258, filed on Jun. 30, 2011, now Pat. No. 8,831,279, and a continuation-in-part of application No. 13/207,841, filed on Aug. 11, 2011, now Pat. No. 9,218,530, and a continuation-in-part of application No. 13/278,949, filed on Oct. 21, 2011, now Pat. No. 9,183,580.

(60) Provisional application No. 61/410,217, filed on Nov. 4, 2010, provisional application No. 61/449,529, filed on Mar. 4, 2011, provisional application No. 61/467,862, filed on Mar. 25, 2011, provisional application No. 61/471,651, filed on Apr. 4, 2011, provisional application No. 61/479,323, filed on Apr. 26, 2011, provisional application No. 61/483,555, filed on May 6, 2011, provisional application No. 61/485,888, filed on May 13, 2011, provisional application No. 61/501,602, filed on Jun. 27, 2011.

(51) Int. Cl.
| | |
|---|---|
| *H04W 4/00* | (2009.01) |
| *H04N 5/235* | (2006.01) |
| *H04W 8/22* | (2009.01) |
| *H05B 37/02* | (2006.01) |
| *G06Q 30/02* | (2012.01) |
| *G06K 9/62* | (2006.01) |
| *H04M 1/02* | (2006.01) |
| *H04W 4/18* | (2009.01) |

(52) U.S. Cl.
CPC .............. *H04N 5/235* (2013.01); *H04W 4/001* (2013.01); *H04W 8/22* (2013.01); *H05B 37/0218* (2013.01); *H05B 37/0236* (2013.01); *G06T 2201/0052* (2013.01); *H04W 4/008* (2013.01); *H04W 4/18* (2013.01)

(56) References Cited

U.S. PATENT DOCUMENTS

| | | |
|---|---|---|
| 6,590,996 B1 | 7/2003 | Reed et al. |
| 6,865,589 B2 | 3/2005 | Haitsma et al. |
| 7,223,956 B2 | 5/2007 | Yoshida |
| 7,996,678 B2 | 8/2011 | Kalker et al. |
| 8,150,255 B2 | 4/2012 | Tsai |
| 8,279,138 B1 | 10/2012 | Margulis |
| 8,334,898 B1 | 12/2012 | Ryan et al. |
| 2004/0091111 A1 | 5/2004 | Levy et al. |
| 2004/0250079 A1 | 12/2004 | Kalker |
| 2005/0132194 A1 | 6/2005 | Ward |
| 2006/0133647 A1 | 6/2006 | Werner et al. |
| 2007/0187505 A1 | 8/2007 | Rhoads et al. |
| 2009/0129782 A1 | 5/2009 | Pederson |
| 2009/0220070 A1 | 9/2009 | Picard et al. |
| 2010/0048242 A1* | 2/2010 | Rhoads et al. .............. 455/556.1 |
| 2010/0150434 A1 | 6/2010 | Reed |
| 2010/0171875 A1 | 7/2010 | Yamamoto |
| 2011/0058707 A1 | 3/2011 | Rhoads et al. |
| 2011/0069958 A1 | 3/2011 | Haas |
| 2011/0153201 A1 | 6/2011 | Park et al. |
| 2011/0161076 A1 | 6/2011 | Davis et al. |
| 2011/0202151 A1* | 8/2011 | Covaro et al. ................... 700/90 |
| 2011/0212717 A1 | 9/2011 | Rhoads et al. |
| 2011/0215736 A1 | 9/2011 | Horbst et al. |
| 2011/0277023 A1 | 11/2011 | Meylemans et al. |
| 2012/0044350 A1 | 2/2012 | Verfuerth |
| 2012/0281987 A1 | 11/2012 | Schenk |
| 2013/0013091 A1 | 1/2013 | Cavalcanti et al. |
| 2013/0016978 A1 | 1/2013 | Son et al. |
| 2013/0027576 A1 | 1/2013 | Ryan et al. |
| 2013/0028612 A1 | 1/2013 | Ryan et al. |
| 2013/0058390 A1 | 3/2013 | Haas |
| 2013/0089133 A1 | 4/2013 | Woo et al. |

OTHER PUBLICATIONS

Machine translation of JP2007295490 (JP2007295490 was published Nov. 8, 2007).

Pang et al, LED Location Beacon System Based on Processing of Digital Images, IEEE Trans. on Intelligent Transportation Systems, vol. 2, No. 3, 2001.

NXP brochure, "NXP GreenChip iCFL and GreenChip iSSL Smart Lighting Solutions," May 2011.

* cited by examiner

| CONTENT ID | CONTEXT1 | CONTEXT2 | SOFTWARE |
|---|---|---|---|
| 92FE76 | USA | OUTDOORS | SW 385BA |
| 92FE76 | USA | INDOORS | SW C83CB |
| 3B355A | DAYTIME | AGE 20-25 | SW FF245 AND SW 5345B<v=Pbd_iaGJEa8> |
| 850A33 | 97204 | MALE | SW 83431 OR SW 0993B OR SW 2884C OR SW 88FAF |
| 633CA1 | A4 processor | | CODEC 77DEA |
| 633CA1 | Atom processor | | CODEC 77DEC |

Middleware Architecture for Media and Physical Object Recognition

Digimarc Discover Implementation

Impact of Reading Image
Watermarks on System Tasks

Operational Envelope of Image
Watermark RA (iPhone 4, iOS 4.0,
320x480)

BOB HasChild TED

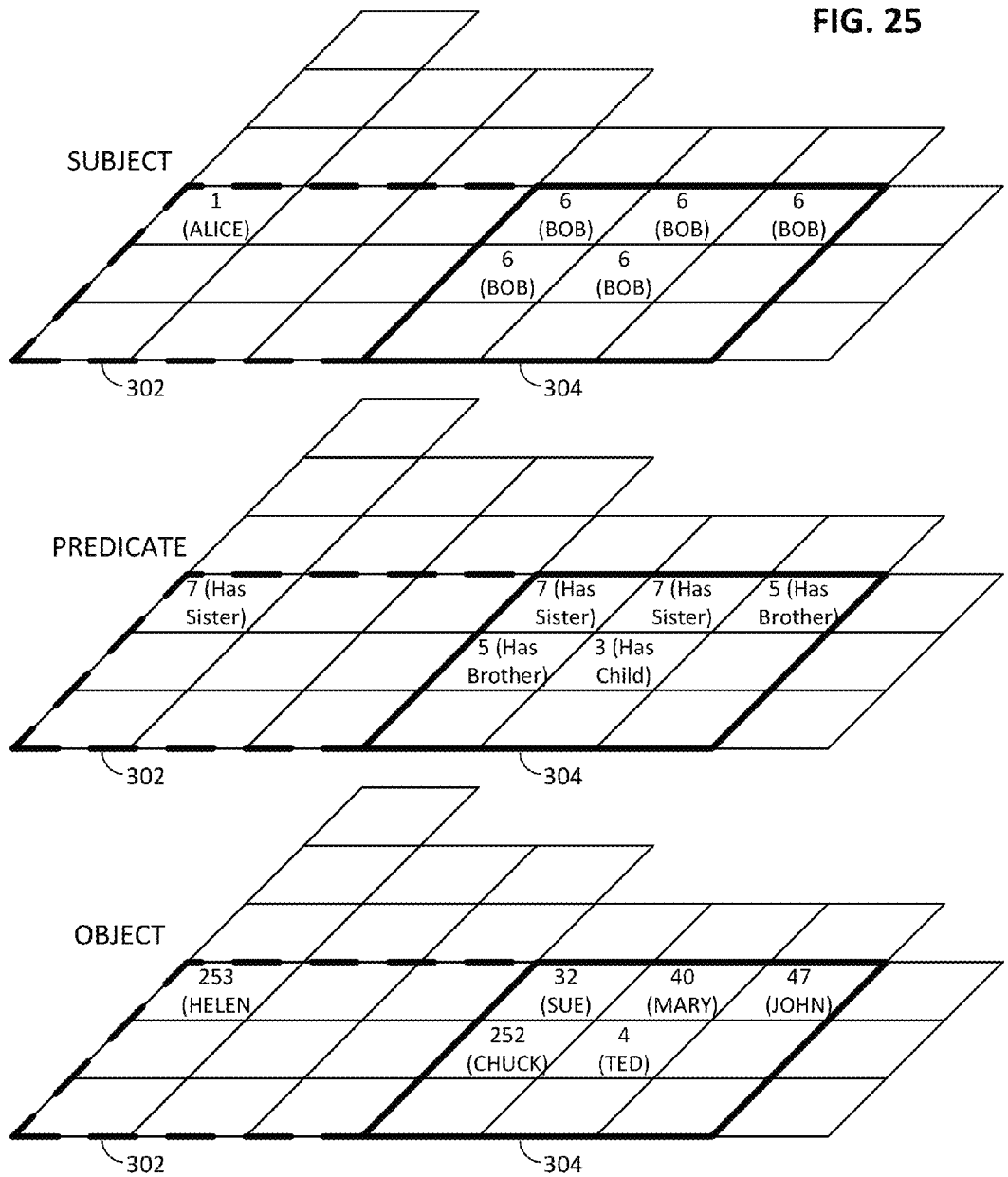

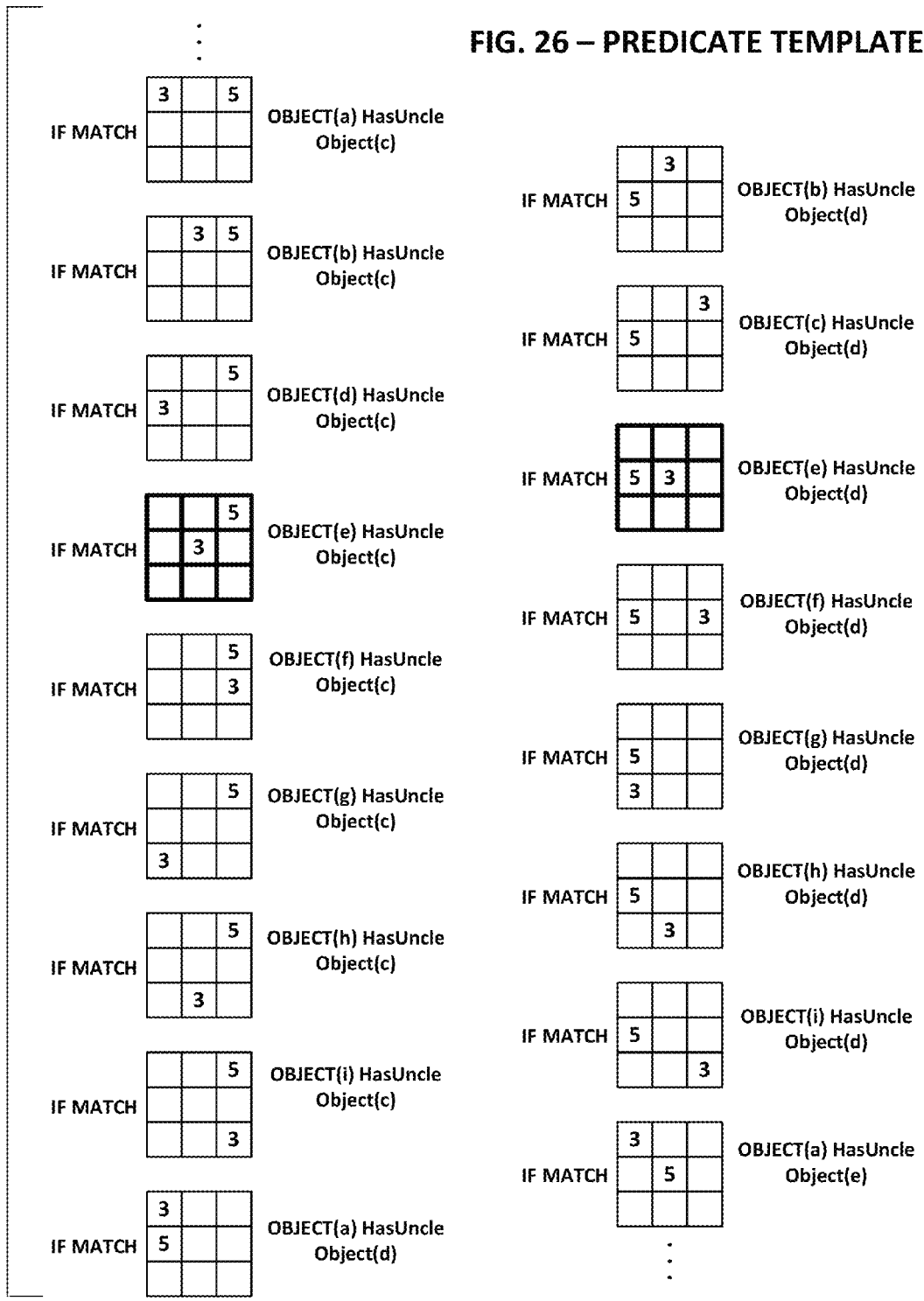
FIG. 26 – PREDICATE TEMPLATES

FIG. 28

| LEVEL 1 MENU TO DISPLAY | LEVEL 2 OPTIONS TO DISPLAY | SEARCH FOR PREDICATE NO: | SEARCH FOR OBJECT NO: |
|---|---|---|---|
| What are you looking for? | Car | 12 | 112 or 113 |
| What are you looking for? | Truck | 12 | 115 |
| What are you looking for? | Motorcycle | 12 | 111 |
| What are you looking for? | Other | 12 | 110 or 116 |
| What year? | 2011 | 13 | 188 |
| What year? | 2010 or newer | 13 | 188 or 189 |
| What year? | 2009 or newer | 13 | $188 \leq N \leq 190$ |
| ... | ... | ... | ... |
| What passenger capacity? | 1 | 2 | 2 |
| What passenger capacity? | 2 | 2 | 3 |
| What passenger capacity? | 3 | 2 | 4 |
| What passenger capacity? | 4 | 2 | 5 |
| What passenger capacity? | 5 | 2 | 6 |
| What passenger capacity? | 6 | 2 | 7 |
| ... | ... | ... | ... |

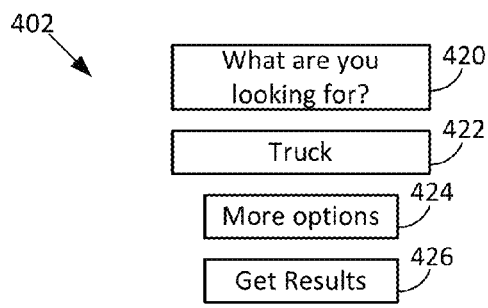

FIG. 29A

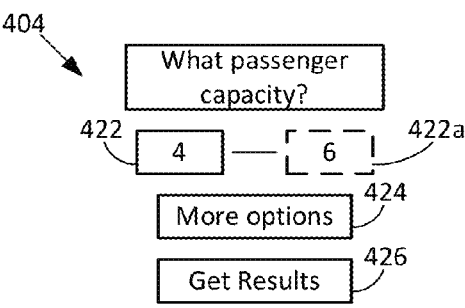

FIG. 29B

WATERMARK LOOK-UP TABLE

| WATERMARK ID: | MEMORY ADDRESS RANGE: |
|---|---|
| 223 | 1004-1012 |
| 224 | 1004-1016 |
| 225 | 1004-1023 |
| 226 | 1004-1027 |
| 227 | 1028-1050 |
| 228 | 1028-1054 |
| 229 | 1028-1064 |
| ... | ... |

SMARTPHONE-BASED METHODS AND SYSTEMS

RELATED APPLICATION DATA

This application is a division of application Ser. No. 13/299,140, filed Nov. 17, 2011, which is a continuation-in-part of international application PCT/US11/59412, filed Nov. 4, 2011 (published as WO2012061760), which claims priority to the following provisional applications:
 61/410,217, filed Nov. 4, 2010;
 61/449,529, filed Mar. 4, 2011;
 61/467,862, filed Mar. 25, 2011;
 61/471,651, filed Apr. 4, 2011;
 61/479,323, filed Apr. 26, 2011;
 61/483,555, filed May 6, 2011;
 61/485,888, filed May 13, 2011;
 61/501,602, filed Jun. 27, 2011;
and which also is a continuation-in-part of each of the following applications:
 Ser. No. 13/174,258, filed Jun. 30, 2011;
 Ser. No. 13/207,841, filed Aug. 11, 2011 (published as 20120116559); and
 Ser. No. 13/278,949, filed Oct. 21, 2011 (published as 20120134548).

The disclosures of these applications are incorporated herein by reference, in their entireties.

TECHNICAL FIELD

The present technology generally primarily concerns sensor-equipped consumer electronic devices, such as smartphones and tablet computers.

INTRODUCTION

The present specification details a diversity of technologies, assembled over an extended period of time, to serve a variety of different objectives. Yet they relate together in various ways, and often can be used in conjunction, and so are presented collectively in this single document.

This varied, interrelated subject matter does not lend itself to a straightforward presentation. Thus, the reader's indulgence is solicited as this narrative occasionally proceeds in nonlinear fashion among the assorted topics and technologies.

The detailed technology builds on work detailed in previous U.S. patent filings. These include applications:
 Ser. No. 13/149,334, filed May 31, 2011;
 Ser. No. 13/088,259, filed Apr. 15, 2011;
 Ser. No. 13/079,327, filed Apr. 4, 2011;
 Ser. No. 13/011,618, filed Jan. 21, 2011 (published as 20110212717);
 Ser. No. 12/797,503, filed Jun. 9, 2010 (published as 20110161076);
 Ser. No. 12/774,512, filed May 5, 2010 (published as 20110274310);
 Ser. No. 12/716,908, filed Mar. 3, 2010 (published as 20100228632);
 Ser. No. 12/490,980, filed Jun. 24, 2009 (published as 20100205628);
 Ser. No. 12/271,772, filed Nov. 14, 2008 (published as 20100119208);
 Ser. No. 11/620,999, filed Jan. 8, 2007 (published as 20070185840); U.S.
U.S. Pat. No. 7,003,731; and
U.S. Pat. No. 6,947,571.

In the few years since their introduction, portable computing devices (e.g., smartphones, music players, and tablet computers) have transitioned from novelties to near-necessities. With their widespread adoption has come an explosion in the number of software programs ("apps") available for such platforms. Over 300,000 apps are now available from the Apple iTunes store alone.

Many apps concern media content. Some are designed to provide on-demand playback of audio or video content, e.g., television shows. Others serve to complement media content, such as by enabling access to extra content (behind-the-scenes clips, cast biographies and interviews, contests, games, recipes, how-to videos), by allowing social network-based features (communicating with other fans, including by Twitter, Facebook and Foursquare, blogs), etc. In some instances a media-related app may operate in synchrony with the audio or video content, e.g., presenting content and links at time- or event-appropriate points during the content.

Apps are now being specialized to particular broadcast and recorded media content. The ABC television show My Generation, for example, was introduced with a companion iPad app dedicated exclusively to the program—providing polls, quizzes and other information in synchronized fashion. Traditional media companies, such as CNN, ESPN, CBS, etc., are increasingly becoming app companies as well.

It is difficult for apps to gain traction in this crowded marketplace. Searching iTunes, and other app stores, is the most common technique by which users find new apps for their devices. The next most popular technique for app discovery is through recommendations from friends. Both approaches, however, were established when the app market was much smaller, and have not scaled well.

In the case of the My Generation iPad app, for example, the show's producers must reach out to the target audience and entice them to go to the app store, where they must type in the title of the app, download it, install it, and then run it when the television program is playing.

In accordance with certain embodiments of the present technology, a different solution is provided. In one such embodiment, a microphone-equipped user device samples ambient content, and produces content-identifying data from the captured audio. This content-identifying data is then used to look-up an app recommended by the proprietor of the content, which app is then installed and launched—with little or no action required by the user.

By such arrangement, the content effectively selects the app. The user doesn't select the software; the user's activity selects the software. Over time, each user device becomes app-adapted to the content preferences of the user—thereby becoming optimized to the user's particular interests in the content world.

To some degree, this aspect of the present technology is akin to the recommendation features of TiVo, but for apps. The user's content consumption habits (and optionally those of the user's social network friends) lead the device to recommend apps that serve the user's interests.

Desirably, it is artists that are given the privilege of specifying the app(s) to be invoked by their creative works. Many countries have laws that recognize artists' continuing interest in the integrity with which their works are treated (so-called "moral rights"). Embodiments of the present technology serve this interest—providing artists a continuing role in how their art is presented, enabling them to prescribe the preferred mechanisms by which their works are to be experienced. Continuity is provided between the artist's intention and the art's delivery.

It is not just stand-alone apps that can be treated in this fashion. More granular software choices can similarly be made, such as the selection of particular rendering codecs to be used by media players (e.g., Windows Media Player). For example, the National Hockey League may prefer that its content be rendered with a codec designed for maximum frame rate. In contrast, the Food Network may prefer that its content be rendered with a codec optimized for truest color fidelity.

Historically, the "channel" was king, and content played a supporting role (i.e., drawing consumers to the channel, and to its advertising). From the consumer's standpoint, however, these roles should be reversed: content should be primary. Embodiments of the present technology are based on this premise. The user chooses the content, and the delivery mechanism then follows, as a consequence.

The foregoing and other features and advantages of the present technology will be more readily apparent from the following detailed description, which proceeds with reference to the accompanying drawings.

BRIEF DESCRIPTION OF THE DRAWINGS

FIG. 25 shows the memory of FIG. 23, now populated with illustrative RDF information detailing certain relationships among people.

FIG. 26 shows some of the templates that may be applied to the Predicate plane of the FIG. 25 memory, to perform semantic reasoning on the depicted RDF triples.

FIG. 27 names the nine RDF triples within a 3×3 pixel block of memory.

FIG. 28 shows a store of memory in a smartphone.

FIGS. 29A and 29B depict elements of a graphical user interface that uses data from the FIG. 28 memory.

FIG. 38 shows a watermark look-up table that can be used with the FIG. 37 arrangement.

DETAILED DESCRIPTION

The present technology, in some respects, expands on technology detailed in the assignee's above-detailed patent applications. The reader is presumed to be familiar with such previous work, which can be used in implementations of the present technology (and into which the present technology can be incorporated).

Figures 1, 2:
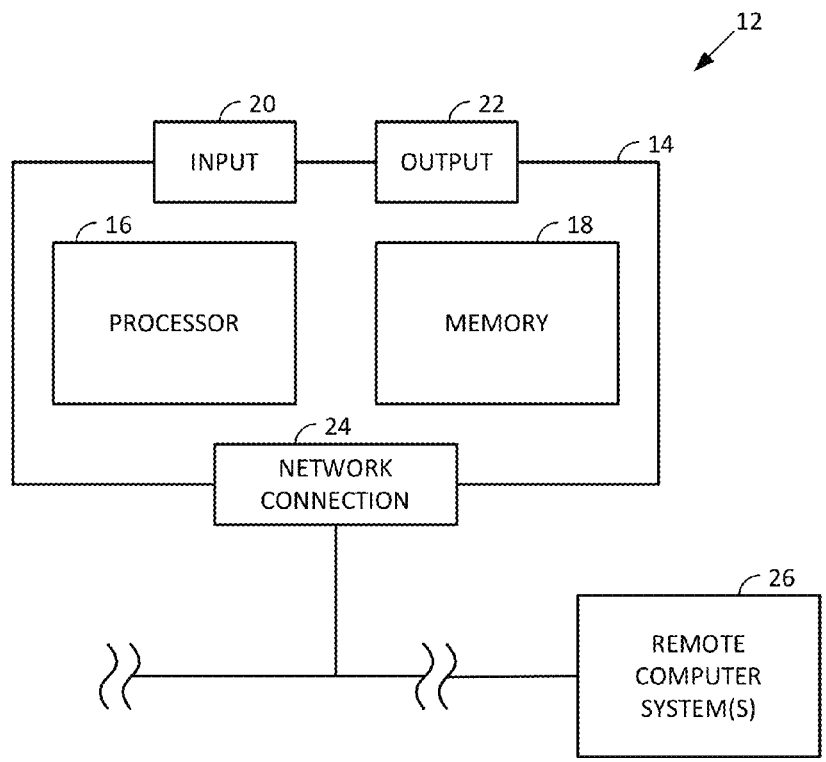
FIG. 1 is a block diagram of a system that can be used in certain embodiments of the present technology.
FIG. 2 is a representation of a data structure that can be used with the embodiment of FIG. 1.

Referring to FIG. 1, an illustrative system 12 includes a device 14 having a processor 16, a memory 18, one or more input peripherals 20, and one or more output peripherals 22. System 12 may also include a network connection 24, and one or more remote computers 26.

An illustrative device 14 is a smartphone or a tablet computer, although any other consumer electronic device can be used. The processor can comprise a microprocessor such as an Atom or A4 device. The processor's operation is controlled, in part, by information stored in the memory, such as operating system software, application software (e.g., "apps"), data, etc. The memory may comprise flash memory, a hard drive, etc.

The input peripherals 20 may include a camera and/or a microphone. The peripherals (or device 14 itself) may also comprise an interface system by which analog signals sampled by the camera/microphone are converted into digital data suitable for processing by the system. Other input peripherals can include a touch screen, keyboard, etc. The output peripherals 22 can include a display screen, speaker, etc.

The network connection 24 can be wired (e.g., Ethernet, etc.), wireless (WiFi, 4G, Bluetooth, etc.), or both.

In an exemplary operation, device 14 receives a set of digital content data, such as through a microphone 20 and interface, through the network connection 24, or otherwise. The content data may be of any type; audio is exemplary.

The system 12 processes the digital content data to generate corresponding identification data. This may be done, e.g., by applying a digital watermark decoding process, or a fingerprinting algorithm—desirably to data representing the sonic or visual information itself, rather than to so-called "out-of-band" data (e.g., file names, header data, etc.). The resulting identification data serves to distinguish the received content data from other data of the same type (e.g., other audio or other video).

By reference to this identification data, the system determines corresponding software that should be invoked. One way to do this is by indexing a table, database, or other data structure with the identification data, to thereby obtain information identifying the appropriate software. An illustrative table is shown conceptually in FIG. 2.

In some instances the data structure may return identification of a single software program. In that case, this software is launched—if available. (Availability does not require that the software be resident on the device. Cloud-based apps may be available.) If not available, the software may be downloaded (e.g., from an online repository, such as the iTunes store), installed, and launched. (Or, the device can subscribe to a software-as-service cloud version of the app.) Involvement of the user in such action(s) can depend on the particular implementation: sometimes the user is asked for permission; in other implementations such actions proceed without disturbing the user.

Sometimes the data structure may identify several different software programs. The different programs may be specific to different platforms, in which case, device 12 may simply pick the program corresponding to that platform (e.g., Android G2, iPhone 4, etc.). Or, the data structure may identify several alternative programs that can be used on a given platform. In this circumstance, the device may check to determine which—if any—is already installed and available. If such a program is found, it can be launched. If two such programs are found, the device may choose between them using an algorithm (e.g., most-recently-used; smallest memory footprint; etc.), or the device may prompt the user for a selection. If none of the alternative programs is available to the device, the device can select and download one—again using an algorithm, or based on input from the user. Once downloaded and installed, the application is launched.

(Sometimes the data structure may identify different programs that serve different functions—all related to the content. One, for example, may be an app for discovery of song lyrics. Another may be an app relating to musician biography. Another may be an app for purchase of the content. Again, each different class of software may include several alternatives.)

Note that the device may already have an installed application that is technically suited to work with the received content (e.g., to render an MPEG4 or an MP3 file). For certain types of operations, there may be dozens or more such programs that are technically suitable. However, the content may indicate that only a subset of this universe of possible software programs should be used.

Software in the device 14 may strictly enforce the content-identified software selection. Alternatively, the system may treat such software identification as a preference that the user can override. In some implementations the user may be offered an incentive to use the content-identified software. Or, conversely, the user may be assessed a fee, or other impediment, in order to use software other than that indicated by the content.

Sometimes the system may decline to render certain content on a device (e.g., because of lack of suitable app or hardware capability), but may invite the user to transfer the content to another user device that has the needed capability, and may implement such transfer. (Ansel Adams might have taken a dim view of his large format photography being used as a screen saver on a small format, low resolution, smartphone display. If such display is attempted, the software may invite the user to instead transfer the imagery to a large format HD display at the user's home for viewing.)

Instead of absolutely declining to render the content, the system may render it in a limited fashion. For example, a video might be rendered as a series of still key frames (e.g., from scene transitions). Again, the system can transfer the content where it can be more properly enjoyed, or—if hardware considerations permit (e.g., screen display resolution is adequate)—needed software can be downloaded and used.

As shown by the table of FIG. 2 (which data structure may be resident in the memory 18, or in a remote computer system 26), the indication of software may be based on one or more contextual factors—in addition to the content identification data. (Only two context factors are shown; more or less can of course be used.)

One formal definition of "context" is "any information that can be used to characterize the situation of an entity (a person, place or object that is considered relevant to the interaction between a user and an application, including the user and applications themselves."

Context information can be of many sorts, including computing context (network connectivity, memory availability, processor type, CPU contention, etc.), user context (user profile, location, actions, preferences, nearby friends, social network(s) and situation, etc.), physical context (e.g., lighting, noise level, traffic, etc.), temporal context (time of day, day, month, season, etc.), history of the above, etc.

In the illustrated table, rows 32 and 34 correspond to the same content (i.e., same content ID), but they indicate different software should be used—depending on whether the user's context is indoors or outdoors. (The software is indicated by a 5 symbol hex identifier; the content is identified by 6 hex symbols. Identifiers of other forms, and longer or shorter in length, can of course be used.)

Row 36 shows a software selection that includes two items of software—both of which are invoked. (One includes a further descriptor—an identifier of a YouTube video that is to be loaded by software "FF245.") This software is indicated for a user in a daytime context, and for a user in the 20-25 age demographic.

Row 38 shows user location (zip code) and gender as contextual data. The software for this content/context is specified in the alternative (i.e., four identifiers "OR"d together, as contrasted with the "AND" of row 36).

Rows 40 and 42 show that the same content ID can correspond to different codecs—depending on the device processor (Atom or A4).

(By point of comparison, consider the procedure by which codecs are presently chosen. Typically the user isn't familiar with technical distinctions between competing codecs, and the artist has no say. Codec selection is thus made by neither party that is most vitally interested in the choice. Instead, default codecs come bundled with certain media rendering software (e.g., Windows Media Player). If the defaults are unable to handle certain content, the rendering software typically downloads a further codec—again with no input from the parties most concerned.)

It will be understood that the software indicated in table 30 by the content can be a stand-alone app, or a software component—such as a codec, driver, etc. The software can render the content, or it can be a content companion—providing other information or functionality related to the content. In some implementations the "software" can comprise a URL, or other data/parameter that is provided to another software program or online service (e.g., a YouTube video identifier).

Desirably, all such software identified in the table is chosen by the proprietor (e.g., artist, creator or copyright-holder) of the content with which it is associated. This affords the proprietor a measure of artistic control that is missing in most other digital content systems. (The proprietor's control in such matters should be given more deference than, say, that of a content distributor—such as AOL or iTunes. Likewise, the proprietor's choice seems to merit more weight than that of the company providing word processing and spreadsheet software for the device.)

Often the proprietor's selection of software will be based on aesthetics and technical merit. Sometimes, however, commercial considerations come into play. (As artist Robert Genn noted, "'Starving artist' is acceptable at age 20, suspect at age 40, and problematical at age 60.")

Thus, for example, if a user's device detects ambient audio by the group The Decemberists, artist-specified data in the data structure 30 may indicate that the device should load the Amazon app for purchase of the detected music (or load the corresponding Amazon web page), to induce sales. If the same device detects ambient audio by the Red Hot Chili Peppers, that group may have specified that the device should load the band's own web page (or another app), for the same purpose. The proprietor can thus specify the fulfillment service for content objected-oriented commerce.

In some arrangements, the starving artist problem may best be redressed by an auction arrangement. That is, the device 14 (or remote computer system 26) may announce to an online service (akin to Google AdWords) that the iPod of a user—for which certain demographic profile/context information may be available—has detected the soundtrack of the movie Avatar. A mini auction can then ensue—for the privilege of presenting a buying opportunity to the user. The winner (e.g., EBay) then pays the winning bid amount into an account, from which it is shared with the auction service, the artist, etc. The user's device responds by launching an EBay app through which the user can buy a copy of the movie, its soundtrack, or related merchandise. Pushing such content detection events, and associated context information, to cloud-based services can enable a richly competitive marketplace of responses.

(Auction technology is also detailed in the assignee's previously-cited patent applications, and in Google's published patent applications US2010017298 and US2009198607.)

The popularity of content can lead associated software to become similarly popular. This can induce other content proprietors to consider such software for use with their own content, since wide deployment of that software may facilitate consumer exposure to the other proprietor's content.

For example, Universal Music Group may digitally watermark all its songs with an identifier that causes the FFmpeg MP3 player to be identified as the preferred rendering software. Dedicated fans of UMG artists soon install the recommended software—leading to deployment of such software on large numbers of consumer devices. When other music proprietors consider what software to designate in table 30, the widespread use of the FFmpeg MP3 software can be one of the factors they weigh in making a choice.

(The software indicated in table 30 may be changed over time, such as through the course of a song's release cycle. When a new band issues a song, the table-specified software may include an app intended to introduce the new band to the public (or a YouTube clip can be indicated for this purpose). After the music has become popular and the band has become better known, a different software selection may be indicated.)

Presently, music discovery and other content-related applications are commonly performed by application software. Operating system (OS) software provides a variety of useful services—some of which (e.g., I/O) are commonly used in content-related applications. However, commercial OS software has not previously provided any services specific to content processing or identification.

In accordance with a further aspect of the present technology, operating system software is provided to perform one or more services specific to content processing or identification.

In one particular implementation, an OS application programming interface (API) takes content data as input (or a pointer to a location where the content data is stored), and returns fingerprint data corresponding thereto. Another OS service (either provided using the same API, or another) takes the same input, and returns watermark information decoded from the content data. (An input parameter to the API can specify which of plural fingerprint or watermark processes is to be applied. Alternatively, the service may apply several different watermark and/or fingerprint extraction processes to the input data, and return resultant information to the calling program. In the case of watermark extraction, the resultant information can be checked for apparent validity by reference to error correction data or the like.)

The same API, or another, can further process the extracted fingerprint/watermark data to obtain XML-based content metadata that is associated with the content (e.g., text giving the title of the work, the name of the artist, the copyright holder, etc.). To do this it may consult a remote metadata registry, such as maintained by Gracenote.

Such a content-processing API can establish a message queue (e.g., a "listening/hearing queue) to which results of the fingerprint/watermark extraction process (either literally, or the corresponding metadata) are published. One or more application programs can monitor (hook) the queue—listening for certain identifiers. One app may be alert to music by the Beatles. Another may listen for Disney movie soundtracks. When such content is detected, the monitoring app—or another—can launch into activity—logging the event, acting to complement the media content, offering a buying opportunity, etc.

Alternatively, such functionality can be implemented apart from the operating system. One approach is with a publish/subscribe model, by which some apps publish capabilities (e.g., listening for a particular type of audio), and other subscribe to such functions. By these arrangements, loosely-coupled applications can cooperate to enable a similar ecosystem.

One application of the present technology is to monitor media to which a user is exposed—as a background process. That is, unlike song identification services such as Shazam, the user need not take any action to initiate a discovery operation to learn the identity of a particular song. (Of course, the user—at some point—must turn on the device, and authorize this background functionality.) Instead, the device listens for a prolonged period—much longer than the 10-15 seconds of Shazam-like services, during the course of the user's day. As content is encountered, it is processed and recognized. The recognition information is logged in the device, and is used to prime certain software to reflect exposure to such content—available the next time the user's attention turns to the device.

For example, the device may process ambient audio for fifteen minutes, for an hour, or for a day. When the user next interacts with the device, it may present a listing of content to which the user has been exposed. The user may be invited to touch listings for content of interest, to engage in a discovery operation. Software associated with this content then launches.

In some implementations the device can prime software applications with information that is based, at least in part, on the content identification data. This priming may cause, e.g., the YouTube app to show a thumbnail corresponding to a music video for a song heard by the user—readying it for selection. Likewise, a 90 second sample audio clip may be downloaded to the iPod music player app—available in a "Recent Encounters" folder. An email from the band might be added to the user's email InBox, and a trivia game app may load a series of questions relating to the band. Such data is resident locally (i.e., the user needn't direct its retrieval, e.g., from a web site), and the information is prominent to the user when the corresponding app is next used—thereby customizing these apps per the user's content experiences.

Social media applications can serve as platforms through which such information is presented, and shared. When the user activates a Facebook app, for example, an avatar may give a greeting, "I noticed that you experienced the following things today . . . " and then list content to which the user was exposed, e.g., "Billy Liar" by the Decemberists, "Boys Better" by the Dandy Warhols, and the new LeBron James commercial for Nike. The app may remind the user of the context in which each was encountered, e.g., while walking through downtown Portland on Nov. 4, 2010 (as determined, e.g., by GPS and accelerometer sensors in the device). The Facebook app can invite the user to share any of this content with friends. It may further query whether the user would like discographies for any of the bands, or whether it would like full digital copies of the content, is interested in complementary content associated with any, or would like associated app(s) launched, etc.

The app may similarly report on media encounters, and associated activities, of the user's friends (with suitable permissions).

From the foregoing, it will be recognized that certain of the foregoing embodiments ease the user's dilemma of locating apps associated with certain media content. Instead, the media content serves to locate its own favored apps.

Such embodiments assure continuity between artistic intention and delivery; they optimize the experience that the art is intended to create. No longer must the artistic experience be mediated by a delivery platform over which the artist has no control—a platform that may seek attention for itself, potentially distracting from the art in which the user is interested.

This technology also fosters competition in the app marketplace—giving artists a more prominent voice as to which apps best express their creations. Desirably, a Darwinian effect may emerge, by which app popularity becomes less an expression of branding and marketing budgets, and more a reflection of popularity of the content thereby delivered.

Other Arrangements

Filtering/Highlighting Data Streams by Reference to Object Interactions

Users are increasingly presented with large volumes of data. Examples include hundreds of channels of television programming, email, and RSS/Twitter/social network/blog feeds. To help users handle such flows of information, technologies have been proposed that filter or highlight the incoming information in accordance with user profile data.

A familiar example is DVR software, such as from Tivo, that presents a subset of the unabridged electronic program guide, based on apparent user interests. The Tivo software notices which television programs have been viewed by the user, invites user feedback in the form of "thumbs-up" or "thumbs-down" rankings, and then suggests future programs of potential interest based on such past behavior and ranking.

A more recent example is Google's "Priority Inbox" for its Gmail service. Incoming email is analyzed, and ranked in accordance with its potential importance to the user. In making such judgment, Google considers what email the user has previously read, to which email the user has previously responded, and the senders/keywords associated with such mails. Incoming email that scores highly in such assessment is presented at the top of the mail list.

The company My6sense.com offers a similar service for triaging RSS and Twitter feeds. Again, the software monitors the user's historical interaction with data feeds, and elevates in priority the incoming items that appear most relevant to the user. (In its processing of Twitter feeds, My6sense considers the links the user has clicked on, the tweets the user has marked as favorites, the tweets that the user has retweeted, and the authors/keywords that characterize such tweets.)

Such principles can be extended to encompass object interactions. For example, if a person visiting a Nordstrom department store uses her smartphone to capture imagery of a pair of Jimmy Choo motorcycle boots, this may be inferred to indicate some interest in fashion, or in motorcycling, or in footwear, or in boots, or in Jimmy Choo merchandise, etc. If the person later uses her smartphone to image River Road motorcycle saddle bags, this suggests the person's interest may more accurately be characterized as including motorcycling. As each new image object is discerned, more information about the person's interests is gleaned. Some early conclusions may be reinforced (e.g., motorcycling), other hypotheses may be discounted.

In addition to recognizing objects in imagery, the analysis (which can include human review by crowd-sourcing) can also discern activities. Location can also be noted (either inferred from the imagery, or indicated by GPS data or the like).

For example, image analysis applied to a frame of imagery may determine that it includes a person riding a motorcycle, with a tent and a forested setting as a background. Or in a temporal series of images, one image may be found to include a person riding a motorcycle, another image taken a few minutes later may be found to include a person in the same garb as the motorcycle rider of the previous frame—now depicted next to a tent in a forested setting, and another image taken a few minutes later may be found to depict a motorcycle being ridden with a forested background. GPS data may locate all of the images in Yellowstone National Park.

Such historical information—accumulated over time—can reveal recurrent themes and patterns that indicate subjects, activities, people, and places that are of interest to the user. Each such conclusion can be given a confidence metric, based on the system's confidence that the attribute accurately characterizes a user interest. (In the examples just given, "motorcycling" would score higher than "Jimmy Choo merchandise.") Such data can then be used in filtering or highlighting the above-noted feeds of data (and others) with which the user's devices are presented.

As a history of device usage is compiled, a comprehensive history of interests and media consumption patterns emerges that can be used to enhance the user's interaction with the world. For example, if the user images fashion accessories from Sephora, parameters controlling the user's junk email filter may be modified to allow delivery of emails from that company—emails that might have otherwise have been blocked. The user's web browsers (e.g., Safari on the smartphone; Firefox on a home PC) may add the Sephora web page to a list of "Suggested Favorites"—similar to what Tivo does with its program suggestions.

A user may elect to establish a Twitter account that is essentially owned by the user's object-derived profile. This Twitter account follows tweets relating to objects the user has recently sensed. If the user has imaged a Canon SLR camera, this interest can be reflected in the profile-associated Twitter account, which can follow tweets relating to such subject. This account can then re-tweet such posts into a feed that the user can follow, or check periodically, from the user's own Twitter account.

Such object-derived profile information can be used for more than influencing the selection of content delivered to the user via smartphone, television, PC and other content-delivery devices. It can also influence the composition of such content. For example, objects with which the user interacts can be included in media mashups for the user's consumption. A central character in a virtual reality gaming world frequented by the user may wear Jimmy Choo motorcycle boots. Treasure captured from an opponent may include a Canon SLR camera.

Every time the user interacts with an object, this interaction can be published via Twitter, Facebook, etc. (subject to user permission and sharing parameters). These communications can also be thought of as "check-ins" in the FourSquare sense, but in this case it is for an object or media type (music, TV, etc.) rather than for a location.

Based on these public communiqús, social frameworks can emerge. People who are interested in hand-built Belgian racing bicycles from the 1980s (as evidenced by their capturing imagery of such bicycles) can coalesce into an affinity social group, e.g., on Twitter or Facebook (or their successors). Object-based communities can thus be defined and explored by interested users.

Social network theorists will recognize that this is a form of social network analysis, but with nodes representing physical objects.

Social network analysis views relationships using network theory, in which the network comprises nodes and ties (sometimes called edges, links, or connections). Nodes are the individual actors within the networks, and ties are the relationships between the actors. The resulting graph-based structures can be complex; there can be many kinds of ties between the nodes. In the case just-given, the relationships ties can include "likes," "owns," etc.

A particular 3D graph may place people objects in one plane, and physical objects in a parallel plane. Links between the two planes associate people with objects that they own or like. (The default relationship may be "like." "Owns" may be inferred from context, or deduced from other data. E.g., a Camaro automobile photographed by a user, and geolocated at the user's home residence, may indicate an "owns" relationship. Similarly, a look-up of a Camaro license plate in a public database, which indicates the car is registered to the user, also suggests an "owns" relationship.)

Such a graph will also typically include links between people objects (as is conventional in social network graphs), and may also include links between physical objects. (One such link is the relationship of physical proximity. Two cars parked next to each other in a parking lot may be linked by such a relationship.)

The number of links to a physical object in such a network is an indication of the object's relative importance in that network. Degrees of association between two different physical objects can be indicated by the length of the network path(s) linking them—with a shorter path indicating a closer degree of association.

Some objects may be of transitory interest to users, while others may be of long-term interest. If a user images a particular type of object only once, it likely belongs to the former class. If the user captures images of such object type repeatedly over time, it more likely belongs to the latter class. Decisions based on the profile data can take into account the aging of object-indicated interests, so that an object encountered once a year ago is not given the same weight as an object encountered more recently. For example, the system may follow Canon SLR-based tweets only for a day, week or month, and then be followed no longer, unless other objects imaged by the user evidence a continuing interest in Canon equipment or SLR cameras. Each object-interest can be assigned a numeric profile score that is increased, or maintained, by repeated encounters with objects of that type, but which otherwise diminishes over time. This score is then used to weight that object-related interest in treatment of content.

(While the detailed arrangement identified physical objects by analysis of captured image data, it will be recognized that objects with which the user interacts can be identified otherwise, such as by detection of RFID/NFC chips associated with such objects.)

Principles and embodiments analogous to those detailed above can be applied to analysis of the user's audio environment, including music and speech recognition. Such information can similarly be applied to selecting and composing streams of data with which the user (e.g., user device) is presented, and/or which may be sent by the user (user device). Still greater utility can be provided by consideration of both visual and auditory stimulus captured by user device sensors.

Text Entry

The front-facing camera on a smartphone can be used to speed text entry, in a gaze-tracking mode.

Figure 3:
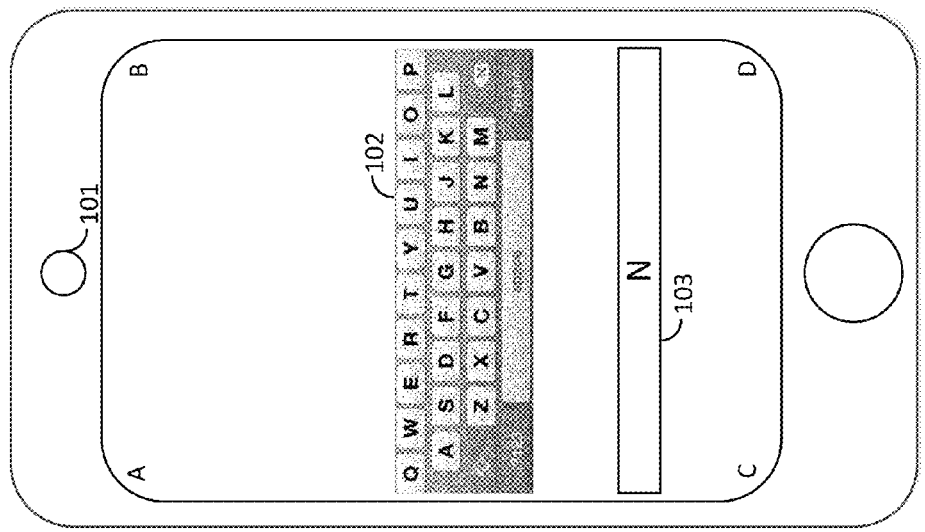

A basic geometrical reference frame can be first established by having the user look, successively, at two or more known positions on the display screen, while monitoring the gaze of one or both eyes using the smartphone camera 101. In FIG. 3, the user looks successively at points A, B, C and D. Increased accuracy can be achieved by repeating the cycle. (The reader is presumed to be familiar with the principles of gaze tracking systems, so same are not belabored here. Example systems are detailed, e.g., in patent publications 20110013007, 20100315482, 20100295774, and 20050175218, and references cited therein.)

Once the system has determined the geometrical framework relating the user's eye gaze and the device screen, the user can indicate an initial letter by gazing at it on a displayed keyboard 102. (Other keyboard displays that make fuller use of the screen can of course be used.) The user can signify selection of the gazed-at letter by a signal such as a gesture, e.g., an eye blink, or a tap on the smartphone body (or on a desk on which it is lying). As text is selected, it is added to a message area 103

Figure 4:
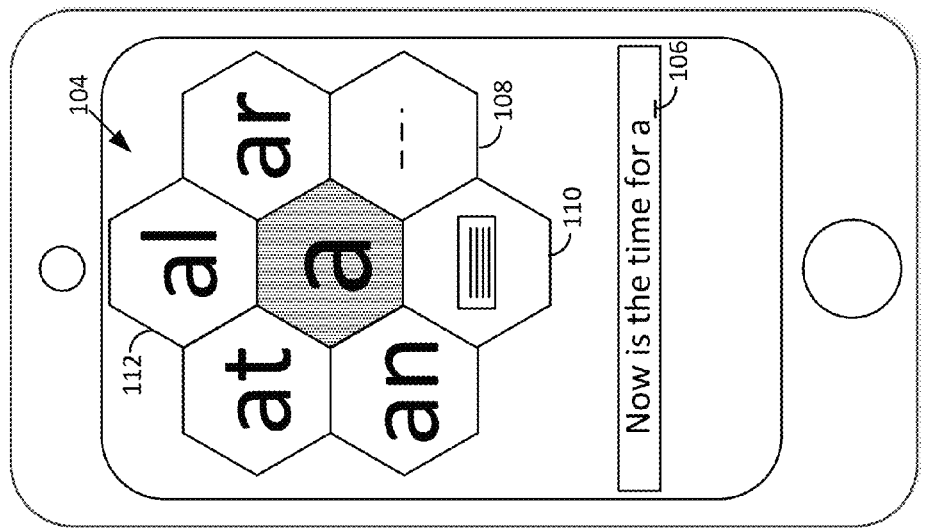

Once an initial letter (e.g., "N") has been presented, data entry may be speeded (and gaze tracking may be made more accurate) by presenting likely next-letters in an enlarged letter-menu portion 104 of the screen. Each time a letter is entered, a menu of likely next-letters (determined, e.g., by frequency analysis of letter pairs in a representative corpus) is presented. An example is shown in FIG. 4, in which the menu takes the form of a hexagonal array of tiles (although other arrangements can of course be used).

In this example, the user has already entered the text "Now is the time for a_", and the system is waiting for the user to select a letter to go where the underscore 106 is indicated. The last letter selected was "a." This letter is now displayed—in greyed-out format—in the center tile, and is surrounded by a variety of options—including "an," "at," "al," and "ar." These are the four most common letter pairs beginning with "a." Also displayed, in the indicated hexagonal array, is a "--" selection tile 108 (indicating the next symbol should be a space), and a keyboard selection tile 110.

Figure 5:
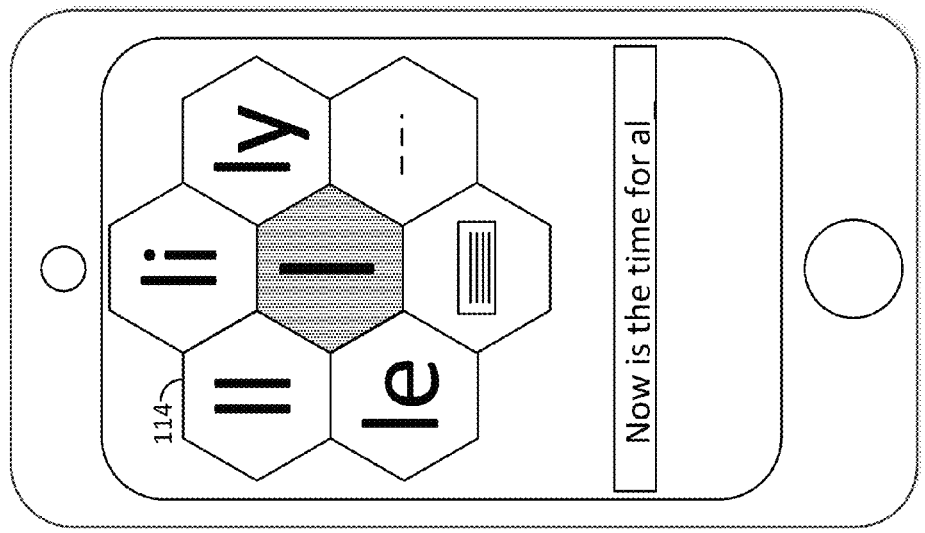
FIGS. 3-7 detail features of illustrative gaze-tracking embodiments, e.g., for text entry.

To enter the next letter "l", the user simply looks at the "al" display tile 112, and signifies acceptance by a tap or other gesture, as above. The system then updates the screen as shown in FIG. 5. Here the message has been extended by a letter ("Now is the time for al_"), and the menu 104 has been updated to show the most common letter pairs beginning with the letter "l". The device solicits a next letter input. To enter another "l" the user gazes at the "ll" tile 114, and gestures.

Initial studies suggest that well over 50% of text entry can be accomplished by the enlarged letter-menu of likely next-letters (plus a space). If a different letter is required, the user simply gazes at the keyboard tile 110 and gestures. A keyboard—like that shown in FIG. 3, or another, appears and the user makes a selection from it.

Figure 6:
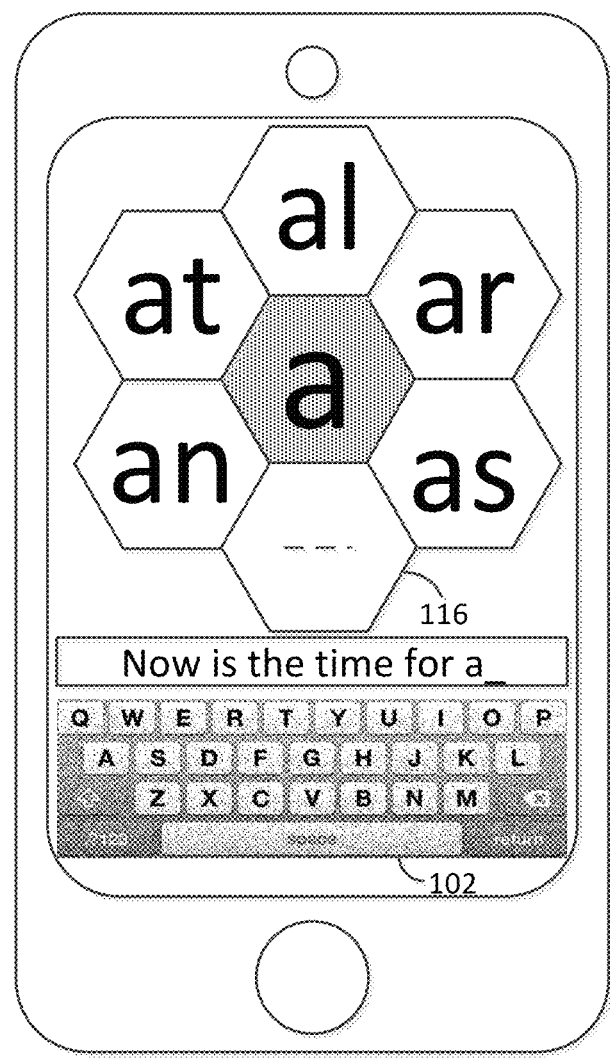

Instead of presenting four letter pairs, a space, and a keyboard icon, as shown in FIGS. 2 and 3, an alternative embodiment presents five letter pairs and a space, as shown in FIG. 6. In this arrangement, a keyboard is always displayed on the screen, so the user can select letters from it without the intermediate step of selecting the keyboard tile 110 of FIG. 4.

Figure 7:
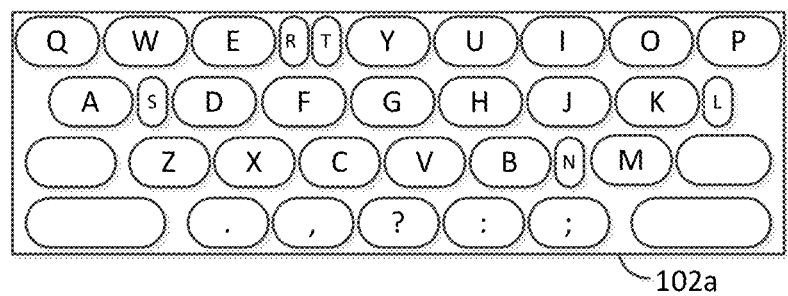

Instead of the usual keyboard display 102, a variant keyboard display 102*a*—shown in FIG. 7—can be used. This layout reflects the fact that five characters are not needed on the displayed keyboard, since the five most-likely letters are already presented in the hexagonal menu. In the illustrated example, the five keys are not wholly omitted, but rather are given extra-small keys. The 21 remaining letters are given extra-large keys. Such arrangement speeds user letter selection from the keyboard, and makes gaze tracking of the remaining keys more accurate. (A further variant, in which the five letter keys are omitted entirely from the keyboard, can also be used.)

It will also be noted that the variant keyboard layout 102*a* of FIG. 7 omits the usual space bar. Since there is an enlarged menu tile 116 for the space symbol, no space bar in the keyboard 102*a* is required. In the illustrated arrangement, this area has been replaced with common punctuation symbols.

The artisan will recognize that numerous alternatives and extensions can be implemented. There is no need, for example, for the last letter to be displayed in the center of the hexagon. This space can be left vacant, or can be used instead to indicate the next-letter apparently indicated by the user's present gaze, so that the user can check the selection before gesturing to confirm. (When updated with the apparently-indicated letter, gazing at the center tile doesn't change the earlier gaze-based selection.) A numeric pad can be summoned to the screen by selection of a numeric pad icon—like keyboard tile 110 in FIG. 4. Or a numeric keyboard can be displayed on the screen throughout the message composition operation (like keyboard 102 in FIG. 6). One or more of the hexagonal tiles can present a guess of the complete word the user is entering—again based on analysis of a text corpus.

The corpus used to determine the most common letter pairs, and full word guesses, can be user-customized, e.g., a historical archive of all text and/or email messages authored by the user, or sent from the user's device. The indicated display features can naturally be augmented by other graphical indicia and controls associated with the smartphone functionality being used (e.g., a text-messaging application).

In still other embodiments, the user may select from symbols and words presented apart from the smartphone display—such as on a printed page. A large-scale complete keyboard and a complete numeric pad can be presented on such a page, and used independently, or in conjunction with a displayed letter menu, like menu 104. (Again, the smartphone camera can be used to perform the gaze-tracking, and geometrical calibration can be performed by having the user gaze at reference points.)

In a particular embodiment, the smartphone provides additional feedback to the user, e.g., in the form of highlighting that indicates where, on the screen, the user's gaze appears to be directed. Similarly, the smartphone can draw trails on the screen corresponding to sensed movements of the user's gaze. These trails can "evaporate" a few seconds after being drawn—removing them from the display.

It will be recognized that, in similar fashion, any interface interaction that presently uses fingers can alternatively be implemented with gaze tracking.

Sign Language

Just as a smartphone can watch a user's eye, and interpret the movements, it can similarly watch a user's hand gestures, and interpret them as well. The result is a sign language interpreter.

Sign languages (American and British sign languages being the most dominant) comprise a variety of elements—all of which can be captured by a camera, and identified by suitable image analysis software. A sign typically includes handform and orientation aspects, and may also be characterized by a location (or place of articulation), and movement. Manual alphabets (fingerspelling) gestures are similar, and are employed mostly for proper names and other specialized vocabulary.

An exemplary sign language analysis module segments the smartphone-captured imagery into regions of interest, by identifying contiguous sets of pixels having chrominances within a gamut associated with most skin tones. The thus-segmented imagery is then applied to a classification engine that seeks to match the hand configuration(s) with a best match within a database library of reference handforms. Likewise, sequences of image frames are processed to discern motion vectors indicating the movement different points within the handforms, and changes to the orientations over time. These discerned movements are likewise applied to a database of reference movements and changes to identify a best match.

When matching signs are found in the database, textual meanings associated with the discerned signs are retrieved from the database records and can be output—as words, phonemes or letters—to an output device, such as the smartphone display screen.

Desirably, the best-match data from the database is not output in raw form. Preferably, the database identifies for each sign a set of candidate matches—each with a confidence metric. The system software then consider what combination of words, phonemes or letters is most likely in that sequential context—giving weight to the different confidences of the possible matches, and referring to a reference database detailing word spellings (e.g., a dictionary), and identifying frequently signed word-pairs and—triples. (The artisan will recognize that similar techniques are used in speech recognition systems—to reduce the likelihood of outputting nonsense phrases.)

The recognition software can also benefit by training. If the user notes an incorrect interpretation has been given by the system to a sign, the user can make a sign indicating that a previous sign will be repeated for re-interpretation. The user then repeats the sign. The system then offers an alternative interpretation—avoiding the previous interpretation (which the system infers was incorrect). The process may be repeated until the system responds with the correct interpretation (which may be acknowledged with a user sign, such as a thumbs-up gesture). The system can then add to its database of reference signs the just-expressed signs—in association with the correct meaning.

Similarly, if the system interprets a sign, and the user does not challenge the interpretation, then data about the captured sign imagery can be added to the reference database—in association with that interpretation. By this arrangement the system learns to recognize the various presentations of certain signs. The same technique allows the system to be trained, over time, to recognize user-specific vernacular and other idiosyncrasies.

To aid in machine-recognition, standard sign language can be augmented to give the image analysis software some calibration or reference information that will aid understanding. For example, when signing to a smartphone, a user may begin with gesture such as extending fingers and thumbs from an outwardly-facing palm (the typical sign for the number '5') and then returning the fingers to a fist. This allows the smartphone to identify the user's fleshtone chrominance, and determine the scale of the user's hand and fingers. The same gesture, or another, can be used to separate concepts—like a period at the end of a sentence. (Such punctuation is commonly expressed in American signal language by a pause. An overt hand gesture, rather than the absence of a gesture, is a more reliable parsing element for machine vision-based sign language interpretation.)

As noted, the interpreted sign language can be output as text on the smartphone display. However, other arrangements can also be implemented. For example, the text can be simply stored (e.g., in a ASCII or Word document), or it can be output through a text-to-speech converter, to yield audible speech. Similarly, the text may be input to a translation routine or service (e.g., Google translate) to convert it to another language—in which it may be stored, displayed or spoken.

The smartphone may employ its proximity sensor to detect the approach of a user's body part (e.g., hands), and then capture frames of camera imagery and check them for a skin-tone chrominance and long edges (or other attributes that are characteristic of hands and/or fingers). If such analysis concludes that the user has moved hands towards the phone, the phone may activate its sign language translator. Relatedly, Apple's FaceTime communications software can be adapted to activate the sign language translator when the user positions hands to be imaged by a phone's camera. Thereafter, text counterparts to the user's hand gestures can be communicated to the other party(ies) to which the phone is linked, such as by text display, text-to-speech conversion, etc.

Streaming Mode Detector

In accordance with another aspect of the technology, a smartphone is equipped to rapidly capture identification from plural objects, and to make same available for later review.

Figure 8:
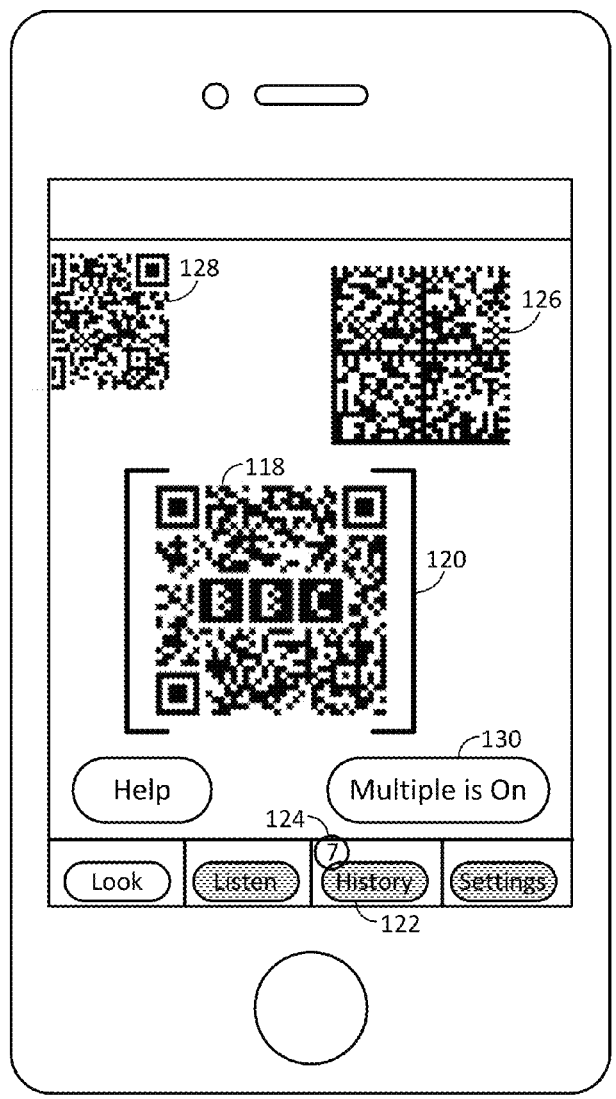
FIGS. 8 and 9 detail features of an illustrative user interface.

FIG. 8 shows an example. The application includes a large view window that is updated with streaming video from the camera (i.e., the usual viewfinder mode). As the user pans the camera, the system analyzes the imagery to discern any identifiable objects. In FIG. 8, there are several objects bearing barcodes within the camera's field of view.

In the illustrated system the processor analyzes the image frame starting at the center—looking for identifiable features. (In other arrangements, a top-down, or other image search procedure can be followed.) When the phone finds an identifiable feature (e.g., the barcode 118), it overlays bracketing 120 around the feature, or highlights the feature, to indicate to the user what part of the displayed imagery has caught its attention. A "whoosh" sound is then emitted from the device speaker, and an animated indicia moves from the bracketed part of the screen to a History 122 button at the bottom. (The animation can be a square graphic that collapses to a point down at the History button.) A red-circled counter 124 that is displayed next to the History button indicates the number of items thus-detected and placed in the device History (7, in this case).

After thus-processing barcode 118, the system continues its analysis of the field of view for other recognizable features. Working out from the center it next recognizes barcode 126, and a similar sequence of operations follows. The counter 124 is incremented to "8." It next notes barcode 128—even though it is partially outside the camera's field of view. (Redundant encoding of certain barcodes enables such decoding.) The time elapsed for recognizing and capturing data from the three barcodes into the device history, with the associated user feedback (sound and animation effects) is less than 3 seconds (with 1 or 2 seconds being typical).

Figure 9:
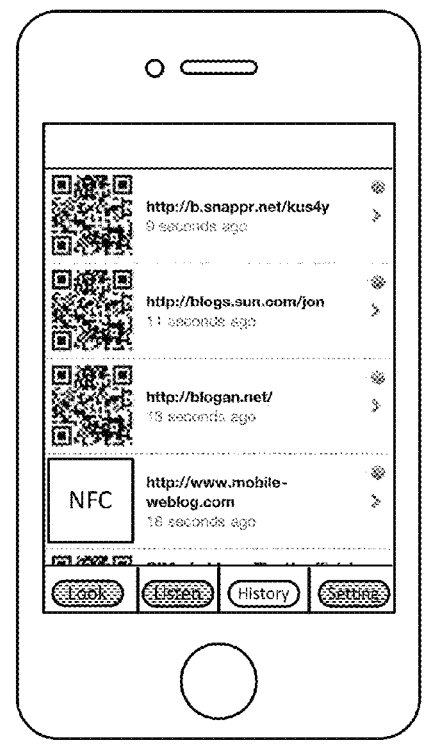

By tapping the History button 122, a scrollable display of previously-captured features is presented, as shown in FIG. 9. In this list, each entry includes a graphical indicia indicating the type of feature that was recognized, together with information discerned from the feature, and the time the feature was detected. (The time may be stated in absolute fashion, or relative to the present time; the latter is shown in FIG. 9.)

As shown in FIG. 9, the features detected by the system needn't be found in the camera data. They can include features discerned from audio (e.g., identification of a person speaking), or from other sensors. FIG. 9 shows that the phone also sensed data from a near field chip (e.g., an RFID chip)—indicated by the "NFC" indicia.

At a later time, the user can recall this History list, and tap indicia of interest. The phone then responds by launching a response corresponding to that feature (or by presenting a menu of several available features, from which the user can select).

Sometimes the user may wish to turn-off the detailed streaming mode operation, e.g., when the environment is rich with detectable features, and the user does not want multiple captures. A button control 130 on the application UI toggles such functionality on and off. In the indicated state, detection of multiple features is enabled. If the user taps this control, its indicia switches to "Multiple is Off." When the phone detects a feature in this mode, the system adds it to the History (as before), and immediately launches a corresponding response. For example, it may invoke web browser functionality and load a web page corresponding to the detected feature.

Evidence-Based State Machines, and Blackboard-Based Systems

Another aspect of the present technology involves smartphone-based state machines, which vary their operation in response to sensor input.

Application Ser. No. 12/797,503 details how a blackboard data structure is used for passing data between system components. The following discussion provides further information about an illustrative embodiment.

In this illustrative system, there are both physical sensors and logical sensors. A physical sensor monitors a sensor, and feeds data from it to the blackboard. The camera and microphone of a smartphone are particular types of physical sensors, and may be generically termed "media sensors." Some sensors may output several types of data. For example, an image sensor may output a frame of pixel data, and also an AGC (automatic gain control) signal.

A logical sensor obtains data—typically from the blackboard—and uses it to calculate further data. This further data is also commonly stored back in the blackboard. (The recognition agents discussed in application Ser. No. 12/793,503 are examples of logical sensors. Another is an inference engine.) In some cases the same physical data may pass through multiple stages of logical sensor refinement during processing.

Modules which produce or consume media content may require some special functionality, e.g., to allow format negotiation with other modules. This can include querying a recognition agent for its requested format (e.g., audio or video, together with associated parameters), and then obtaining the corresponding sensor data from the blackboard.

Below follows a table detailing an exemplary six stage physical sensor/logical sensor data flow, for reading a digital watermark from captured imagery (the ReadImageWatermark scenario). The Stored Data column gives the name of the stored data within the blackboard. (MS stands for media sensor; PS stands for physical sensor; LS stands for logical sensor; and RA stands for recognition agent.)

|   | Source Data | Sensor Module | Stored Data |
|---|---|---|---|
| 1 | Video frame | Camera (MS) | Data_Frame |
| 2 | Camera AGC | Camera (MS) | Data_AGC |
| 3 | Handset Movement | Accelerometer (PS) | Data_Jerk |
| 4 | Data_Frame | Image Classifier (LS) | Data_Classification |
| 5 | Data_AGC Data_Jerk Data_Classification | Watermark Inference (LS) | Data_FrameQuality |
| 6 | Data_FrameQuality Data_Frame | Watermark Reader (RA) | Data_ReadResult Data_WM_ID |

The first two lines simply indicate that a frame of video data, and associated AGC data (which may be, e.g., an average luminance value across the frame), are written to the blackboard from the camera. The third line shows that associated handset movement data—as sensed by the smartphone accelerometer system—is also written the blackboard.

In the fourth line, the table indicates that the Data_Frame data that was previously stored to the blackboard is applied to an image classifier (a variety of logical sensor), resulting in classification data that is stored in the blackboard. (Classification data can be of various sorts. One type of classification data is color saturation. If a frame has very low color saturation, this indicates it is not a color scene, but is more likely printed text on a white background, or a barcode. The illustrative data flow will not activate the watermark detector if the Data_Classification data indicates the scene is likely printed text or barcode—although in other implementations, watermarks may be read from black and white, or greyscale, imagery. Another classifier distinguishes spoken speech from music, e.g., so that a song recognition process does not run when spoken audio is input.)

The fifth line indicates that the just-derived classification data, together with the AGC and accelerometer data, are recalled from the blackboard and applied to a watermark inference module (another logical sensor) to yield a frame quality metric, which is written back to the blackboard. The watermark inference module uses the input data to estimate the likelihood that the frame is of a quality from which a watermark—if present—can be decoded. For example, if the AGC signal indicates that the frame is very dark or very light, then it is improbable that a watermark is recoverable. Ditto if the accelerometer data indicates that the smartphone is being accelerated when the frame of imagery was captured. (The accelerometer data is typically compensated for gravity.) Likewise if the classifier indicates it is a low-saturation set of data.

The sixth line shows that the just-determined frame quality metric is provided—together with a frame of captured imagery—to a watermark reader (recognition agent). If the frame quality exceeds a threshold, the watermark reader will attempt to decode a watermark from the imagery. The result of such attempt is stored in the ReadResult data (e.g., "1" indicates a watermark was successfully decoded; a "0" indicates that no watermark was found), and the decoded watermark payload—if any—is stored as the WM_ID.

(In another embodiment, instead of conditionally invoking the watermark decoder if the frame quality metric exceeds a threshold, this metric can be used as a priority value that dynamically controls operation of the watermark decoder—based on system context. If the system is busy with other operations, or if other context—such as battery charge—makes the decoding operation costly, then a frame with a low quality metric will not be watermark-processed, so as not to divert system resources from higher-priority processes.)

In the illustrative system, the installed modules are enumerated in a configuration file. These modules are available for instantiation and use at runtime. The configuration file also details one or more scenarios (e.g., ReadImageWatermark—as detailed above, and FingerprintAudio)—each of which specifies a collection of modules that should be used for that scenario. At runtime the application initializes middleware that specifies a particular scenario(s) to invoke. The middleware configuration, and scenarios, are typically loaded from an XML configuration file.

Figure 10:
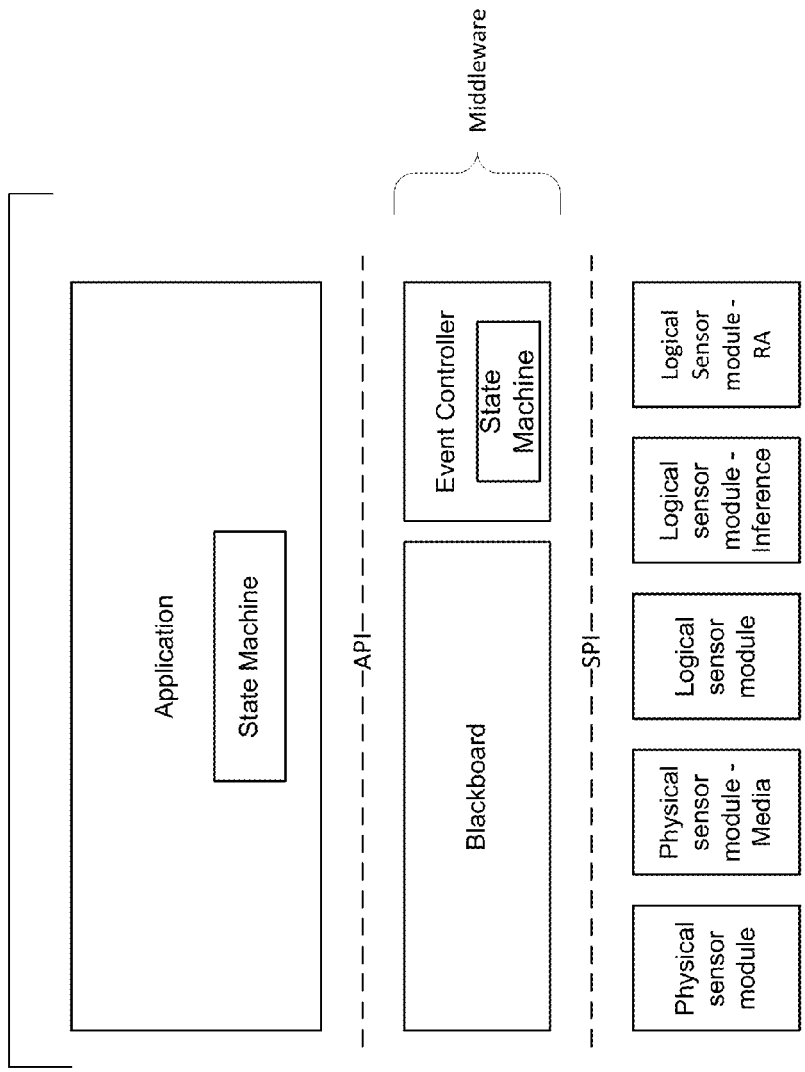
FIG. 10 shows a block diagram of a system incorporating principles of the present technology.

The illustrative system is coded in C/C++ (e.g., using Visual Studio 2010), and follows the architecture shown in FIG. 10. The middleware—comprising the blackboard, together with an event controller, and a middleware state machine—is implemented in a dynamic link library (DLL).

As is familiar to artisans, the FIG. 10 system employs standardized interfaces through which different system components communicate. In particular, communication between system applications (above) and the middleware is effected through APIs, which define conventions/protocols for initiating and servicing function calls. Similarly, the sensor modules (which are typically implemented as DLLs that are dynamically loaded at runtime by the middleware) communicate with the middleware through a service provider interface (SPI).

The illustrated blackboard can store data in a variety of manners, e.g., key-value pairs, XML, ontologies, etc. The exemplary blackboard stores data as key-value pairs, and these are accessed using push and pull APIs. Concurrency control is handled by pessimistic locking—preventing processes from accessing data while it is in use by another process. The blackboard data types include data blobs in addition to discrete data elements (e.g., integers and strings).

In addition to the data values themselves, each data entry has several items of associated data (metadata). These include:
  Name
  Source (name of the module that created the entry)
  Value
  Data type
  Data size
  Reference count
  Timestamp (last update time)
  Lifetime (how long this Value is useful)
  Quality (how certain is this Value)

The values that are stored in the blackboard are of the following representative data types:
Video frames
Video statistics (frame rate, AGC, focal distance, etc.)
Accelerometer data
WM read result
WM ID
Video classification result Data is written to and read from the blackboard through functions that are supported by both the API and SPI. Such functions are familiar to artisans and include (with the parentheticals denoting values passed as part of the API/SPI call):
BB_CreateEntry (name, source, type, size), returns Handle
BB_OpenEntry (name), returns Handle
BB_GetEntryNames (source, buffer)
BB_GetEntryInfo (name, source, info)
BB_GetEntryInfo (Handle, info)
BB_GetValue (Handle, value)
BB_SetValue (Handle, value)
BB_CloseEntry (Handle)

In addition to the above-detailed data types, the modules publish status information to the blackboard using a common set of named entries. Each name is created by using the pattern PREFIX+"_"+MODULE NAME. The prefixes include:
Status (a numeric status code)
Error (an error string for the last error)
Result (a numeric result code of the most recent operation)

API and SPI functions also include Initialize, Uninitialize, LoadScenario, Start, Stop and Pause, through which the relevant DLLs are initialized (or unitialized), and different scenarios are configured and started/stopped/paused.

The event controller module of the FIG. 10 middleware deals with the various priorities, processing complexity and processing frequency of different SPIs. For example, an image watermark decoder RA is processor intensive, but it operates on discrete frames, so frames can be ignored if other SPIs need time to run. (E.g., in performing the WatermarkImageRead scenario on a stream of images, i.e., a video stream, various frames can be dropped—thereby scaling execution to the available resources, and preventing the system from becoming bogged down). By contrast, an audio watermark decoder RA can be less processor intensive, but it needs to process audio data in an uninterrupted stream. That is, when a stream of audio data is available, the audio watermark RA should take precedence over other SPIs. When multiple media streams (e.g., audio and streaming images) are present, and other RAs are involved in processing, the event controller may periodically interrupt audio processing to allow image processing if a high quality frame of imagery is available.

Desirably, each module includes a data structure detailing information about the module's priority needs and limitations, execution frequency, etc. A sample of the data in such a structure follows:
Name
Type (PS, MS, LS, RA)
Priority (Low-High with, e.g., 2-10 steps)
Blackboard data values consumed
Blackboard data values produced Modules and applications can further issue a blackboard trigger function, with a corresponding trigger value (or trigger value range), which causes the middleware (e.g., the blackboard or the event controller) to issue such module/application a notification/message when certain data in the blackboard meets the trigger value criterion. One such trigger is if the ReadImageWatermark operation returns a ReadResult value of "1," signifying a successful watermark read. Another trigger is if a music recognition module identifies the theme music to the television show Grey's Anatomy. By such function, the module/application can remain dormant until alerted of the presence of certain data on the blackboard.

By the foregoing arrangement, it will be recognized that each of the sensors can publish data and status information to the blackboard, and this information can be retrieved and used by other modules and by different applications which, in turn, publish their respective results to the blackboard. Through such iterative processing, raw data from a single physical sensor can be successively processed and augmented with other information, and reasoned-with, to perform highly complex operations. The ReadImageWatermark is a simple example of the multi-phase processing that such system enables.

More on Middleware, Etc.

Figure 16:
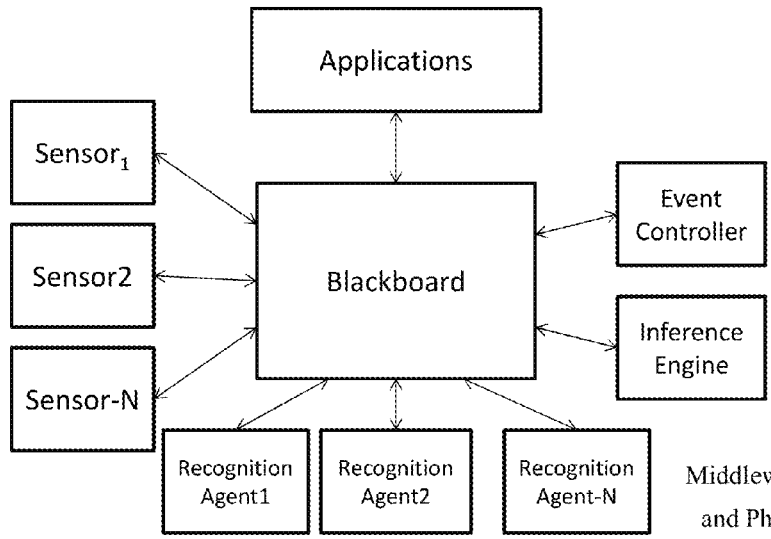
FIG. 16 shows a middleware architecture for object recognition.

FIG. 16 is another architectural view of middleware for media and physical object recognition. This flexible architecture can also be used to deliver more contextual information to the application. This design includes a blackboard, a sensor bank, a recognition Agent (RA) bank, an inference engine, and an event controller.

As noted, the blackboard is central to the architecture. It is a shared repository through which system components communicate. No direct communication is typically allowed among any other system components. An exemplary blackboard is virtually structured into separate sections, each dedicated to a given type of data. For example, there is one section for audio data and another for imagery.

The sensor bank provides inputs to the blackboard and may include a camera, microphone, accelerometer, gyroscope, ambient light sensor, GPS, etc. The RA bank may include image and audio watermark readers, a fingerprint reader, a barcode reader, etc. Each sensor and RA contains a private knowledge base for estimating the cost of achieving its assigned task and the quality of its results. This supports extensibility, enabling sensors or RAs to be added or removed with no impact on other components of the system The event controller coordinates the overall operation of the system. The inference engine monitors the content of the blackboard and infers contextual data to optimize the use of the resources in the sensor and RA banks. The inference engine writes inferred data to the blackboard.

A minimum number of sensors is typically active to provide input to the blackboard. Upon input from any component, the blackboard may signal the change to all components. Each sensor and RA then assesses whether it can help resolve the identity of a detected object. A sensor can help resolve the identity by providing relevant and more accurate data. A sensor or RA uses its knowledge base to estimate the cost and quality of its solution and writes that data to the blackboard. The event controller activates the sensor(s) or RA(s) estimated to produce optimal results most economically. Sensors and the inference engine continue to update the blackboard to ensure that the most suitable module(s) is always engaged. The system continues this process until the object's identity is resolved. In this scenario, the event controller optimizes the use of power and resources in the system. For example, if the lighting level is poor or the device is in vigorous motion, the camera is not used and neither the image watermark reader nor the barcode reader is used for identification.

Figure 17:
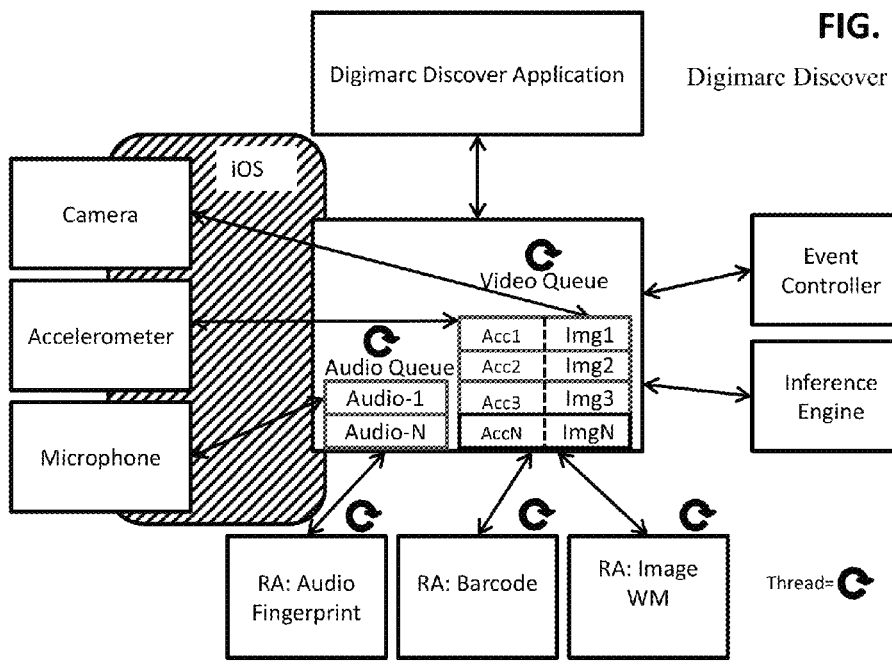
FIG. 17 is similar to FIG. 16, but is particular to the Digimarc Discover implementation.

FIG. 17 shows the middleware architecture of the Digimarc Discover application. It is implemented in C/C++ and assembly language and optimized for the iPhone and Android platforms. The Digimarc Discover application integrates RAs for digital watermarks, barcodes, and audio fingerprints.

The primary difference between the architecture depicted in FIG. 17 and that shown in FIG. 16 is the absence of a formal inference engine, and a more limited role for the blackboard. Although some mechanisms are implemented to decide whether to process a media sample, a full inference engine is not required. Also, the blackboard is used essentially as a means for moving media data (audio and video), along with some sensor data (accelerometer, gyroscope, etc.). The blackboard keeps all captured data synchronized and queued for consumption by the RAs regardless of their sampling rates. When an RA is ready for processing, it requests a media sample from a corresponding data queue in the blackboard. The blackboard then provides the RA with the media data and associated sensor data.

When an RA begins processing the media sample, it may use any of the sensor data attached to the sample. The RA first decides whether to process the sample or not. It undertakes its identification task only if it is relatively confident of reaching a correct identification. Otherwise, the RA aborts the operation and waits for the next media sample. An RA may use a logical sensor to tune its identification parameters. If successful, the RA returns its result to the application through the middleware.

To provide an attractive user experience, the RAs should quickly process large amounts of data for the best chance at a positive object/media identification. Because identification requires such a volume of data, appropriate integration with the operating system is desirable. This integration is typically tuned based on the particular audio and video capturing process used. Without such integration, the blackboard may not have enough data for the RAs to perform detection, and the chances of obtaining a correct identification are reduced. Using multiple RAs at once can exacerbate the problem.

An initial implementation of the Digimarc Discover application worked reasonably well as a demonstration platform, but it was not speedy, and was not easily extensible. Integrating additional identification technologies presented performance and implementation challenges. To address such circumstance, two types of optimizations are implemented:

One is more efficient utilization of OS resources, through improved integration with the smartphone media capture subsystem. Another is iPhone-specific optimizations of the RAs. These are detailed below.

The iPhone version of the Digimarc Discover application relies on Apple's Grand Central Dispatch threading facility, which permits large-scale multi-threading of the application with low thread latency. Audio and video streams are recorded in separate threads, and each RA runs in its own thread. Overhead did not observably increase with the number of threads. The benefits even on the iPhone's single-core processor far outweigh possible drawbacks. RA processing is generally driven by the audio and video capture threads, but this can vary depending on the type of RAs in use.

As noted earlier, there is a fundamental difference between streaming image (video) identification technologies (e.g., watermarks and barcodes), and audio (e.g., watermarks and fingerprints), namely that video technologies process individual images, while audio technologies process streams. Video is delivered to an application as a sequence of frames, each one a complete image. However audio is delivered as blocks of data in a raw byte stream. While a video frame can stand alone, a single audio block is often useless for audio identification. Most audio identification technologies need at least several seconds (equal to many blocks) of audio data for an identification.

This difference between data types and sample rates causes differences in middleware architecture. During high processor use, individual video frames may be dropped with negligible effect on the robustness of the video RA. An audio RA, however, needs several blocks to identify content. The initial implementation of the Digimarc Discover application, in which RAs processed media samples as they became available, did not always work for audio. In some cases, audio processing could fall behind during heavy processing, leading to delayed results, and a slower than desired user interface. To deal with this, the Digimarc Discover application employs a priority system in which the middleware balances processing by throttling back RAs that can afford to skip frames, while keeping the others running at full speed.

Processing image/video frames is one of the most CPU-intensive tasks. Two separate RAs (watermark detector and barcode reader) could be used simultaneously to process each captured image. Excluding one RA from examining an image can significantly improve performance. As indicated above, the Digimarc Discover application uses a classifier to decide whether the barcode reader should process an image. Since barcodes are nearly always printed in black and white, the classifier inspects the saturation levels of images and excludes those with significant amounts of color. Similarly, a fingerprint-based Gracenote music recognition RA is controlled by reference to a speech classifier, which avoids calling the Gracenote RA when microphone audio is classified as speech.

As indicated above, the ImageWatermarkRead scenario employs data from the smartphone accelerometer—preventing an attempted watermark read if the image would likely include excessive motion blur. Similarly, other smartphone logical sensors, including other position/motion sensors, as well as sensors of focal distance, automatic white balance, automatic gain control, and ISO, can be used to identify low quality frames, so that smartphone resources are not needlessly consumed processing poor quality input.

Our work has shown that logical sensors help optimize the use of system resources and enhance user experience. In like fashion, logical sensors that provide additional information about user context and device context enable still more complex operations. Information about when, where, how, and by whom a device is used is desirably included in all decisions involving the middleware. Some implementations employ a formal representation of context, and an artificial intelligence-based inference engine. In such arrangements, sensors and RAs may be conceived as knowledge sources.

(Any logical sensor may be regarded, in a sense, as an inferencing module. A light sensor can detect low light, and infer the smartphone's context is in the dark. Such inference can be used to issue a signal that turns on a torch to increase the illumination. A more sophisticated arrangement employs several modules in the smartphone. For example, the light sensor may detect low light, and the microphone may detect a rustling noise. The system may infer the smartphone is in a user's pocket, in which case it may be pointless to turn on the camera's torch. Still more complex arrangements can employ one or more system modules, together with user history data and/or external resources. For example, the system may determine, by an audio fingerprinting module, an external database, and user history, that the smartphone user has watched 15 minutes of Season 4, Episode 6, of the television show Grey's Anatomy, and that Sara Ramirez—the actress who plays surgeon Callie Tones—is one of the user's favorite actresses, causing the smartphone to present a link to Ramirez's Wikipedia entry high in a list of menu options displayed to the user during this part of the episode.)

It will be recognized that the efficacy of recognition is highly affected by the speed of the RAs and the middleware. A variety of improvements can be taken in this regard.

Each RA can be modeled with a Receiver Operating Curve at a given aggregate platform utilization profile. Ideally a mobile device profile for each instance of an RA is employed to inform system design.

The Digimarc image watermark RA is optimized for the iPhone platform by implementing the FFT, log-polar, and non-linear filtering stages in assembly language to take advantage of the NEON registers in the iPhone's A4 processor.

The image watermark RA processes 128×128-pixel blocks with a depth of 8 bits, and it can run as a single-block or 4-block detector. In a single-block embodiment, the execution time of the NEON implementation decreased by 20% for both marked and unmarked frames, as shows as the table below. Increased rejection speed for unmarked frames yields higher throughput, which in turn increases the rate of recognition attempts by the RA.

| NEON Optimization (milliseconds) | | | |
|---|---|---|---|
| | Baseline | NEON (1 block) | NEON (4 block) |
| Unmarked | 63 ms | 50 ms | 15-20 ms |
| Marked | 177 ms | 140 ms | 140 ms |

The NEON implementation generates particular benefits when the registers' SIMD capability is used to process 4 image blocks concurrently. This 4-block approach enables use of a variety of pre-filters to increase the operational envelope of the RA (discussed below) and thus improve the user experience.

Mobile platforms sometimes offer multiple APIs for a given system service. The choice of API can impact resource utilization and the resulting task mix on the platform. In some instances, the choice may impact the sensor's throughput.

In iOS 4.0, several APIs provide access to the camera. To identify the best approach, an iPhone 4 was instrumented to capture the task mix while the Digimarc Discover application was used in the Print-to-Web usage model.

Figure 18:
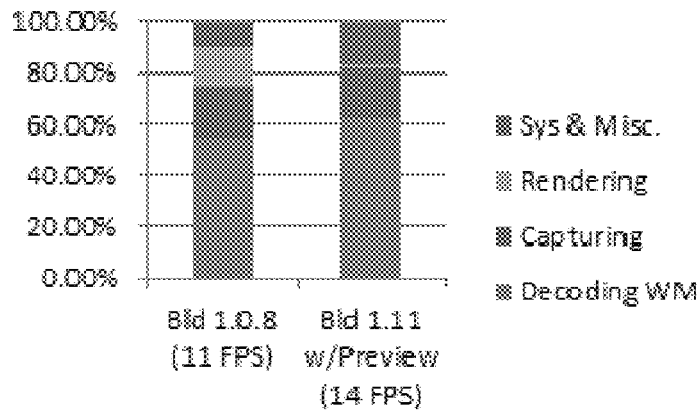
FIG. 18 is a bar chart showing impact of reading image watermarks on system tasks.

FIG. 18 shows the task mix before and after using the Preview API to retrieve image frames (builds 1.0.8 and 1.11, respectively). Using the Preview API dramatically reduces the time spent rendering the frame and frees up time for image watermark recognition (shown as "Decoding WM"). Using the Preview API also allowed other system and application threads more use of the processor.

While affording the OS more time to service other threads is certainly a benefit to the system as a whole, the increase in throughput from 11 to 14 frames per second is of more direct value to the user. The throughput increase also increases the rate of attempts by the RA to recognize an object.

To quantify improvements in user experience, recognition rates can be captured as a function of first-order environmental factors, for a specific user scenario. In addition, throughput can be measured to normalize the recognition rates as a function of time.

The following table shows the results of using optimized RAs with both the iOS 4.0 Preview and UIGetScreenImage APIs to retrieve frames from the iPhone Video Queue. The Preview API implementation yielded material improvements on an iPhone 3GS for all RAs.

| Sustained FPS as Function of Number and Type of Image RA for iOS 3.0 & iOS 4.0 (iPhone3GS) | | |
|---|---|---|
| | iOS 3.0 UIGetScreenImage | iOS 4.0 Preview |
| RA: Image WM | 7 FPS | 9 FPS |
| RA: Barcode | 5 FPS | 8.5 FPS |
| RA: Image WM + Barcode | 4 FPS | 5.1 FPS |

For the Print-to-Web usage scenario, the primary environmental factors are distance to the print, lighting, and pose. To study these factors, a robotic cell was built that repeatedly measures their impacts on recognition rates.

Two versions of the image watermark RA were tested against distance. An "SS" version contains an improved sampling algorithm while a "Base" version does not. The sampling algorithm uses logical sensor data provided by CurrentFocusPosition in the metadata dictionary provided by iOS 4.2.

Figure 19:
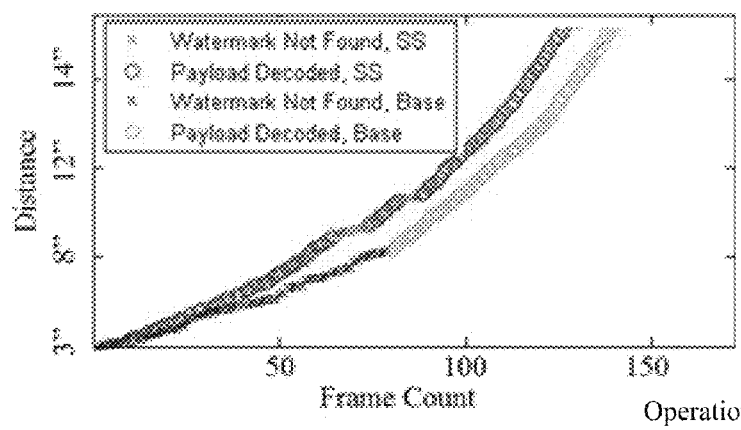
FIG. 19 further details performance of a watermark recognition agent running on an Apple iPhone 4 device.

FIG. 19 displays the results for the two versions, showing which frames resulted in a successfully decoded watermark (or payload) and which did not. The improved sampling algorithm materially increased the range of distances over which the watermark could be detected and the payload recovered.

Together, the results from FIG. 19 and the above table show that combining efficient utilization of system resources with optimized RAs measurably increases the operational envelope of the image watermark RA.

In sum, the detailed Digimarc Discover platform is designed, based on real world usage scenarios, to provide content identification and reduce the associated complexity of building mobile discovery applications. The platform is architected to be extensible and allow the addition or removal of any type of recognition agent without impacting the system. Efficient utilization of operating system resources, and optimization of recognition agents, allows consumer-pleasing system performance. Employing a middleware architecture that handles all audio and video captures reduces latency, facilitates sharing of system resources, reduces power consumption, and diminishes internal contentions. In some implementations this middleware includes a formal inference engine that adapts use of sensors and recognition agents based on user and device context, while others use more informal types of inferencing.

Linked Data as an Atomic Construct of Mobile Discovery

As detailed in application Ser. No. 12/797,503, linked data principles can be used in connection with smartphone data.

Smartphone sensors may be regarded as producing data about context.

One way context data can be stored is by key-value pairs, comprising a label (generally taken from a dictionary) and a datum. (e.g., LAT=45.03; AudioEnvironment=SpokenWord; BatteryLeft=0.107). A drawback to such simple key-value expression is that the computer doesn't understand the labels. It may simply know that the variable LAT conveys a floating point number; the variable AudioEnvironment is a string, etc.

In accordance with another aspect of the present technology, such information is represented in a semantically expressive manner, such as by a collection of data triples in the Resource Description Framework (RDF) knowledge representation language. (Triples typically comprise a subject, predicate (or property), and object.) The RDF schema (RDFS) allows maintenance of a hierarchy of objects and classes. Semantic triples commonly express relationships involving two data elements, or express an attribute concerning a single data element.

In triples, parameters can still be assigned values, but the triples are semantically related to other information—imbuing them with meaning. A variety of ontological models (RDFS, OWL, etc.) can be used to formally describe the semantics of these triples and there their relationship to each other. The LAT (latitude) parameter may still be assigned a floating point datum, but by reference to other triples, the computer can understand that this LAT datum refers to a position on the Earth. Such understanding allows powerful inferencing. (For example, a dataset that places an object at latitude 45 at one instant of time, and at latitude 15 two seconds later, can be understood to be suspect.) Semantic web technologies enable smartphones to reason based on contextual information and other data presented in such form.

Figure 15:
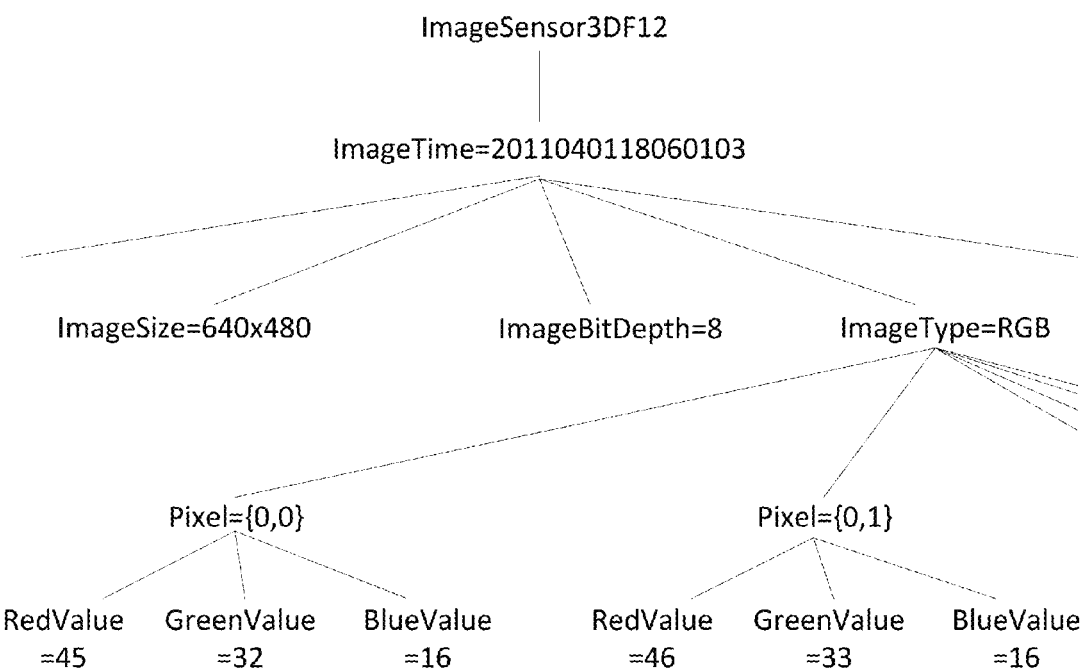
FIG. 15 shows a graph representation of data output from a smartphone camera.

Sensed context triples can be stored in graph form, where a sensor makes a collection of assertions about itself and its output data. One such graph (a tree) is shown in FIG. 15.

Different name-spaces can be used by different sensors, to reduce data collisions. The distinct names can be reflected in each triple assertion, e.g.:
{ImageSensor3DF12_
ImageTime=2011040118060103_Pixel(0,0); HasRedValue; 45}
{ImageSensor3DF12_
ImageTime=2011040118060103_Pixel(0,0); HasGreen-Value; 32}
Etc. . . . .

Alternatively, a tree structure can include a unique name-space identifier in a root or other fundamental node (as in FIG. 15), and other nodes can then be inferentially so-labeled. Trees have a long history as a data organizing construct, and a rich collection of tree-related techniques (e.g., sorting, pruning, memory optimization, etc.) can be applied.

A blackboard data structure can serve as a database for RDF triples. In an extreme case, every pixel location in a captured image is expressed as one or more triples. In a particular implementation, sensor systems are configured to output their data as streams of triples.

Predicates of triples may, themselves, be subjects of other triples. For example, "HasRedValue" is a predicate in the example above, but may also be a subject in a triple like {HasRedValue; IsAttributeOf; Image}. As data is streamed onto the blackboard, coalescing operations can be performed—enabled by such understanding of data types.

Recognition agents, as detailed in application Ser. No. 12/797,503, can use such data triples to trigger, or suspend, their operation. For example, if incoming pixel triples are dark, then no optical recognition agents (e.g., barcode reader, watermark decoder, OCR engine) should be run. Expressing data in fine-grained fashion (e.g., down to the level of triples asserting particular pixel values) allows similarly fine-grained control of recognition agents.

At a higher level of granularity, a triple may provide a pointer to memory that contains a collection of pixels, such as a center 16×16 pixel block within an image frame. Still higher, a triple may provide a pointer to a memory location that stores a frame of imagery. Assertions about the imagery at this memory location can be made through a series of triples, e.g., detailing its size (e.g., 640×480 pixels), its color representation (e.g., YUV), its time of capture, the sensor with which it was captured, the geolocation at which it was captured, etc.

A system processor can then take action on the imagery using the stored assertions. For example, it can respond to a query from a user—or from another system process—to locate a frame of imagery captured from a particular location, or captured at a particular time. The system can then perform an operation (e.g., object recognition) on the thus-identified frame of imagery. In another example, the system can discern how to compute the average luminance of a frame using, in part, knowledge of its form of color representation from stored RDF data. (In a YUV image, Y denotes luminance, so averaging Y across all pixels of a frame yields average luminance. In an RGB image, in contrast, luminance at each pixel is a weighted sum of R, G and B values; these weighted sums can then be averaged across the frame to obtain average luminance.)

Software (e.g., the ICP state machine in application Ser. No. 12/797,503, with the middleware arrangements detailed above) can consider the types of input data useful to different recognition agents, and can configure sensor systems to output data of different types at different times, depending on context.

For example, context may indicate that both a barcode reading agent and a watermark decoding agent should be active. (Such context can include, e.g., geolocation in a retail store; ambient illumination that is above a threshold, and the smartphone held in the user's hand.) The barcode reader may prefer luminance data, but less preferably could use RGB data and derive luminance therefrom. The watermark decoder may require full color imagery, but is indifferent whether it is provided in RGB, YUV, or some other format. The system software can weigh the different needs and preferences of the different recognition agents, and configure the sensor system accordingly. (In some embodiments, middleware serves as a negotiating proxy between different agents, e.g., soliciting preference-scored lists of possible data types, scoring different combinations, and making a selection based on the resultant different scores.)

In the just-noted case, the software would direct the sensor system to output YUV data, since such data is directly suitable for the watermark decoder, and because the Y channel (luminance) data can be directly used by the barcode reader.

In addition to physical sensors, smartphones may be regarded as having logical sensors. Logical sensors may both consume context data, and produce context data, and typically comprise software processes—either on the smartphone, or in the cloud. Examples run a wide gamut, from code that performs early-stage recognition (e.g., here's a blob of pixels that appear to be related; here's a circular shape), to full-on inference driven sensors that report the current activity of the user (e.g., Tony is walking, etc.).

Such context data again can be stored as a simple graph, where the logical sensor makes one or more assertions about the subject (e.g., subject=Smartphone_Owner_Tony; predicate=Engaged_in_Activity; object=Walking) SPARQL can be used to access triples in the database, enabling detailed queries to be maintained.

Logical sensors can naturally use—as inputs—data other than smartphone sensor data and its derivatives. Sensors in the environment, for example, can be sources of input. User calendar data or email data may also be used. (A sound sensed—or an objected viewed—at a time that the user is scheduled to be in a meeting may be indicated as having occurred in the presence of the other meeting attendee(s).) Information obtained from social media networks (e.g., via a Facebook or LinkedIn web API) can similarly be provided as input to a logical sensor, and be reflected in an RDF output triple.

The recognition agents detailed in application Ser. No. 12/797,503 can embody state-machines and associated algorithms to recognize specific content/object types, in support of particular applications. The applications represent goal-driven usage models. They interface with the detailed intuitive computing platform to perform specific tasks, by leveraging one or more recognition agents. E.g., decode a watermark, recognize a song; read a barcode. (The intuitive computing platform detailed in application Ser. No. 12/797, 503 uses sensors to generate context that can inform software agents—both local and in the cloud—about how to better complete their tasks.)

A particular implementation of this technology employs Jena—an open source Java framework for semantic web applications (originally developed by Hewlett-Packard) that provides an RDF API, reading/writing RDF/XML, N3, and N-triples, an OWL API, and a SPARQL query engine. One adaptation of Jena for mobile handsets is μ-Jena, from the Polytechnic of Milan. (Alternative implementations can use Androjena or Mobile RDF.)

The intuitive computing platform detailed in application Ser. No. 12/797,503 manages traffic from applications to the recognition agents, and arbitrates resource contention of both logical and physical sensors. The blackboard data structure can be used to enable such inter-process communication, and maintain information about system status (e.g., battery state).

An example of inter-process communication via the blackboard is a watermark decoder that senses inadequate luminance in captured imagery, and wants the smartphone torch to be turned-on. It may post a triple to the blackboard (instead of making an OS system call) requesting such action. One such triple may be:
{Torch; Queued_Request; On}
Another may be
{WM_Decoder; Requests; Torch_On}

A torch control process (or another process) may monitor the blackboard for such triples, and turn the torch on when same occur. Or, if battery power is low, such a process may wait until two or more recognition agents are waiting for the torch to be illuminated (or until other indicia of urgency is found), and only then turn it on.

The watermark decoder may detect that the torch has been turned on by a SPARQL query that searches the blackboard for a triple indicating that the torch is powered. This query returns a response when the torch is illuminated, un-blocking the watermark decoding agent, and allowing it to run to completion.

Location is another important source of context information (as indicated above), and can similarly be expressed in terms of RDF triples. DBpedia—a linked data expression of information from Wikipedia, and GeoNames, are among the many sources for such data. Phone sensor data (GPS) can be applied to the GeoNames or DBpedia services, to obtain corresponding textual geo-labels.

The context data needn't derive from the user's own smartphone. Low-level sensor information (triples) collected/donated by others using their mobile devices, e.g., in the same locale and time period can be used as well (subject to appropriate privacy safeguards). Likewise with data from nearby stationary sensors, such as road cameras maintained by government entities, etc. (The same locale is, itself context/application dependent, and may comprise, e.g., within a threshold distance—such as 100 m, 1 km or 10 km; within the same geographic entity—such as town or city; etc. Similarly, time-proximity can be threshold-bounded, such as data collected within the past 10 seconds, 10 minutes, hour, etc.). Such information can be directly integrated into the local blackboard so that device agents can operate on the information. In addition to imagery, such data can include audio, samples of wireless signals available in the area to help identify location, etc., etc. Such an "open world" approach to data sharing can add enormously to the smartphone platform's understanding of context.

While the foregoing focuses on representation of context and sensor data in linked data fashion, other smartphone data can similarly benefit.

For example, in application Ser. No. 13/079,327, applicants detailed how machine-readable data in printed text can be sensed and used to link to associated information, both "tool tip" pop-up texts, and enlarged stores of related information. For example, when scanning a page of newspaper classified advertising with a camera-phone, the smartphone display may present short synopses of advertisements as the phone passes over them (e.g., "1967 Mustang"). The particular newspaper being read is context information, and identifying issue information is deduced from the first watermark payload decoded from the page. From this context, appropriate pop-up texts for the entire newspaper are pulled from a remote data store, and cached on the phone for later use. Such pop-up texts can be transmitted, and/or stored, in the form of triples (e.g., {Watermark 14DA3; HasPopUpText; 1967 Mustang}).

Another implementation of linked data in smartphone applications is detailed in Zander et al, "Context-Driven RDF Data Replication on Mobile Devices," Proc. Of the 6$^{th}$ Int'l Conf. on Semantic Systems, 2010. Although Zander's work is focused on context-informed replication of structured Semantic Web data from remote sources to mobile devices, for use by local software agents, the detailed systems illustrate other aspects of linked data utilization in smartphones. Features and details from Zander's work can be applied in connection with applicants' inventive work, and vice versa.

An excerpt copied from application Ser. No. 12/797,503 concerning RDF-related technology, follows:

Linked Data

In accordance with another aspect of the present technology, Web 2.0 notions of data and resources (e.g., in connection with Linked Data) are used with tangible objects and/or related keyvector data, and associated information.

Linked data refers to arrangements promoted by Sir Tim Berners Lee for exposing, sharing and connecting data via de-referenceable URIs on the web. (See, e.g., T. B. Lee, Linked Data, www<dot>w3<dot>org/DesignIssues/Linked-Data.html.)

Briefly, URIs are used to identify tangible objects and associated data objects. HTTP URIs are used so that these objects can be referred to and looked up ("de-referenced") by people and user agents. When a tangible object is de-referenced, useful information (e.g., structured metadata) about the tangible object is provided. This useful information desirably includes links to other, related URIs—to improve discovery of other related information and tangible objects.

RDF (Resource Description Framework) is commonly used to represent information about resources. RDF describes a resource (e.g., tangible object) as a number of triples, composed of a subject, predicate and object. These triples are sometimes termed assertions.

The subject of the triple is a URI identifying the described resource. The predicate indicates what kind of relation exists between the subject and object. The predicate is typically a URI as well—drawn from a standardized vocabulary relating to a particular domain. The object can be a literal value (e.g., a name or adjective), or it can be the URI of another resource that is somehow related to the subject.

Different knowledge representation languages can be used to express ontologies relating to tangible objects, and associated data. The Web Ontology language (OWL) is one, and uses a semantic model that provides compatibility with the RDF schema. SPARQL is a query language for use with RDF expressions—allowing a query to consist of triple patterns, together with conjunctions, disjunctions, and optional patterns.

According to this aspect of the present technology, items of data captured and produced by mobile devices are each assigned a unique and persistent identifier. These data include elemental keyvectors, segmented shapes, recognized objects, information obtained about these items, etc. Each of these data is enrolled in a cloud-based registry system, which also supports related routing functions. (The data objects, themselves, may also be pushed to the cloud for long term storage.) Related assertions concerning the data are provided to the registry from the mobile device. Thus, each data object known to the local device is instantiated via data in the cloud.

A user may sweep a camera, capturing imagery. All objects (and related data) gathered, processed and/or identified through such action are assigned identifiers, and persist in the cloud. A day or a year later, another user can make assertions against such objects (e.g., that a tree is a white oak, etc.). Even a quick camera glance at a particular place, at a particular time, is memorialized indefinitely in the cloud. Such content, in this elemental cloud-based form, can be an organizing construct for collaboration.

Naming of the data can be assigned by the cloud-based system. (The cloud based system can report the assigned names back to the originating mobile device.) Information identifying the data as known to the mobile device (e.g., clump ID, or UID, noted above) can be provided to the cloud-based registry, and can be memorialized in the cloud as another assertion about the data.

A partial view of data maintained by a cloud-based registry can include:

her particular context and history, information that her phone earlier provided to the registry in connection with building-related image data may be richer in information about the building, including information about its address and some tenants. By similarities in geolocation information and shape information, the building about which Jane's phone provided information can be identified as likely the same building about which John's phone provided information. (A new assertion can be added to the cloud registry, expressly relating Jane's building assertions with John's, and vice-versa.) If John's phone has requested the registry to do so (and if relevant privacy safeguards permit), the registry can send to John's phone the assertions about the building provided by Jane's phone. The underlying mechanism at work here may be regarded as mediated crowd-sourcing, wherein assertions are created within the policy and business-rule framework that participants subscribe too.

Locations (e.g., determined by place, and optionally also by time) that have a rich set of assertions associated with them provide for new discovery experiences. A mobile device can provide a simple assertion, such as GPS location and current time, as an entry point from which to start a search or discovery experience within the linked data, or other data repository.

It should also be noted that access or navigation of assertions in the cloud can be influenced by sensors on the mobile device. For example, John may be permitted to link to Jane's assertions regarding the building only if he is within a specific proximity of the building as determined by GPS or other sensors (e.g., 10 m, 30 m, 100 m, 300 m, etc.). This may be further limited to the case where John either needs to be stationary, or traveling at a walking pace as determined by GPS, accelerometers/gyroscopes or other sensors (e.g., less than 100 feet, or 300 feet, per minute). Such restrictions based on data from sensors in the mobile device can reduce

| Subject | Predicate | Object |
| --- | --- | --- |
| TangibleObject#HouseID6789 | Has_the_Color | Blue |
| TangibleObject#HouseID6789 | Has_the_Geolocation | 45.51N 122.67W |
| TangibleObject#HouseID6789 | Belongs_to_the_Neighborhood | Sellwood |
| TangibleObject#HouseID6789 | Belongs_to_the_City | Portland |
| TangibleObject#HouseID6789 | Belongs_to_the_Zip_Code | 97211 |
| TangibleObject#HouseID6789 | Belongs_to_the_Owner | Jane A. Doe |
| TangibleObject#HouseID6789 | Is_Physically_Adjacent_To | TangibleObject#HouseID6790 |
| ImageData#94D6BDFA623 | Was_Provided_From_Device | iPhone 3Gs DD69886 |
| ImageData#94D6BDFA623 | Was_Captured_at_Time | November 30, 2009, 8:32:16 pm |
| ImageData#94D6BDFA623 | Was_Captured_at_Place | 45.51N 122.67W |
| ImageData#94D6BDFA623 | Was_Captured_While_Facing | 5.3 degrees E of N |
| ImageData#94D6BDFA623 | Was_Produced_by_Algorithm | Canny |
| ImageData#94D6BDFA623 | Corresponds_to_Item | Barcode |
| ImageData#94D6BDFA623 | Corresponds_to_Item | Soup can |

Thus, in this aspect, the mobile device provides data allowing the cloud-based registry to instantiate plural software objects (e.g., RDF triples) for each item of data the mobile device processes, and/or for each physical object or feature found in its camera's field of view. Numerous assertions can be made about each (I am Canny data; I am based on imagery captured at a certain place and time; I am a highly textured, blue object that is visible looking north from latitude X, longitude/Y, etc.).

Importantly, these attributes can be linked with data posted by other devices—allowing for the acquisition and discovery of new information not discernible by a user's device from available image data and context alone.

For example, John's phone may recognize a shape as a building, but not able to discern its street address, or learn its tenants. Jane, however, may work in the building. Due to unwanted or less relevant assertions (e.g., spam, such as advertising), and provide some security against remote or drive-by (or fly-by) mining of data. (Various arrangements can be employed to combat spoofing of GPS or other sensor data.)

Similarly, assertions stored in the cloud may be accessed (or new assertions about subjects may be made) only when the two involved parties share some trait, such as proximity in geolocation, time, social network linkage, etc. (The latter can be demonstrated by reference to a social network data store, such as Facebook or LinkedIn, showing that John is socially linked to Jane, e.g., as friends.) Such use of geolocation and time parallels social conventions, i.e. when large groups of people gather, spontaneous interaction that occurs can be rewarding as there is a high likelihood that the members of the group have a common interest, trait, etc. Ability to access, and post, assertions, and the enablement of new discovery experiences based on the presence of others follows this model.

Location is a frequent clue that sets of image data are related. Others can be used as well.

Consider an elephant researcher. Known elephants (e.g., in a preserve) are commonly named, and are identified by facial features (including scars, wrinkles and tusks). The researcher's smart phone may submit facial feature vectors for an elephant to a university database, which exists to associate facial vectors with an elephant's name. However, when such facial vector information is submitted to the cloud-based registry, a greater wealth of information may be revealed, e.g., dates and locations of prior sightings, the names of other researchers who have viewed the elephant, etc. Again, once correspondence between data sets is discerned, this fact can be memorialized by the addition of further assertions to the registry.

It will be recognized that such cloud-based repositories of assertions about stimuli sensed by cameras, microphones and other sensors of mobile devices may quickly comprise enormous stores of globally useful information, especially when related with information in other linked data systems (a few of which are detailed at linkeddata<dot>org). Since the understanding expressed by the stored assertions reflects, in part, the profiles and histories of the individual users whose devices contribute such information, the knowledge base is particularly rich. (Google's index of the web may look small by comparison.)

(In connection with identification of tangible objects, a potentially useful vocabulary is the AKT (Advanced Knowledge Technologies) ontology. It has, as its top level, the class "Thing," under which are two sub-classes: "Tangible-Thing" and "Intangible-Thing." "Tangible-Thing" includes everything from software to sub-atomic particles, both real and imaginary (e.g., Mickey Mouse's car). "Tangible-Thing" has subclasses including "Location," "Geographical-Region," "Person," "Transportation-Device," and "Information-Bearing-Object." This vocabulary can be extended to provide identification for objects expected to be encountered in connection with the present technology.)

Mixed-Domain Displays

In accordance with another aspect of the present technology, a smartphone presents a display that includes both natural imagery captured by the camera, as well as transform-domain information (e.g., in the spatial-frequency, or Fourier, domain) based on camera-captured imagery.

Application Ser. No. 12/774,512, filed May 5, 2010, details illustrative reference signals that can be encoded into imagery to aid a steganographic watermark detector in determining whether a watermark is present. The detailed reference signals are encoded in the spatial-frequency domain—at sufficiently high frequencies, and with a chrominance—that causes them to be imperceptible to casual human viewers.

Embodiments of the present technology reveal this transform domain-based information to the viewer.

Figure 11:
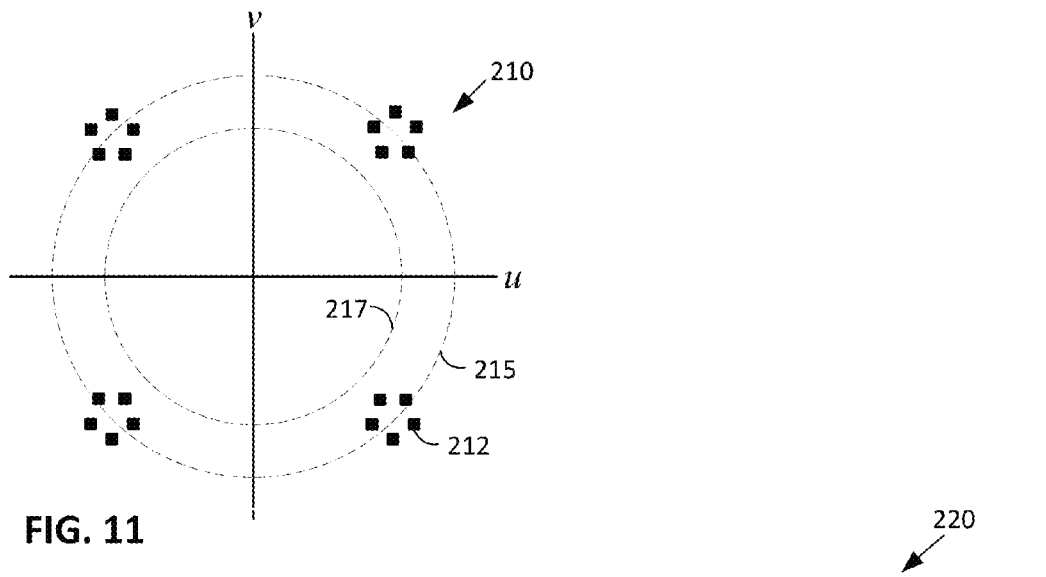
FIG. 11 shows marker signals in a spatial-frequency domain.

FIG. 11 shows an exemplary spatial-frequency domain view of a reference signal 210 that is added to printed host imagery, with the real components represented by the horizontal axis, and the imaginary components represented by the vertical axis (the so-called "u,v" plane). The illustrated reference signal comprises pentagonal constellations 212 of spatial domain impulses at frequencies (i.e., distances from the origin) that are too high for humans to perceive, but that are detectable in data produced by the image sensor in a smartphone camera. (The corresponding spatial-frequency domain view of the host imagery is not shown, but would typically comprise signal scattered throughout the u, v plane, but mostly concentrated along the horizontal and vertical axes.)

In the FIG. 11 view, the markers 215 are centered on a circle 215. The limit of human vision is shown by a smaller circle 217. Features composed of spatial-frequency components outside of circle 217 (e.g., markers 212) are too high in frequency to be discernible to human viewers. (If the markers 212 were lower in spatial-frequency, they would correspond to a pixel pattern that is akin to a fine herringbone weave. At higher frequencies, however, the eye can't distinguish a weave pattern. Rather, the weave dissolves into apparent flatness.)

While four pentagonal marker constellations 212 are shown, of course a lesser or greater number can also be used. Similarly, the markers needn't be pentagonal in form.

When a smartphone camera detects reference pattern 210, it can thereby discern the relative distance between the camera and the printed object, and any rotation and tilt of the camera relative to the object. For example, if the camera is moved closer to the object, the enlarged image components are sensed as having lower component spatial frequencies. Thus, the pentagonal markers move closer to the origin. If the camera is rotated (relative to the orientation at which the reference signal was originally encoded in the host imagery), the pentagonal markers appear similarly rotated. If the camera is tilted—so that part of the printed imagery is closer to the sensor than other parts of the printed imagery—the pattern of pentagons is skewed. (No longer do their centers 214 fall on a circle 215 centered about the u,v origin; instead, they fall on an ellipse.)

Figure 12:
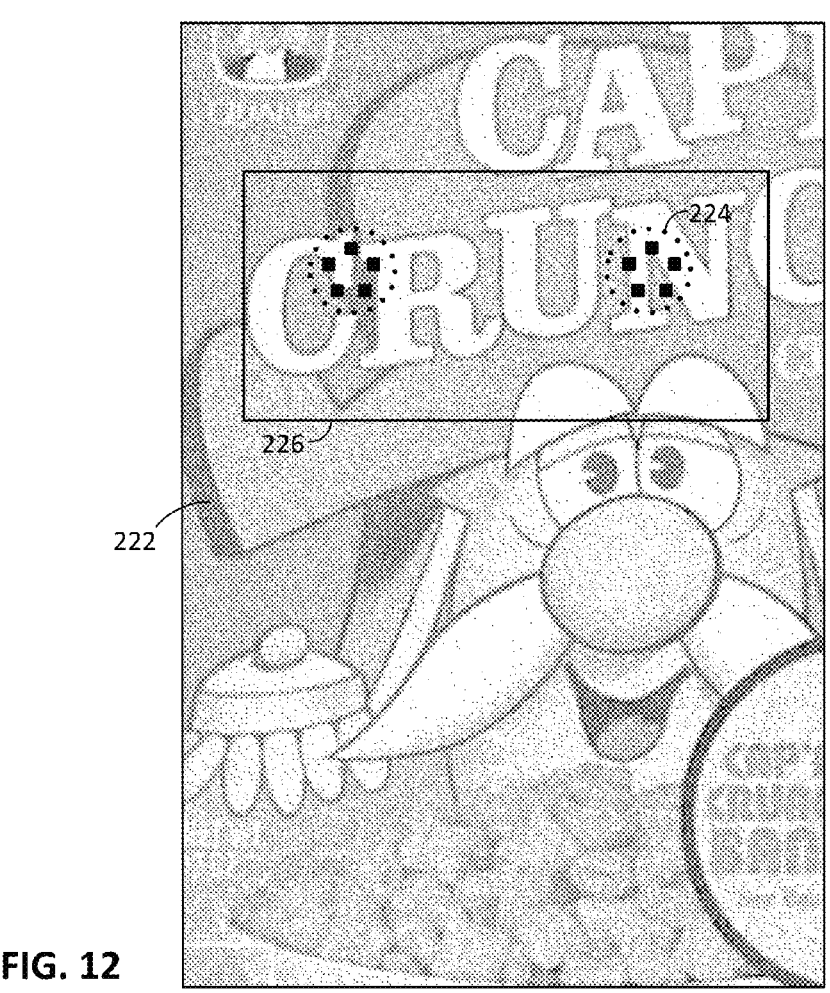
FIG. 12 shows a mixed-domain view of a printed object that includes the marker signals of FIG. 11, according to one aspect of the present technology.

FIG. 12 shows an exemplary smartphone display 220. In this illustration, the smartphone is imaging part of a cereal box—the artwork 222 of which occupies most of the screen. Superimposed on the screen is a half-plane depiction of the detected reference signal, including the top two pentagonal reference markers. The illustrated display also includes two fixed target regions 224—outlined in circular dashed lines. By moving the phone towards or away from the cereal box, and tilting/rotating as necessary, the user can cause the pentagonal markers 212 to move into the two targeting regions 224. At this position, reading of the watermark signal from the cereal box is optimized. The smartphone will read the watermark immediately (likely before the markers are aligned in the targeting regions), and the phone will take a corresponding action in response to the detected data.

Desirably, the transform domain overlay is presented at a visibility (strength) that varies with strength of the detected reference signal. If no reference signal is detected (e.g., by a detection metric output by a pattern detector), then no overlay is presented. With stronger signals, the overlaid marker signals are presented with greater contrast—compared to the background image 222. In some embodiments, the markers are presented with coloration that varies in chrominance or luminosity, depending on strength of the detected reference signal.

In one particular implementation, the spatial-frequency representation of the captured imagery is thresholded, so that any spatial-frequency component below a threshold value is not displayed. This prevents the display from being degraded by a Fourier domain representation of the captured cereal box artwork 222. Instead, the only overlaid signal corresponds to the marker signals.

Similarly, the spatial-frequency data may be high-pass spectrally-filtered, so only image components that are above a threshold spatial frequency (e.g., the spatial frequency indicated by circle 217 in FIG. 11) are shown.

The circular target regions 224 are not essential. Other visual guides can be presented, or they can be omitted entirely. In the latter case, the user may be instructed to position the phone so that the markers 224 are even (i.e., horizontally-across). If the transformed data is spectrally-filtered (as described in the preceding paragraph), then the user may be instructed to position the phone towards- or away-from the subject until the markers just appear. (In actual practice, the five points of the markers 212 look a bit like little pixie figures—a head, two hands and two feet, especially when rendered in color. The user can thus be instructed to "look for the pixie people." Their appearance can be made particularly noticeable by giving the five component elements of each marker different colors, and change the colors over time—yielding an engaging, shimmering effect.)

In the particular embodiment depicted in FIG. 12, the spatial-frequency information is shown in a rectangular box 226. In addition to serving as a frame for the spatial-frequency information, this box also serves to define a rectangular sub-region of pixels within the artwork 222, on which the transform domain analysis is performed. That is, instead of converting the entire frame of imagery into the Fourier domain, only those pixels within the box 226 are so-converted. This reduces the burden on the phone processor. (The box 226 may be regarded as the fovea region—the sub-region of pixels on which the processor focuses its attention as it helps the user optimally position the phone.) The luminance of pixels in region 226 can be slightly increased or decreased—to further highlight the region to the user.

Watermark-Cueing Patterns

Digital watermarks are normally imperceptible. This is desirable because they can be encoded into fine artwork and other graphics without introducing any visible change. However, this advantage has an associated disadvantage: potential users of the encoded data are uncertain whether any watermarked data is present.

In the past, this disadvantage has sometimes been redressed by use of a small visual logo, printed at a corner of the encoded visual artwork, to indicate that the artwork is watermark-encoded.

In accordance with another aspect of the present technology, the presence of digitally watermarked information is visually cued by making the visual watermark pattern subtly visible.

As noted in the preceding section, if the spatial-frequency elements comprising a watermark are low enough in frequency, they produce a pattern akin to a weave (e.g., a herringbone weave, in the case of regular pentagonal markers). In some applications, such a woven background pattern is not objectionable. Background patterns are familiar from many contexts (e.g., on printed bank checks). So especially in the case of documents that don't include glossy photographs, a pattern can be inserted without impairing the utility of the document.

Users can learn or be trained, over time, to recognize certain recurring patterns as evidencing the presence of associated data. (Consider, for example, how the presentation of blue underlined text in an on-line document is familiar to most users as signifying a hyperlink) Smartphone-based systems can be used to capture imagery of such distinctive patterns, decode the watermarked information, and take corresponding action(s).

In one particular embodiment, such a watermark includes a first set of spatial frequency components that are within the range of human vision (i.e., inside circle 217 of FIG. 11), and a second set of spatial frequency components that are beyond the range of human vision (i.e., outside circle 217 of FIG. 11).

The former can include components that are pseudo-randomly distributed in the u,v plane to define a corresponding pattern in the pixel domain that is akin to the surface appearance of handmade paper—which commonly includes a random pattern based on the distribution of pulp fibers in such paper. This first set of spatial frequency components can be used repeatedly across all types of documents—producing a characteristic pattern that users can eventually come to recognize as clueing the presence of encoded information. (The color of the pattern may be varied as best suits the application, by putting the spatial frequency components in different color channels.) This consistent pattern can be used by the smartphone watermark detector (1) to quickly identify the presence of a watermark, and optionally (2) to determine translation, scale and/or rotation of the captured imagery—relative to its originally encoded state.

The second set of spatial frequency components, in this particular embodiment, conveys some or all of the watermark payload information. This information varies from document to document. However, because these image components are not visible to humans in casual viewing circumstances, such variability does not interfere with the characteristic texture pattern by which users recognize the document as including encoded information.

Just as colored, underlined text has become associated in people's minds with hyperlinked information, so too can distinctive visible patterns become associated with the presence of digitally watermarked information.

Figure 13:
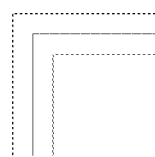
FIG. 13 shows a corner marker that can be used to indicate hidden data.

The clueing pattern may even take the form of a distinctive script or typeface—used to indicate the presence of hidden information. For example, a font may include serifs that include a distinctive extension feature—such as a curl or twist or knot on the right side. Or, printing that includes encoded watermark data may include a distinctive border. One is a framing rectangle defined by three fine lines. Another is a set of two- or four-similar corner markers—such as the one shown in FIG. 13.

(In some arrangements, such a border- or corner-marking is not present in the original physical medium, but is rendered as an on-screen graphic overlay that is triggered by smartphone detection of a signal (e.g., the FIG. 11 or 14 signal) encoded in the medium. In a particular arrangement, the lines of such overlaid marking are rendered in a somewhat blurred fashion if the smartphone is at a sub-optimal viewing pose, and are increasingly rendered in-focus as the user moves the smartphone to a more optimum viewing pose. When the phone is positioned optimally (e.g., with plan view of the watermarked subject, at a distance of six inches), then the lines are presented in crisp, sharp form. Thus, software in the phone translates information about the optimality of the viewing pose into a visual paradigm that is somewhat familiar to certain users—the dependence of focus on distance.)

Layers of Information Presentation

In some implementations, there may be three conceptual "layers" through which information is presented to a user. These may be termed the visual, flag, and link layers.

The visual layer is a human-perceptible clue that there is digital watermark information present. As just-noted, these can take different forms. One is a logo, typeface, border, or other printed indicia that indicates the presence of encoded information. Another is a visible artifact (e.g., weave-like patterning) that is introduced in printed content as part of the watermarking process.

The flag layer is an indicia (typically transitory) that is presented to the user as a consequence of some initial digital image processing. One example is the "pixie people" referenced above. Another is the "proto-baubles" discussed in application Ser. No. 12/797,503. Others are discussed in application Ser. No. 12/774,512. The flag layer serves as a first glimmer of electronic recognition that there is, in fact, a watermark present. (The flag layer may optionally serve as an aid to guide the user in positioning the smartphone camera for an optimized watermark read.)

The link layer comprises the information presented to the user after the watermark is decoded. This commonly involves indexing a resolver database with a decoded watermark payload (e.g., a large number) to learn what behavior is associated with that watermark, and then initiating that behavior.

Encoded Data Translation

In accordance with a further aspect of the present technology, devices that receive watermark-encoded media signals can act to decode the watermark data, and relay it onward by another data channel.

Consider a television, set-top box, or other device that receives video entertainment programming. The audio and/or video of the programming may be encoded with digital watermark information, e.g., that identifies the program. A consumer may be using a smartphone or tablet computer while watching the video programming on the television, and it may be advantageous for the smartphone/computer to know the identity of the program being viewed (e.g., for reasons detailed in patent publications 20100119208 and 20100205628). In the prior art, this has been accomplished—for watermarks encoded in program audio—by capturing ambient audio using a microphone in the smartphone or computer, and then decoding the watermark data from the captured audio. However, this is sometimes made difficult by other sounds that may also be captured by the microphone and that may interfere with reliable watermark decoding.

In accordance with this aspect of the present technology, a first device (e.g., a television or set-top box) decodes watermark data from a content stream. It then relays this data—by a different channel—to a second device (e.g., a smartphone).

In one illustrative embodiment, a decoder in a television receives programming and decodes, from the audio component, an audio watermark. It then re-transmits the decoded watermark data to nearby smartphones via Bluetooth wireless technology. These smartphones thus receive the watermark data (using their built-in Bluetooth receivers) free of ambient room noise interference.

Another wireless data channel by which decoded watermark information can be relayed is the NFC radio protocol (which presently operates at 13.56 MHz). Although NFC systems typically include a receiver (e.g., a smartphone) that acts to power a nearby passive NFC chip/emitter by magnetic coupling, and then receive a resulting weak RF response emitted by the chip, the same smartphone NFC circuitry can receive signals that are transmitted by a powered 13 MHz transmitter—with which a television, set-top box, or other device may be equipped. The lowest standard NFC data rate, 106 kbits/second, is more than adequate for watermark-relating service (and is sufficiently broadband to allow highly redundant error-correction coding of the relayed data—if desired).

Still another data channel for relaying decoded watermark data between devices is WiFi, e.g., according to the 802.11b, 802.11g, or 802.11n standards.

Yet another data channel is IR communications—such as the sort by which televisions and remote controls commonly communicate. In this application, however, the television (or set-top box, etc.) is typically the emitter of the IR radiation, rather than the receiver. IR communications systems commonly use a wavelength of 940 nm. The data is communicated by modulating a carrier signal, e.g., 36 KHz, in the case of the popular RC-5 protocol. In this protocol, each button on a remote control corresponds to a 14-bit code transmission, with which the carrier signal is modulated when the button is pressed. Watermark data can be conveyed in similar fashion, e.g., by using groups of 14-bit codes (thereby allowing existing decoding hardware to be adapted for such use).

In one particular system, the television (or set-top box) advertises—to other devices—the availability of decoded watermark data using the Bonjour service. As detailed in publication 20100205628, Bonjour is an implementation of Zeroconf—a service discovery protocol. Bonjour locates devices on a local network, and identifies services that each offers, using multicast Domain Name System service records. This software is built into the Apple MAC OS X operating system, and is also included in the Apple "Remote" application for the iPhone, where it is used to establish connections to iTunes libraries via WiFi. Bonjour is also used by TiVo to locate digital video recorders and shared media libraries. Using Bonjour, the first device advises other devices on the network of the availability of the watermark data, and provides parameters allowing the other devices to obtain such data.

The foregoing principles can also be employed in connection with media fingerprints (rather than watermarks). A first device (e.g., a television or set-top box) can derive fingerprint data from received media content, and then communicate the fingerprint data to a second device via another data channel. (Alternatively, the first device may send the fingerprint data to a database system. The database system tries to find a close match among stored reference data, to thereby access metadata associated with the fingerprint-identified content. This metadata can then be sent back to the originating first device. This first device, in turn, relays this metadata on to the second device via the data channel.)

Smartphone-Aided Personal Shopping Service

In accordance with still another aspect of the present technology, a smartphone is used in connection with a personal shopping service.

Consider a service-oriented retail establishment—such as the Apple stores found in certain shopping districts. A consumer browsing in such a store may use a smartphone to express curiosity about a product (e.g., a MacBook Pro computer). This may involve capturing an image of the MacBook Pro, or otherwise sensing identification information (e.g., from an RFID or NFC chip on the device, or from a barcode or watermark on associated signage). The smartphone sends a signal to a service indicating the consumer's interest. For example, the phone may wirelessly (e.g., by WiFi or Bluetooth) send the image, or the sensed identification information, to a back office store computer that is running shopper service application software.

With the transmitted product information, the phone also sends to the back office computer an identifier of the consumer. This consumer identifier can be a name, telephone number, Apple customer number (e.g., iTunes login identifier), or Facebook (or other social network) login identifier, etc. The shopper service application software then retrieves profile information, if any, associated with that shopper. This profile information can include the person's history with Apple—including purchasing history, a list of registered Apple software, and information about other shopper-Apple encounters.

The shopper service application software enters the consumer in a queue for personal service. If there are several customers ahead in the queue, the software predicts the wait time the shopper will likely experience before service, and sends this information to the consumer (e.g., by a text message to the user's phone).

If there will be a delay before the store can assign a personal shopping assistant to the customer, the store may provide the customer (e.g., the customer's smartphone or other computer device) with engaging content to help pass the time. For example, the store may grant the shopper unlimited listening/viewing rights to songs, video and other media available from the iTunes media store. Free downloads of a limited number of content items may be granted. Such privileges may continue while the shopper remains in or near the store.

When a personal shopping assistant is available to help the customer, the software sends the shopper an alert, including the assistant's name, and a picture of the assistant. Previously, a distilled version of the shopper's profile information—giving highlights in abbreviated textual form—was provided to the shopping assistant (e.g., to the assistant's smartphone), to give background information that may help the assistant provide better service. The assistant then approaches the customer, and greets him or her by name—ready to answer any questions about the MacBook Pro.

The queue for personal service may not be strictly first-come, first-served. Instead, shoppers with a history of Apple purchases may be given priority—and bumped ahead of others in the queue, in accordance with the value of their past Apple purchases. The shopper service software applies some safeguards to assure that new customers are not always bumped down in priority each time an existing Apple customer enters the store. For example, the queue may be managed so that a limited number of priority customers (e.g., two) is granted placement in the queue ahead of a new customer. After two priority customers are bumped ahead of the new customer, the next priority customer is inserted in the queue after the new customer (but ahead of other new customers who have not yet been twice-bumped).

Queue management can depend on factors in addition to (or other than) past transaction history with Apple. Mining of public and commercial databases allows compilation of useful demographic profile information about most shoppers. If the shopper service computer determines that a customer who just entered the store appears to be the DMV registrant of a late-model Lexus automobile, that customer may be given a priority position in the queue ahead of an earlier customer who, DMV records indicate, drives an old Yugo. (Or, the store may adopt the opposite policy.)

In addition to managing customer service, in part, based on Apple transactional information, and on data gleaned from public and commercial databases, such decisions can be similarly based on information voluntarily provided by the customer. For example, "digital wallet" technology allows individuals to easily share certain demographic and other profile information about themselves, from their smartphone or other device, to others—including to retail establishments. A customer's position in a customer service queue may be based on such self-revealed information. Consumers may find that, the more information they make available about themselves, the better customer service they are provided.

The foregoing functionality may be implemented via an application program downloaded to the customer's smartphone, or as a web service to which the customer is directed. Or, much of the functionality may be implemented by text (picture) messaging arrangements—with the store optionally providing links that invoke other standard smartphone software (e.g., a web browser or iTunes software).

Convenient Compatibility Determinations

In accordance with a further aspect of the present technology, a smartphone is used to quickly identify accessories that are useful with certain electronic devices.

An illustrative scenario is a shopper who enters an electronics retailer, such as Fry's, looking for a protective case for her HTC Thunderbolt smartphone. The store has a wall of smartphone cases. In the prior art, the shopper would scrutinize each different package—looking for an indication of the smartphone(s) for which that case is suited. This may require removing many of the cases from the wall and turning the packages over—reading fine print. Frustration quickly ensues.

In accordance with this aspect of the present technology, the retailer makes available a software tool, which may be downloaded to the user's smartphone (or other device). Or the tool may be offered as a web service. The user is invited to indicate what they are looking for, such as by a dropdown menu that may include Accessories (cases, chargers, etc.). When the user selects "Accessories," a further dialog inquires about the product for which accessories are sought. The user enters (or selects from a dropdown menu) "HTC Thunderbolt." (The artisan will recognize that this information may be gleaned in many other ways—the particular implementation of this data collection phase can be adapted to the particular store context.)

Once the store software has collected data identifying the customer's mission, as identifying accessories for a HTC Thunderbolt phone, it then searches a database to identify all products in its inventory that are compatible with such device. This may be done by text-searching datasheets for store products, to identify those that have related keywords. Or, the vendors of accessories may make such compatibility information available to the store in a standardized form—such as by a listing of UPC codes, or other such identifiers for each product with which an accessory is compatible.

In one particular implementation, the store downloads a list of identifiers of compatible products to the shopper's device. The software then advises the shopper to physically scan the display of protective smartphone cases (which is found midway down aisle 8B, if the shopper is not already there), and informs the shopper that the phone will display a green light (or output another confirmatory signal) for those accessories compatible with the HTC Thunderbolt.

The scanning mechanism can be of various sorts—again depending on the context. The product packages may each be equipped with an RFID or NFC chip, which serves to electronically identify the product to a smartphone when the phone is brought into close proximity. (NFC readers will soon be standard features of most smartphones.) Or, image recognition techniques can be used. (Although numerous, there is a limited number of protective cases on the wall, each with different packaging. The store computer can download visual fingerprint data, such as SIFT or SURF data, or other characteristic information by which the smartphone can visually identify a particular package from this limited universe, by analysis of streaming camera data.)

In still another arrangement, the smartphone applies imagery captured by its camera to a watermark detector, which extracts plural-bit data encoded into the artwork of the product packaging. Or barcode reading can be used.

As the phone harvests identifiers from nearby products, the previously-downloaded list of identifiers for compatible devices is checked for matches. If the identifier of a scanned product is found among the downloaded list of compatible products, a suitable indication is output to the user.

By such arrangement, the smartphone acts in a manner akin to a Geiger counter. As the customer moves the phone along the displayed protective cases, it issues a signal to draw the customer's attention to particular items of interest (i.e., those cases adapted to protect the HTC Thunderbolt phone). The user can then focus her inquiry on other considerations (e.g., price and aesthetics), rather than puzzling over the basic question of which cases are suitable candidates for purchase.

It will be recognized that the foregoing arrangement is subject to numerous variations, while still providing an interactive guide to compatibility. For example, the store needn't download a list of compatible identifiers to the smartphone. Instead, the smartphone can send sensed identifiers to the store computer, which can then match such identifiers against a list of compatible products. Similarly, a list of compatible products needn't be generated in advance. Instead, the store computer can receive scanned identifiers from the customer's smartphone and then determine, on-the-fly, if the scanned product is compatible (e.g., by then-recalling and checking data associated with that product for an indication that the HTC Thunderbolt phone is one of the products with which it is compatible).

Likewise, the detection of product identifiers from sensed packaging needn't be performed by the phone. For example, camera imagery may be streamed from the phone to the store computer, where it can be processed (e.g., by pattern-, watermark- or barcode-recognition techniques) to obtain an associated identifier.

The identifier needn't be discerned/derived from the product packaging. Shelf tags or other markings can also serve as the basis for product identification.

Depending on the particular implementation, there may be a step of mapping or translating identifiers to determine compatibility. For example, a shelf tag may bear the store's proprietary SKU number. However, the reference data by which compatibility is indicated (e.g., a product's datasheet) may identify products by UPC code. Thus, the system may need to look-up the UPC code from the sensed SKU number in determining compatibility.

Naturally, these principles can be applied to other related product pairings, such as finding a car charger for a video player, finding an obscure battery for a cell phone, or finding a memory card for a camera.

Computational Photography and Subliminal Reference Information

Computational photography refers to image processing techniques that algorithmically alter captured image data to yield images of enhanced form. One example is image deblurring.

Image blur is a particular problem with smartphone cameras, due to the necessarily small size of the camera aperture, which limits the amount of light delivered to the sensor, thus requiring commensurately lengthened exposure times. Lengthened exposure times require the user to hold the camera steady for longer periods—increasing the risk of motion blur. (The light weight of such phones also increases the risk of motion blur—they lack the inertial stability that heavier cameras, such as SLRs, offer.)

Blur can be introduced by phenomena other than motion. For example, lens optics typically focus on subjects within a particular focal plane and depth of field. Objects that are outside the focused field are blurred (so-called "defocus blur").

Blur functions can be characterized mathematically and, once characterized, can be counteracted by application of an inverse function. However, blur functions cannot usually be measured directly; rather, they typically must be estimated and iteratively refined. Recovering the blur function from a blurred image (known as the blind-deconvolution problem) is an uncertain endeavor, since the blurred image alone typically provides only a partial constraint.

To help disambiguate between alternate original images, and better estimate the associated blur function (generally a blur "kernel"), it is helpful to know something about the unblurred original image—a so-called "prior constraint" (or simply, an "image prior").

For example, in published patent application 20090324126, Microsoft researchers observe that imagery is generally characterized by regions of similar coloration. Even if blurred somewhat, these regions tend to retain their same general coloration. Because local image color tends to be invariant to blur, it can serve as an image prior that can be used to help yield a better estimate of the blur function.

Another image prior was used to help sharpen imagery from the Hubble telescope, which originally suffered from mirror deformities that introduced distortion. It was understood that most light sources in the captured imagery were circular disks (or point sources). With this knowledge, candidate corrective blur kernels could be iteratively revised until the processed imagery depicted stars in their original circular disk form. (See, e.g., Coggins, et al, Iterative/Recursive Deconvolution with Application to HST Data," ASP Conference Series, Vol. 61, 1994; and Adorf, "Hubble Space Telescope Image Restoration in its Fourth Year," Inverse Problems, Vol. 11, 639, 1995.)

(Another group of deblurring techniques does not focus on prior information about features of the captured image, but rather concerns technical attributes about the image capture. For example, the earlier-referenced research team at Microsoft equipped cameras with inertial sensors (e.g., accelerometers and gyroscopes) to collect data about camera movement during image exposure. This movement data was then used in estimating a corrective blur kernel. See Joshi et al, "Image Deblurring Using Inertial Measurement Sensors," SIGGRAPH '10, Vol 29, No 4, July 2010. (A corresponding patent application is also believed to have been filed, prior to SIGGRAPH.) Although detailed in the context of an SLR with add-on hardware sensors, applicant believes the Microsoft method is suitable for use with smartphones (which increasingly are equipped with 3D accelerometers and gyroscopes; c.f. the Apple iPhone 4.)

In accordance with another aspect of the present technology, known reference information is introduced into scenes that may be imaged by cameras (e.g., smartphones), to provide image priors that allow image enhancement.

Consider the cereal box depicted in FIG. 12. Its artwork is subliminally encoded with marker features that are too high in spatial frequency to be visible to human observers. Yet the form and frequency of these markers are known in advance. (They are typically standardized, in accordance with common watermarking techniques. An example is the Digimarc image watermarking technology, which is provided with Adobe Photoshop.) These markers can thus be used as image priors—allowing imagery of the cereal box to be processed to counteract any motion- or defocus-blur.

The prior information can be used in the spatial-frequency domain (where it appears as pentagonal constellations of impulse functions), or in the pixel domain (where it appears as a characteristic weave pattern—too high in frequency to be discerned by human viewers but detectable from camera-captured imagery).

Using known blind deconvolution techniques, such priors allow iterative refinement of a blur kernel, which can then be applied to counteract any blur in the captured imagery.

An exemplary implementation uses the Richardson-Lucy technique, which dates back to two publications: Richardson, "Bayesian-Based Iterative Method of Image Restoration," J. Opt. Soc. Am. 62, 55-59, 1972; and Lucy, "An Iterative Technique for the Rectification of Observed Distributions," The Astronomical Journal, Vol. 79, No. 6, June, 1974. Such methodology has been refined in succeeding decades. Examples are shown in patent applications by Microsoft and MIT, e.g., 2010123807, 2008240607, 2008025627, 2010074552, and 2009244300.

Most blurring in the pixel domain is manifested more as a reduction in intensity at high frequencies in the Fourier domain—rather than as a blurring in the frequency domain. Hence, the ability to find a sharply defined pattern in the Fourier domain tends to withstand pixel domain blurs—provided the amplitude of the Fourier domain signal is sufficient. The particular amplitude in a particular application can be determined heuristically. If correction of only slight blurs is anticipated (e.g., motion blurs due to small hand jitter in a smartphone camera application), then relatively low amplitude Fourier marker signals can be employed. If more substantial blurring is expected, then stronger marker signals should be used. (The diminution in amplitude can be mitigated by putting the marker(s) relatively lower in frequency, e.g., closer to line 217 in FIG. 11.)

As just-noted, marker signals may be tailored in frequency to optimize their utility with respect to blur compensation. They may also be tailored in form. For example, instead of markers composed of five impulse functions—as in FIG. 11, a blur-redressing marker signal may comprise a lesser number of elements, such as one or two. Similarly, instead of impulse function components, such markers may be comprised of elongated segments, arranged horizontally, vertically, and/or at intermediate angles—to help improve robustness in the presence of motion blur. An example is the pattern 302 shown in FIG. 14.

As detailed in U.S. Pat. No. 6,590,996, a watermark signal can include various sets of signal elements. One set can comprise a set of registration signals. These are encoded relatively strongly, and enable the translation, scale and rotation of the watermarked imagery to be determined. Once these parameters are known, a thus-informed watermark detector can then recover a second set of elements, which are more numerous (and are typically more weakly encoded), that convey most (or all) of the watermark payload data.

Figure 14:
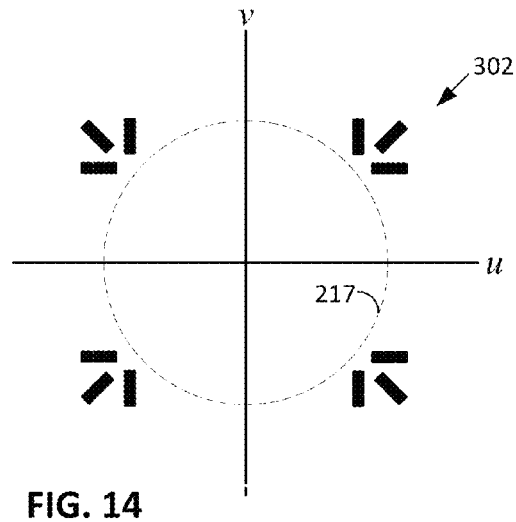
FIG. 14 shows an alternative to the marker signals of FIG. 11.

The marker signals of FIGS. 11 and 14 can be used in a manner like the registration signals of U.S. Pat. No. 6,590, 996, to determine affine parameters about the captured imagery. And they also can serve the dual purpose of providing image priors, for blur correction.

In a particular embodiment, blind deconvolution is applied to a blurred image, using the subliminal markers provided by patterns 210/302 as image priors. Iterative correction is applied to the image to reduce the blur effect—seeking to restore the image to a sharper form. (Assessing the intensity of the blur-corrected Fourier domain marker signals is one metric that can be used.) A watermark reading operation is then performed on the blur-compensated imagery—allowing recovery of the plural-bit payload information. Thus, a virtuous cycle results—the marker signals are useful in deblurring the image, and the resulting deblurred image yields better decoded-watermark results.

In some embodiments, the watermark payload can include various bits that convey statistics about the original imagery. A great variety of image statistics have been used in the prior art as image priors to aid in removing blur. A problem with the prior art, however, is obtaining reliable image statistics—when only a blurred image is available. A digital watermark can provide a channel by which such information can be reliably conveyed, from the image to the deblurring system.

In some embodiments, the marker signals 210/302 can themselves convey information. For example, the phases of the component marker elements can be selectively inverted to convey a limited number of bits. One image statistic that can be conveyed in this manner is average luminance of the original artwork. This statistic offers a constraint that is useful in assessing the accuracy of different iterated blur solutions.

(Different watermark payloads can be encoded in different regions—commonly rectangular tiles—of the artwork. This allows several local statistics to be conveyed. For example, the cereal box artwork depicted in FIG. 12 may comprise an array of 6×4 watermark tiles, allowing statistics for 24 different spatial regions to be conveyed.)

Most images do not include cereal boxes. But watermarked data can be inserted into many common environments, and serve to provide image priors, as described above. For example, carpet and upholstery fabric can include watermark patterns. In any environment in which such a watermark pattern is found, the quality of imagery captured in such environment can be enhanced by the foregoing blur correction techniques. (Other computation photography methods can similarly rely on such watermark signals.)

While most embodiments use watermark signals that are outside the range of human visual perception due to their frequency (e.g., outside circle 217 in FIGS. 11 and 14), in other embodiments a watermark signal may be added that escapes attention because of its chrominance. The human eye, for example, is relatively insensitive to yellow. Thus, known marker patterns may be inserted at lower frequencies, if printed in yellow. Likewise, other inks that are generally outside the realm of human perception, but detectable by image sensors, can also be used.

Looking ahead, online photo repositories such as Filch and Facebook may routinely check uploaded imagery for watermarks. Whenever watermarks are found, the service can employ such signals in computational photography methods to enhance the imagery.

(While described in the context of a post hoc image correction procedure, the same techniques can similarly be employed before or during the image capture process. For example, subliminal marker signals can aid a camera's autofocus system in determining where focus should be established.)

More on Blur

The cited Joshi et al paper teaches how inertial data can be used to refine an estimate of a blur kernel. But a simpler application of inertial data may ultimately be more widely useful.

In one particular arrangement, a smartphone camera captures a sequence of image frames (e.g., in a streaming capture-, or video-mode). During each frame, motion of the phone is sensed—such as by the phone's 3D gyroscope and/or accelerometer. Selected ones of the stream of image frames (i.e., selected based on low phone motion) are then aligned and combined, and output as an enhanced image.

Such an enhanced image can be applied, e.g., to a digital watermark detector. The image enhancement allows the detector to output the decoded information more quickly (since it needn't work as long in recovering marginal signals), and allows for more robust watermark recovery (e.g., decoding despite poor illumination, image corruption, and other challenges).

The selection of image frames that are to be combined can proceed in different fashions. For example, a motion threshold can be set (e.g., in gyroscope-sensed degrees of rotation per second of time), and frames having motion below that threshold can be combined. (Or, in another view, frames having motion above that threshold are disregarded.) The number of frames to be combined can be set in advance (e.g., use the first six frames that meet the threshold criterion), or the technique can utilize all frames in the sequence that pass such test. Another option is to set a threshold in terms of target frame count (e.g., ten), and then select—from the captured sequence of frames—the target number of frames that have the lowest values of motion data (of whatever value).

The combination of frames can be by simple averaging. Or, weighted averaging can be used. The weight assigned to each frame can depend on the associated motion data. Desirably, the weighting is more particularly based on relationships between the frames' respective motion data, so that the "stiller" a frame, the more it contributes to the average. Preferably, if one or more frames have zero motion, they should be given a maximum weight value, and frames with non-zero motion values should be given a zero weight value. One algorithm for establishing such a frame-dependent weighting factor "k" is:

$$k_A = [\text{Motion}(\text{Frame}_{MIN})/\text{Motion}(\text{Frame}_A)]^X$$

where $k_A$ is the weighting factor for Frame "A;" Motion(Frame$_A$) is the motion, in degrees per second, of frame "A"; Motion(Frame$_{MIN}$) is the minimum motion among all of the frames in the selected set, and X is an exponential ratio-ing factor.

In addition to reducing blur, such techniques are also effective for de-noising smartphone-captured imagery.

Hybrid Watermark/Salient Point/Barcode/NFC Arrangements

Earlier-cited application Ser. No. 13/079,327 details an arrangement in which imagery captured from a printed document (e.g., a newspaper) is rendered on a smartphone screen in conjunction with auxiliary information, which is overlaid in geometrically-registered fashion. Published application 20080300011 details related technology.

The preferred embodiments of these just-noted applications discern the pose of the smartphone relative to the page by reference to registration signal components of a watermark signal encoded in the page. The payload of this watermark is used to access a database containing auxiliary information related to the page. This auxiliary information is then overlaid on top of the imagery captured from the page, at a position on the screen that is dependent on the discerned pose.

Earlier-cited application Ser. No. 13/011,618 teaches a somewhat different arrangement, in which the user taps on a portion of an imaged page presented on the smartphone screen. A watermark payload decoded from the captured imagery is sent to a database, which returns page layout information corresponding to the page being viewed. (The page layout data was earlier exported from publishing software used when composing the page, and stored in the database.) By reference to scale and rotation information discerned from registration signal components of the watermark, in conjunction with the retrieved page layout data, the phone determines the coordinates on the physical page indicated by the user's tap (e.g., 4 inches down, and 6 inches to the right, of the upper left corner of the printed page). By reference to these determined page coordinates, auxiliary information relating to that particular portion of the page is identified, and presented on the smartphone screen.

In accordance with another aspect of the present technology, different arrangements for presenting information corresponding to different locations on a printed page—or other object—are utilized.

In one particular embodiment, location of the smartphone relative to the page is not determined by reference to registration components of the watermark signal. Instead, the decoded watermark payload is sent to a remote server (database), which returns information about the page. Unlike application Ser. No. 13/011,618, however, the returned information is not page layout data exported from the publishing software. Instead, the database returns earlier-stored reference data about salient points (features) that are present on the page.

(The salient points may be identified simply in terms of their coordinates on the original page, e.g., by inches down and across from a top corner of the page. Additionally or alternatively, other information—typically feature vectors—can be provided. Instead of identifying individual, unrelated points, the information returned from the database may characterize a constellation of salient points.)

The smartphone can use this knowledge about reference salient points on the page being viewed in various ways. For example, it can identify which particular part of the page is being imaged, by matching salient points identified by the database with salient points found within the phone's field of view.

The auxiliary data presented to the user can also be a function of the salient points. For example, the smartphone can transmit to a remote server a list of the identified salient points that are matched within the phone's field of view. Since this subset serves to precisely localize the region of the page being viewed, auxiliary information corresponding particularly to that region (e.g., corresponding to a particular article of interest to the user) can be returned to the phone. Alternatively, a larger set of auxiliary data, e.g., corresponding to the entirety of the page, or to all pages in the newspaper, can be returned from the database in response to the watermark payload. The smartphone can then select from among this larger set of data, and present only a subset that corresponds to the particular page excerpt being imaged (as determined by salient points). As the user moves the phone to image different parts of the object, different subsets can quickly be presented.

Another way that reference salient points returned by the database can be utilized is in determining the phone's pose relative to the page. The 3D pose of the camera relative to the object, together with the projection of that view through the camera lens, uniquely determines where the salient points appear in the captured image. Given the captured image, and reference data about position of the salient points in a plan view of the object, the 3D pose can be determined. (Accurate determination of pose requires some information about the projection effected by the camera/lens, e.g., the focal length and image format.)

Once the object pose is determined, any overlaid information can be geometrically registered with the underlying imagery, e.g., with a rotation, scale, translation, and/or affine- or perspective-warp that matches the smartphone's view of the page.

(Overlaying information on an image in geometrically-registered fashion, based on salient points, is known from augmented reality. See, e.g., patent documents U.S. Pat. Nos. 7,616,807, 7,359,526, 20030012410 and 20100232727, and the articles: Reitmayr, "Going Out: Robust Model-based Tracking for Outdoor Augmented Reality," Proc. 5$^{th}$ IEEE/ACM Int. Symp. on Mixed and Augmented Reality, 2006, pp. 109-118; and Genc, "Marker-less Tracking for AR: A Learning-Based Approach, Proc. 1st IEEE/ACM Int. Symp. on Mixed and Augmented Reality, 2002, pp. 295-304.)

In one particular arrangement, the database also returns scale and rotation data, related to salient point information provided to the smartphone. For example, the database may return a numeric value useful to indicate which direction is towards the top of the imaged object (i.e., vertical). This value can express, e.g., the angle between vertical, and a line between the first- and last-listed salient points. Similarly, the database may return a numeric value indicating the distance—in inches—between the first- and last-listed salient points, in the scale with which the object (e.g., newspaper) was originally printed. (These simple illustrations are exemplary only, but serve to illustrate the concepts.)

Relatedly, the salient points returned from the database can also serve as guides in sizing and positioning graphical indicia—such as boxes, borders, menus, etc. For example, the smartphone may be instructed to render a bounding box on the phone display—sized just large enough to encompass salient points numbered 5, 32, 44 and 65, with edges parallel to the display edges. The salient points can similarly serve as in-object guideposts by reference to which other information can be sized, or presented.

Still another use of reference salient point information is in determining intrinsic parameters of the camera's lens system, such as focal length. Typically, such specs are available from the manufacturer, or are available in metadata output by the camera (e.g., in EXIF data). However, if unknown, lens parameters can be determined empirically from analysis of images containing known salient points, as is familiar to artisans in the field of photogrammetry. (Others may consult reference works, such as the book by Hartley, "Multiple View Geometry in Computer Vision," Cambridge University Press, 2004, and the thesis by Pollefeys, "Self-Calibration and Metric 3D Reconstruction from Uncalibrated Image Sequences," Catholic University of Leuven, 1999, in implementing such methods.)

In the arrangements described above, the registration components of the watermark signal are not be used; only the payload of the watermark is employed. In such arrangements, other data-conveying mechanisms may alternatively be used, such as barcodes, OCR, Near Field Communication chips (RFIDs), etc.

Consider a printed poster that includes an embedded or attached NFC chip. A smartphone, equipped with a NFC reader, senses a plural-symbol identifier from the NFC chip of the poster—which serves to identify the poster. This poster-identifying information is transmitted by the phone to a database, which returns salient points associated with the poster. The user can then interact with the poster in a position-dependent manner.

For example, instead of presenting response data that is generic to the poster as a whole (i.e., the typical NFC usage model), a user can image different areas of the poster with the smartphone camera. The phone identifies salient points in the captured imagery, and matches them with salient points returned from the database in response to submission of the NFC poster-identifying data. By such arrangement, the smartphone discerns what excerpt of the poster is being imaged (and, if desired, the phone's pose relative to the poster). Auxiliary information particularly corresponding to such excerpt is then presented to the user (as a geometrically-registered screen overlay, if desired). Thus, such a user can be presented one response if viewing a first part of the poster, and a different response if viewing a second part of the poster.

More generally, such salient point methods can serve as highly accurate location determination methods—much finer in resolution than, e.g., GPS. Consider a venue that includes a poster. The position of a fixed point on the poster (e.g., its center) is determined in advance, and such information is stored in a database record identified by the payload of an NFC chip included in the poster (or is encoded as part of the chip's data payload). The position of the reference point may be expressed in various forms, such as latitude/longitude/elevation (geolocation data), or simply by its location relative to salient points of the poster (e.g., at the center of the poster, or the upper left corner). The location data can also include pose information, e.g., the compass direction the poster is facing, and its horizontal and vertical tilt, if any (in degrees). A user sensing this NFC chip obtains the location coordinates of the poster, as well as salient point information relating to the poster artwork, from the database. The smartphone then analyzes imagery captured from the phone's current viewpoint, and discerns the phone's pose relative to the poster (e.g., three inches to right of center, four inches down, and 24 inches from the poster, viewing upward at an inclination of ten degrees, rightward at an angle of 20 degrees, with the phone inclined four degrees clockwise to the poster). By using this salient point-determined pose information, in conjunction with the known position of the poster, the phone's absolute 6D pose is determined.

Naturally, such methods can be used with objects other than posters. And the thus-determined smartphone location can be used in connection with most methods that rely on a location determination.

Salient points—sometimes known as interest points, or local features—are familiar from content-based image retrieval (CBIR) and other image-based technologies. Generally speaking, such points are locations in an image where there is a significant local variation with respect to one or more chosen image features—making such locations distinctive and susceptible to detection. Such features can be based on simple parameters such as luminance, color, texture, etc., or on more complex metrics (e.g., difference of Gaussians). Each salient point can be represented by data indicating its location within the image, the orientation of the point, and/or a feature vector representing information associated with that location. (A feature vector commonly used in SURF implementations comprises 64 data, detailing four values of luminance gradient information for each of 16 different square pixel blocks arrayed around the interest point.)

Salient points may correspond to individual pixels (or sub-pixel locations within an image), but salient point detectors typically focus on 2D structures, such as corners, or consider gradients within square areas of pixels. Salient points are one particular type of local image descriptors. The arrangements detailed above can be used with other such descriptors as well. In a particular implementation, salient points used by the SIFT or SURF algorithms can be used. That is, in response to receipt of a watermark, NFC, or other object identifier from a smartphone, a remote server/database can return a set of SIFT or SURF data corresponding to that object.

(SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293. SURF is related, and is detailed, e.g., in Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008.)

As a preliminary act to the operations described above, reference salient point data for the object is determined (typically by a proprietor or publisher of the object from analysis of a file from which the object is printed), and this data is stored in a database in association with an identifier for that object (e.g., an NFC identifier, or watermark or barcode payload, etc.).

In some arrangements, the salient point data may not be determined and stored in advance. Instead, it may be developed through use, e.g., in a crowdsourced fashion. For example, a user may capture imagery from a poster, decode a watermark payload, and capture salient point information. On querying a database with the watermark payload, the smartphone may find that there is no salient point reference information previously stored for that object. The smartphone may then be requested by the database to provide the information discerned by the phone, to which the smartphone can respond by transferring its salient point information to the database for storage.

The smartphone may additionally send information relating to the phone-object pose. For example, the watermark detector in the phone may provide affine transform parameters characterizing the scale, rotation and translation of its object viewpoint—as determined by reference to the registration signal components included in the watermark signal. Or an image processing algorithm executed by the phone processor may discern at least some aspect(s) of pose information by reference to apparent distortion of a known item depicted within the field of view (e.g., edges of a square 2D barcode). In still other arrangements, the phone may send the database the captured image data, and such pose estimation methods can be performed by a processor associated with the database—rather than at the phone. Or pose data can be determined otherwise (e.g., by acoustic echo techniques, accelerometer/gyroscope/magnetometer sensor data, radio-based location, etc.).

By reference to such pose information, a processor associated with the database can process the phone-submitted salient point information, normalize it to reduce or remove pose-related distortions, and store same as reference data for later use. (Or such normalization may be performed by the smartphone, before providing the salient point information to the database for storage.) This normalized salient point information can then serve as reference information when a second smartphone thereafter queries the database to obtain reference salient point information for that object.

Similarly, data about edges of the object—sensed from the phone-captured imagery, can be stored in the database. Preferably, such information is geometrically related to the salient point information, so that the salient points can serve to indicate, e.g., distances from different edges of the object.

In other embodiments, instead of the database returning earlier-stored reference data about salient points (features) that are present on the page, a copy of the page imagery itself can be returned—with or without associated salient point data.

More information about salient point-based systems is presented in the following sections. The details of embodiments described in such sections can be incorporated into the above-described arrangements, and vice versa.

Salient Points and Watermark Detection

Watermark detection commonly proceeds by first estimating translation, rotation and scale of the watermarked object by reference to registration signal components of the watermark (e.g., a known constellation of impulses in the spatial frequency domain). The captured imagery is next processed to remove these estimated affine distortions. Finally, a watermark decoding algorithm is applied to the processed imagery.

In accordance with another aspect of the present technology, the pose of the imaged object relative to the camera is estimated through use of reference salient points—as discussed above. Once the pose is estimated, corrective adjustments (e.g., affine counter-distortions) are made to the captured imagery to reduce the pose artifacts, yielding a frame of imagery that is normalized to a plan-like view. The watermark decoding algorithm is then applied to the corrected imagery.

On a planar object, a very small set of salient points can suffice for such purpose (e.g., three points). Graphical indicia which are commonly found in printed materials (e.g., a recycling symbol, or company logos, or even square barcodes) are well suited for such purpose. Alternatively, the rectangular outline of a typical magazine page, of typical dimensions, can also suffice.

Salient Points for Image De-Noising

Watermark signals are typically small in amplitude, and can be degraded by image noise—such as arises from low-light exposures. Other image operations similarly suffer from image noise (e.g., fingerprint-based image recognition). Image noise can be decreased by lengthening the exposure interval, but so-doing increases the risk of motion blur.

In accordance with a further aspect of the present technology, multiple image frames of a scene are captured, such as by a smartphone in a video capture mode. Each frame, independently, may have a poor signal-to-noise ratio. This signal-to-noise ratio is improved by geometrically aligning multiple frames by reference to their common salient points, and then averaging the aligned frames. The composite frame thus-obtained is lower in noise than the component frames, yet this advantage is achieved without the risk of motion blur. Such a composite frame can then be submitted to a watermark detector for watermark decoding, or used otherwise.

Such method works by identifying the salient points in each of the frames (e.g., using the SURF technique). Corresponding points are then matched between frames. The movement of the points between frames is used to quantify the transform by which one frame has changed to yield the next. These respective transforms are then reversed to align each of the frames to a common reference (which may be, e.g., the middle frame in a sequence of five frames). The aligned frames are then averaged.

The video capture mode permits certain assumptions that facilitate rapid execution of the method. For example, the frame-to-frame translational movement of salient points is small, so in searching a subject frame to identify a salient point from a prior frame, the entire subject frame needn't be searched. Instead, the search can be limited to a small bounded neighborhood (e.g., 32×32 pixels) centered on the position of the point in the prior frame.

Similarly, because the frame-to-frame rotational transformation of salient points is likely to be small, the feature vectors for the points can omit the customary orientation information.

Likewise, the scale factor of the imagery captured in the sequence of frames is likely to be relatively uniform—again constraining the search space that must be considered in finding matching points.

A particular matching algorithm starts with salient points conventionally identified in first and second frames. An exemplary frame may have 20-400 salient points. For each point in the first frame, a Euclidean distance is computed between its feature vector, and the feature vector of each salient point in the second frame. For each point in the first frame, a point in the second frame with the closest Euclidean distance is identified as a candidate match.

Sometimes, a point in the second frame may be identified as a candidate match to two or more points in the first frame. Such candidate matches are discarded. Also discarded are candidate matches where the computed Euclidean distance exceeds a threshold. (An absolute value threshold may be used, or the algorithm may discard the candidate matches based on the largest ten percent of distance values.) A set of candidate matches remains.

Figure 20:
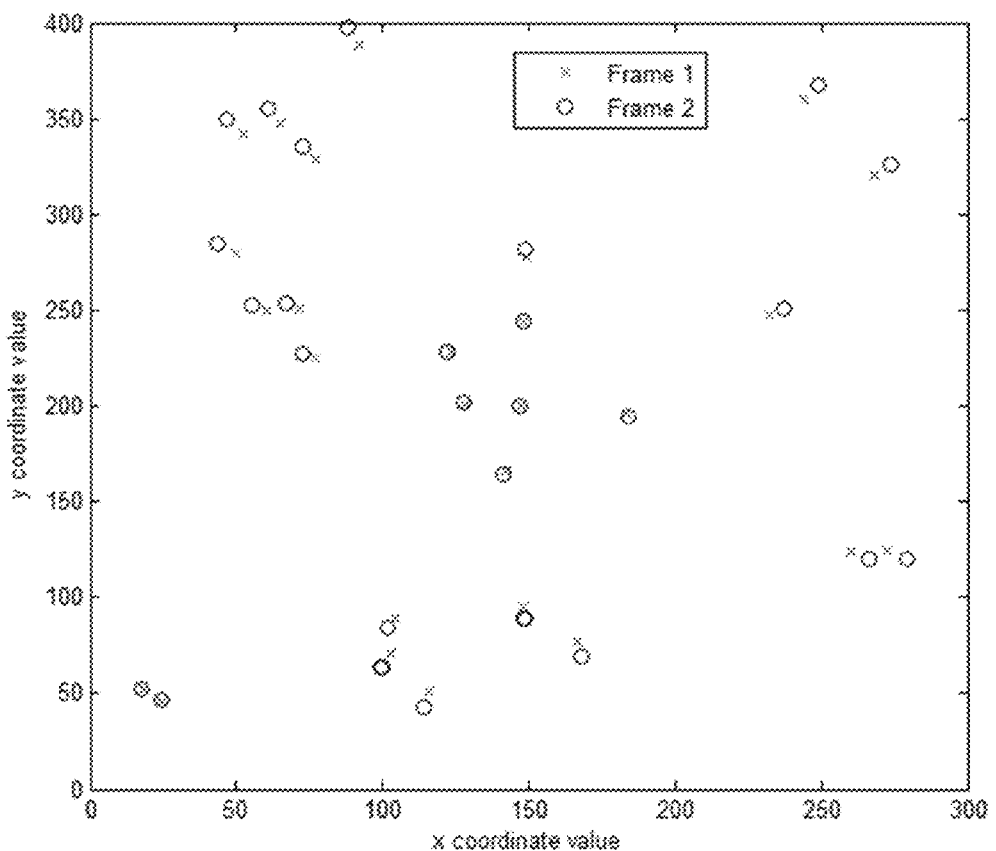
FIG. 20 shows locations of salient points in first and second image frames.

FIG. 20 shows the location of the remaining salient points, in both the first and second frames. As can be seen, points near the center of the frame closely coincide. Further away, there is some shifting—some due to slightly different scale between the two image frames (e.g., the user moved the camera closer to the subject), and some due to translation (e.g., the user jittered the camera a bit).

Figure 21:
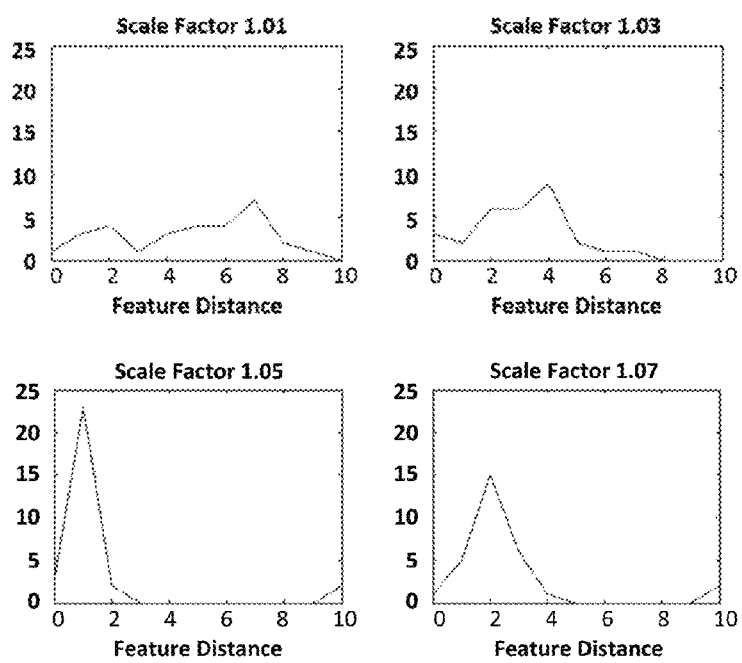
FIG. 21 shows histograms associated with geometric alignment of two frames of salient points.

To a first approximation, the transformation between the first and second frames is characterized by a scale factor, and by a translation (in X- and Y-). Scale is estimated first. This is done by scaling the second frame of remaining salient points by various amounts, and then examining a histogram of distances between the scaled point locations, and their nearest counterparts in the first frame. FIG. 21 shows the results for scale factors of 1.01, 1.03, 1.05, and 1.07. As can be seen, a scale of 1.05 yields the best peak.

The second frame of remaining salient points is then scaled in accordance with the determined scale value (1.05). Distances (in X- and Y-) between the scaled point locations, and their nearest counterparts in the first frame, are then computed, and the median values of X- and Y- offset are then computed. This completes the first approximation of the transformation characterizing the alignment of the second image relative to the first.

This approximation can be further refined, if desired. One suitable technique is by discarding those candidate point-pairs that don't yet align within a threshold distance after applying the determined scale and X-, Y- offsets. An affine transform, based on the determined scale and offsets, is then perturbed in an iterative fashion, to identify a transformation that yields the best least-squares fit between the still-retained candidate points.

In one experiment, 500 frames of a digitally watermarked photograph were captured in low light using a smartphone's video capture mode. Individually, 25% of the 500 frames could be processed to read an encoded digital watermark. A successful watermark read was achieved with one or more frames in each sequence of five frames 49% of the time. If successive groups of five frames were averaged without any alignment, the results dropped to 18%. If, however, each sequence of five frames was aligned and averaged as described above (using the third frame as a reference, against which the others were matched), a successful watermark read was achieved 61% of the time.

Just as the described procedure enhanced the success of watermark reading operations, such processing of multiple image frames—based on salient point alignment and averaging—can similarly yield low-noise, sharp, images for other purposes (including consumer enjoyment).

A related method is detailed in Buades et al, A Note on Multi-Image Denoising, IEEE Int'l Workshop on Local and Non-Local Approximation in Image Processing, 2009. However, this alternative involves a large number of large matrix manipulations, and thus is not as well suited for implementation on mobile phone processors.

Another method that can be used with the foregoing arrangements, or independently, is to note the smartphone's motion sensor data corresponding to the instant that each frame of a video sequence was captured. If the sensor data (e.g., from a 3D accelerometer or gyroscope) indicates movement above a threshold value, then the corresponding frame of imagery can be discarded, and not used in an averaging operation. The threshold can be adaptive, e.g., by discarding two frames out of each sequence of ten having the highest motion values.

(Preliminary studies indicate that the magnitude of hand-held motion varies widely from instant to instant in a hand-held phone—from nil, to relatively large values. By discarding the latter frames, much enhanced results can be achieved.)

Channelized Audio Watermarks

Audio watermarks are increasingly being used to provide network services in association with audio and audio-video content. One example is the Grey's Anatomy Sync application offered by ABC Television, and available for download from the Apple App Store. This iPad app allows viewers of the Grey's Anatomy program to interact with other fans (e.g., by chat functionality), and obtain episode-related content (e.g., actor biographies, quizzes, etc.) in real-time, while watching the program. Similarly, audio watermarks in music content can allow listeners to interact with other fans, and obtain related information.

Audio watermark information is typically woven into the content itself—a very low level, noise-like signal that is inseparable from the audio data. Removal of the watermark typically is very difficult, or impossible.

In accordance with another aspect of the present technology, audio watermark information is conveyed in a separate audio channel, so that such information can be rendered—or not, depending on the desires of the user, or on other circumstances.

One suitable format is Dolby TrueHD, which can convey 24 bit audio in each of 8 discrete audio channels. Another is Microsoft's WAV file format, which now supports multiple audio channels. Yet another is the RF64 format, as specified by the European Broadcasting Union.

An exemplary implementation is a home audio system, using an audiophile's 5.1 or 7.1 surround sound system, with associated watermark data conveyed on an additional channel. By a control on the audio receiver (and/or on a remote control device), the user can instruct whether the watermark channel should be rendered, or not. If rendering is selected, the receiver mixes the watermark data into one or more of the speaker channels (e.g., the front left and right speakers). The amplitude of the watermark is usually not changed in the mixing, but some implementations may additionally give the user some ability to vary the amplitude of the mixed watermark.

Another implementation looks forward to the day that audio is delivered to consumers in the native multi-track form in which it was recorded, allowing users to create their own mixes. (E.g., a consumer who is fond of saxophone may accentuate the saxophone track in a 16-track recording of a band, and may attenuate a drum track, etc.) Again, in such implementation the user is given the opportunity of including the watermark signal in the final audio mix, or leaving it out—depending on whether or not the user plans to utilize network services or other features enabled by the watermark.

In most implementations, a single watermark track is provided. However, multiple tracks can be used. One such embodiment has a basic watermark track, and plural further tracks. Each of the further tracks is a data channel, which specifies an amplitude component of the watermark that should be associated with a corresponding audio (instrument) track. In the example just given, if the drum track is attenuated in amplitude, then it may be desirable to similarly attenuate certain features of the watermark signal that which rely on the drum track for masking. The amplitude data channels are scaled in accordance with the user-set amplitude of the corresponding audio (instrument) track, and the scaled amplitude data from all such channels are then summed to yield a net scale factor for the watermark signal. The watermark signal is then dynamically adjusted in amplitude in accordance with this scale factor (e.g., by multiplying), so that the watermark amplitude optimally corresponds to the amplitudes of the various audio tracks that comprise the aggregate audio.

The tracks of audio can be stored on a computer readable medium from which the consumer electronic device reads them and processes them, as above. Or the tracks may be streamed to the device, such as by a cable or online delivery service, and buffered briefly in a memory before being read and processed.

Disambiguation of Multiple Objects in a Captured Scene

Often a smartphone may capture an image frame that depicts several different objects in a shared context. An example is a department store advertisement that features a variety of products within a single photographic image. Another is a page of classified advertising. Such documents including plural different objects may be referred to as "composite subjects." Often it is desirable for each object that forms part of the composite subject to be associated with a different electronic response (e.g., a corresponding online web page, or other triggered action).

In accordance with a further aspect of the present technology, the foregoing can be achieved by determining an identifier associated with the composite subject, transmitting it to a data store, and receiving in reply an authored page that includes data from which a rendering of some or all of the original composite subject can be produced. This received page can define different clickable (tappable) regions. The user taps on a particular object of interest shown on the rendered page, and the smartphone responds by instituting a response associated with that region, using techniques known in the art (such as via familiar HTML hypertext markup that renders an image as a hyperlink).

In such an arrangement, the image presented on the smartphone screen may not be imagery captured by the smartphone camera. Instead, it typically is a page (file) delivered to the smartphone from a remote store. However, it shows a version of the same composite subject with which the user is interacting (albeit usually in a "plan" view—free from any perspective distortion in the smartphone-captured imagery).

The file delivered to the smartphone may present the composite subject at a native scale/resolution larger than can be conveniently displayed on the smartphone screen at one time. (I.e., the originally-captured imagery may resolve a depicted subject at 50 pixels per inch, whereas the delivered file may provide a resolution of 72 pixels per inch. Thus, a feature on the printed page that might span 10 pixels in the originally-captured imagery may span 14 pixels in the delivered file.) The user can employ known touchscreen gestures, including pinching, swiping, etc., to change the display magnification, and traverse the page to bring a desired excerpt into view. (Due to the large scale/resolution, it may not be possible to present all of the pixels of the delivered file on the screen at one time—absent down-sampling of some sort.) Once a depicted object that is the subject of the user's interest is presented on the display at a convenient size, the user taps it to launch an associated behavior.

Reference was made to determining an identifier associated with the composite subject. This can be done in various ways. In some embodiments, each object depicted in the composite subject is encoded with its own machine readable code (e.g., a digital watermark, barcode, etc.). If any of these is decoded, and its payload is sent to the remote server, the system responds with the same composite page data in return (i.e., multiple input payloads all resolve to the same output page). Alternatively, the entire composite subject may be encoded with a single identifier (e.g., a digital watermark that spans the full composite subject, or a single barcode on a printed page that depicts several objects). Again, the system can respond to transmission of such a single identifier by returning page data for rendering on the smartphone display.

Likewise, individual objects depicted in the composite subject, or other excerpts of the composite subject (including such subject in its entirety) may be recognized by image fingerprint techniques, such as SURF. Again, such identification can map to an identifier for that subject, which can be associated with a corresponding electronic page for rendering.

In still other embodiments, the smartphone may discern an identifier from the composite subject without use of the smartphone camera, e.g., by detecting an identifier from an NFC or RFID chip conveyed by the composite subject, using a corresponding detector.

The electronic page presented on the smartphone for user interaction may visually correspond, to different degrees, with the physical page that launched the experience. In some embodiments, the electronic page may be indistinguishable from the physical page (except, e.g., it may be presented from a different viewpoint, such as from a plan—rather than an oblique—perspective). In other embodiments, the electronic page may be visually similar but not identical. For example, it may be of lower resolution, or it may present the page with a smaller color palette, or with other stylized graphical effect, etc.

Through such arrangements, the system replicates—on a smartphone screen—a version of a composite subject being viewed by the user, but with clickable/tappable regions that link to corresponding resources, or that trigger corresponding behaviors.

It will be recognized that the foregoing arrangement avoids a potential problem: that of a watermark or barcode detector in the smartphone detecting multiple machine-readable indicia within a single frame of imagery, and being unable to discern which one is of particular interest to the user. Instead, the single frame—although it may depict multiple objects—maps to a single electronic page in response. The user can then unambiguously indicate which object is of interest by a tap (or by alternative user interface selection).

A related problem can arise in certain implementations of streaming mode detectors (detailed above). As the user moves the smartphone camera to capture an image of a particular object of interest, the smartphone may capture images of many other objects that form part of the composite subject (about which the user may have no interest), yet the smartphone may decode machine-readable identifiers from each.

In accordance with a further aspect of the present technology, the smartphone may disable operation of certain modules (e.g., watermark and barcode decoders, NFC readers, etc.) when the phone's motion sensors (e.g., accelerometers, gyroscopes and/or magnetometers) indicate more than a threshold degree of motion. For example, if the phone senses movement exceeding two, four or six inches per second, it may suppress operation of such modules. (Some motion occurs just due to natural hand jitter.) The phone may resume module operation when the motion drops below the threshold value, or below a different threshold (e.g., one inch per second). By such arrangement, decoding of unintended identifiers is suppressed.

Print-to-Web Payoffs, e.g., for Newspapers

As indicated, print media—such as newspapers and magazines—can be digitally watermarked to embed hidden payload data. When such payload data is sensed by a suitable watermark detection program on a smartphone (e.g., the Digimarc Discover app), it causes the smartphone to present an associated "payoff," such as to display associated online content.

If a newspaper digitally watermarks a large number of its daily photographs, or a large number of its daily articles, it can become a logistical challenge for the publisher to specify an appropriate payoff for each photograph/article. In the crush of production schedules, some publishers arrange for all of their watermarked images simply to link back to the home page of the publication's online presence (e.g., the www<dot>nytimes<dot>com web page). Alternatively, the publisher may specify that the payoff for a print article is simply the online version of the same article.

Such expedients, however, provide little added value.

In accordance with a further aspect of the present technology, a newspaper article (or image) is associated with a more valuable payoff, with little or no effort.

In one particular embodiment, before the newspaper is delivered to subscribers (but after a watermark ID has been assigned to an article), an operator types a few (e.g., 2-5) keywords that are associated with the article (e.g., Obama, Puerto Rico; or Stanley Cup, Bruins). These keywords are stored in a database at a central computer system, in association with the watermark payload ID with which the article is digitally watermarked. When a viewer thereafter uses the Digimarc Discover app to decode the watermark, and link to a payoff, the payoff is a Google (or other provider, such as Bing) search based on the keywords entered for that article.

In practice, the Google keyword search may be used as a default, or a backstop, payoff, in case the publisher does not specify any other payoff. Thus, in a typical workflow, the keywords are stored in association with the article, and a Google search based on the stored keywords is initially specified as the payoff for the article. Thereafter, however, the newspaper publisher, or the writer of the article, may change the stored data to specify a different payoff. (Sometimes an author-specified online payoff is submitted to the publisher with the article text, in which case this author-specified payoff can be used as the online payoff from the beginning.)

In another embodiment, the keywords are not entered manually, but rather are extracted from the text of the article, e.g., as by tag cloud techniques. One particular tag cloud ranks nouns in an article by frequency—possibly discarding "noise words." Co-occurrence methods can be used to identify phrases of two words or more. The most frequently-occurring terms are stored as article keywords. Such techniques are familiar to artisans.

In yet another arrangement, the system can predict likely keywords based on the article author. A popular sportswriter for the Oregonian commonly writes about the Trailblazers basketball team. Paul Krugman of The New York Times commonly writes about the economy. Google searches based on such keywords can be a suitable default payoff even in the absence of any particular information about their articles' contents.

Still another method extracts semantic information from imagery, such as by pattern matching or facial recognition. For example, known methods can be used to identify depictions of famous people, and familiar landmarks, in newspaper photographs. Names discerned through use of such techniques can be stored as keywords for such photographs.

Discerning the contents of imagery is aided if the automated system has some knowledge of location information relating to the image. The Oregonian newspaper, for example, frequently publishes imagery including faces of local and state officials. Their faces may be difficult to match with reference facial data drawn from faces around the world. However, knowing that such imagery is being published in the Oregonian gives the recognition system a further clue that can be used to identify depicted people/landmarks, i.e., check first for matches with facial data associated with Oregon.

In the foregoing embodiments, automatically-generated keywords may be reviewed by an operator, who can supervise such output and revise same, if the automatically-generated keywords seem inappropriate or inadequate.

Commonly, when a watermark-based print-to-web smartphone app senses a watermark payload, and initiates a link to an online payoff, the app that detected the watermark disappears from the screen, and is replaced by the phone's web browser. This was the case with initial releases of the Digimarc Discover app. In accordance with a preferred implementation of the present technology, however, HTML 5 or Adobe Flash is used to render an associated online payoff (e.g., the cited Google search) as a visual overlay atop the camera view displayed by the watermark reading app—without leaving that app context.

In a particular implementation, a database at the central computer system associates watermark payload IDs with details of associated payoffs. This database may be maintained by the newspaper publisher, or by another party. For each watermark payload ID there is an associated database record, which contains the keywords for that article (or photograph). The database record also specifies an HTML 5 template. When the database is interrogated by the smartphone app, which provides a decoded watermark ID, the database pulls the HTML 5 template, inserts the associated keywords, and returns it to the smartphone. The smartphone app then renders the screen display in accordance with the returned HTML template. (Alternatively, the database may query Google with the keywords, and return to the smartphone a completed form of the HTML page, which already has the Google search results included.)

It may be desirable to bound the Google results that are presented to the user. For example, it may be awkward if the online payoff from a New York Times article led the reader to articles in competing newspapers. Thus, in a variant embodiment, the Google search that is presented by the smartphone app may be domain-limited, such as to the New York Times web site, and to non-competing domains (e.g., Wikipedia, US government web sites, etc.)

When a reader links from a newspaper article (e.g., about Obama's visit to Puerto Rico) to a corresponding page of keyword-based Google search results, the app can monitor what search result the user thereafter pursues. In the aggregate, such user choices can lead the system to modify the online payoff for that article to better track users' apparent interests.

For example, a Google search with the keywords "Obama" and "Puerto Rico" yields a list of results headed by news reports of his visit (published by The New York Times, The Nation, Al Jazeera, etc.). Lower in the search results, however, is a YouTube link showing Obama dancing at a rally. The HTML 5 code can observe the traffic to and/or from the app, and may indicate to the database which link(s) the user pursues. Based on the number of user who click on the dancing link, the system may revise the payoff so that this result appears higher in the list of search results.

The database may similarly learn of viewer interest in links relating to Obama drinking "cerveza" in Puerto Rico, and eating "platanos."

All of these terms may be added as database keywords, and used as the basis for a search. However, the results may then exclude the formerly top-ranked news accounts. Better, in such instance, is for the database to run plural Google queries—one with the original keywords;" one with those keywords and "dancing;" one with those keywords and "cerveza;" and one with those keywords and "platanos." The remote system can then combine the results—based on indicated user popularity of the different subjects, and return these modified results to smartphones that thereafter link from the article. These later users may then see search results headed by the YouTube video. The order in which the links are presented on the smartphone app can be tailored to correspond to their apparent popularity among the newspaper's readers.

By such arrangement, the newspaper is relieved of the burden of specifying an online payoff for a particular article that will be popular with its readership. Instead, an initial Google search, with subsequent crowd-sourced feedback, allows the system to automatically discern an online payoff that fulfills the demonstrated interests of the audience.

Sometimes, user responses to one article can influence the links that the newspaper associates with a second, related article. Consider an Oregonian edition that includes an article about the politics of Obama's visit to Puerto Rico on page 4, and another human interest story about Obama's visit—including the dancing—on page 5. Traffic analysis may show that many more readers express interest in the page 5 story (by presenting it to their Digimarc Discover app) than express interest in the page 4 story. There may not be enough traffic from the page 4 story to confidently change the online payoff to such story (e.g., in the manner detailed above). However, the central system may perform a semantic comparison of the page 4 article to find—by keyword similarity—what other article(s) in the newspaper is related. By such process, the page 5 article is found to be related to the page 4 article. In such event, the system can present—as a payoff option to readers of the page 4 article—the link(s) that prove most popular with readers of the page 5 article.

Tags Linked to Movable Objects

Further expanding certain of the features detailed above, it will be recognized that objects may be recognized in imagery (e.g., by watermarking or fingerprinting), and the smartphone may present tags (aka icons or baubles) in association with such displayed objects. The association may be "sticky." That is, if the field of view displayed on the smartphone screen is changed, then the displayed tags move with the apparent motion of the objects with which they are respectively associated.

While such behavior provides an intuitive response, the moving tags can prove problematic if the user wishes to tap one, e.g., to trigger an associated action. This typically requires holding the camera with at least one hand, while simultaneously tapping a potentially moving target on the screen.

In accordance with a further aspect of the present technology, a tag associated with a recognized object in displayed imagery is presented in a fixed position on the screen, together with a visual indication linking the tag with the object to which it corresponds.

Figure 32:
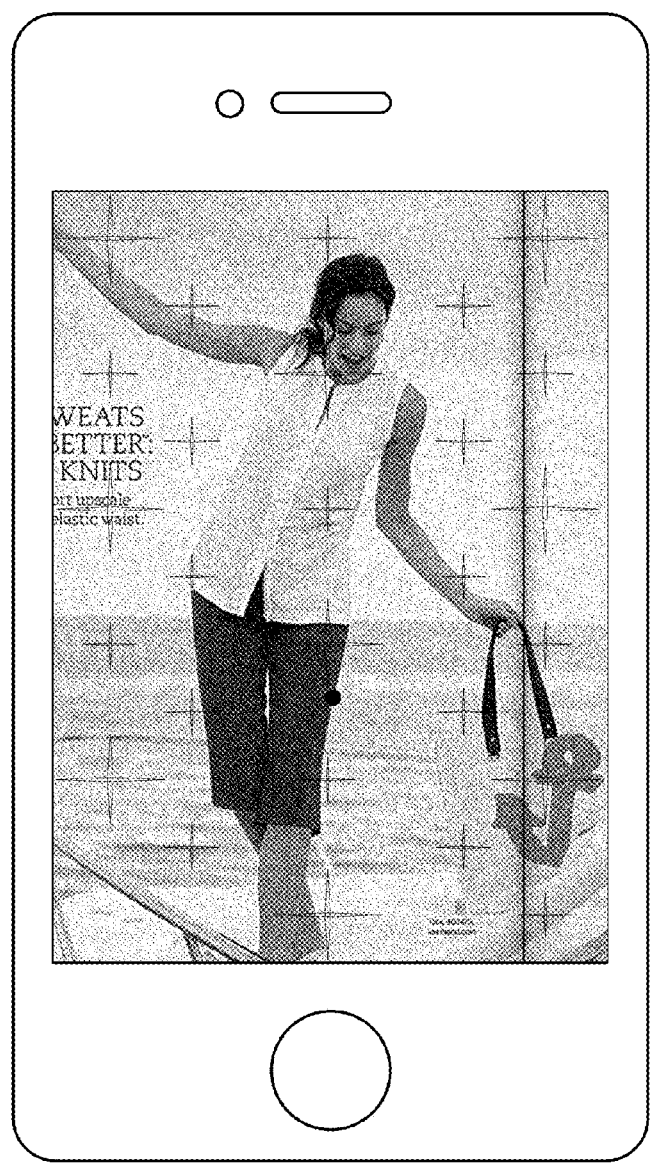
FIG. 32 shows a smartphone displaying an image captured from a catalog page, with a distinctive graphical effect that signals presence of a steganographic digital watermark.

Consider a user pointing a smartphone camera at a printed catalog depicting a woman wearing clothing for sale. If the smartphone concludes that the catalog printing conveys a steganographic digital watermark (e.g., because a watermark calibration or orientation signal exceeding a threshold strength is found within the captured imagery), the smartphone may be programmed to present a distinctive graphical effect on the area of the captured imagery where a watermark seems to be found. This effect may comprise, e.g., shimmering, chrominance or luminance oscillation, overlaid graphical features, etc. FIG. 32 shows one such arrangement. (The overlaid stars vary in brightness or position with a frequency of several Hz—indicating to the user that there is more here than meets the eye. In FIG. 32, the watermark signal was detected across the displayed imagery.)

In response to such distinctive graphical effect, the user may take an action instructing the smartphone to complete a watermark reading operation on the captured imagery. Such action may be a touch screen gesture, a shake of the phone, a touch of a physical button, a spoken command, etc. Alternatively, the phone may operate in a mode in which it automatically undertakes watermark reading whenever a possible watermark signal is detected.

In the FIG. 32 arrangement, the smartphone completes a watermark reading operation. It then transmits the decoded watermark payload to a remote database station/web service. The remote database station uses the received watermark payload to access a database record containing associated information, which it then transmits back to the smartphone.

Figure 33:
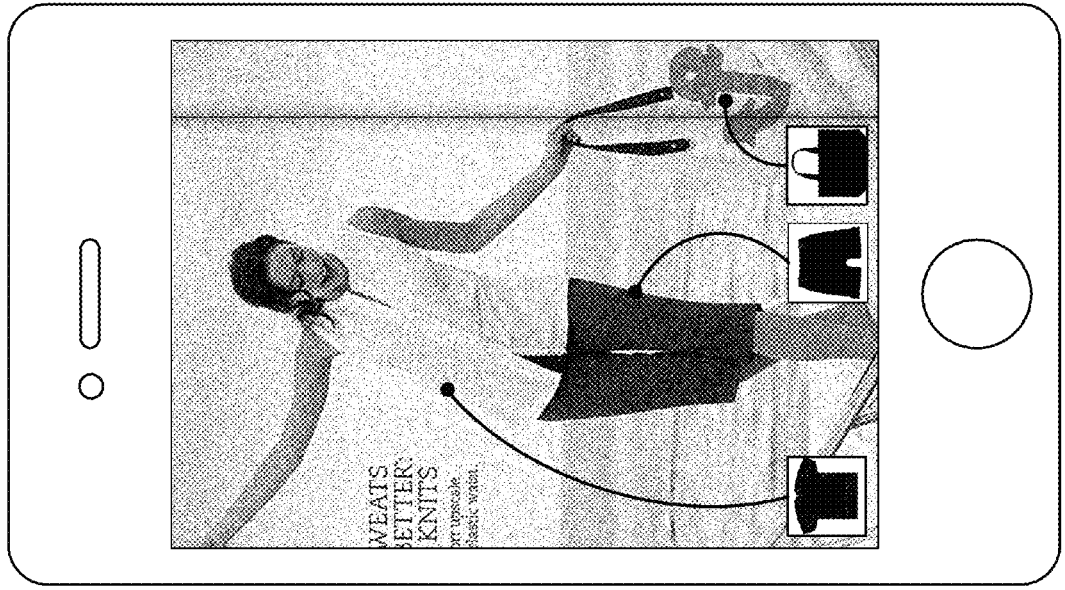

In the depicted arrangement, this information returned to the smartphone causes the phone to present a display like that shown in FIG. 33. That is, the smartphone spawns three tags at the bottom edge of the screen—where they can be conveniently tapped with the user's thumb. One tag corresponds to the blouse worn by the woman depicted in the captured imagery; a second corresponds to the woman's shorts; and the third corresponds to the woman's handbag.

In FIG. 33, there are two types of visual indications that conceptually link each tag with a corresponding object. One is a tether line, extending from the tag to the object. Another is an object-customized tag.

Figure 34:
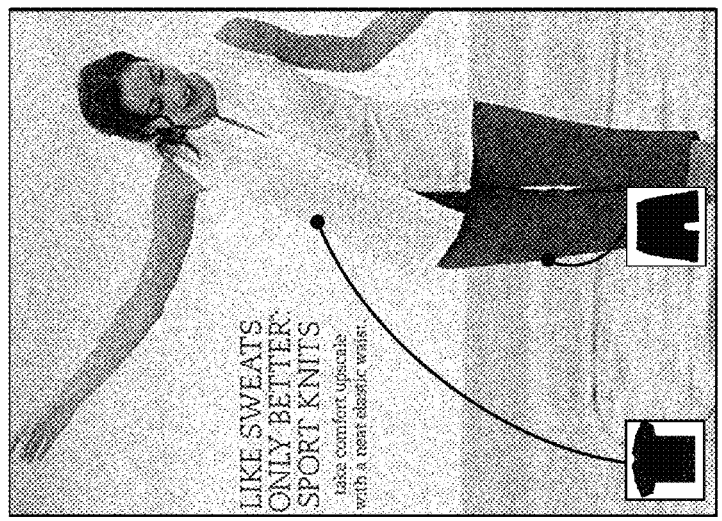
FIGS. 33 and 34 show how a smartphone can spawn tags, presented along an edge of the display, associated with different items in the display.

Concerning the tether line, if the camera is moved, causing an object to move within the screen display, the tag desirably remains fixed at the bottom edge of the screen, together with the bottom end of the associated tether line. However, the top end of the tether line moves to track the object, and to maintain a persistent visual association between the object and the tag. This can be seen by contrasting FIGS. 33 and 34. The user has moved the smartphone between these two Figures, yielding a different view of the catalog page. The woman wearing the blouse and shorts has moved rightward in the displayed field of view, and the handbag has moved out of sight. The blouse and shorts tags, however, remain stationary at the bottom of the screen. The tops of the tether lines move to track the moving blouse and shorts objects. (The tag for the handbag, which has moved out of sight of the camera, disappears in FIG. 34.)

The depicted tether line arrangement thus employs a dual form of iconography. One follows the object (i.e., the tether line), and the other is stationary (i.e., the tag).

As indicated, the second visual indication linking each tag to a respective object is the distinctive graphical tag artwork indicating the nature of the object to which it corresponds. It will be recognized that in the depicted arrangement, the tether lines are not needed, because the distinctive tags, alone, symbolize the different object in the image (blouse, shorts and handbag)—providing the requisite visual indication of association. But in other embodiments, the tags can be generic and identical to each other, in which case the tether lines provide a suitable visual association.

(Many other forms of visual indication—to associate tags with image objects—can be substituted for the two types shown. One other form is to highlight, or outline, an image object in a color, and then provide a tag of the same color at the edge of the smartphone display. Different colors can be used to associate different objects with different tags.)

Figure 35:
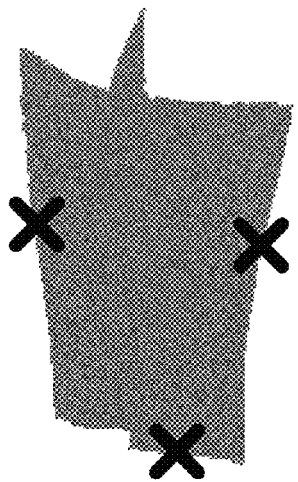
FIG. 35 shows information retrieved from a database relating to a watermark-identified catalog page (i.e., object handles for an object shape).

Behind the scenes, in a particular embodiment, the watermark payload (or fingerprint data) sent to the web service enables access to a database record containing information about the particular catalog, and page, being viewed. The information returned from the database may include reference image data characterizing particular features in the image. This information may comprise one or more thumbnail images or maps—defining the different object shapes (blouse, shorts, handbag, etc.). Additionally, or alternatively, this information may comprise image fingerprint data, such as data identifying features by which the depicted object(s) may be recognized and tracked. Additionally, or alternatively, this information may comprise data defining object "handles"—locations in or at the edges of the object shapes where the upper ends of the tether lines can terminate. FIG. 35 shows one such shape (for the shorts) that defines three handle locations (indicated by "X"s).

It will be recognized that, in this particular example, the information returned from the database is typically authored by a publisher of the catalog. The publisher specifies that the FIG. 32 image includes three objects that should be provided with user-selectable interactivity, via linked tags. Information about the three objects is stored in the database and provided to the phone (e.g., shape data, like FIG. 35, or fingerprint data—such as SURF), allowing these objects to be pattern-matched and tracked as the view moves, and the attachment handle points are identified. The publisher-specified data further defines the particular icon shapes that are to be presented at the bottom of the screen in association with the three different objects.

When the tags are first overlaid on the captured imagery, as in FIG. 33, the software may analyze the bottom edge of the imagery to identify where to best place the tags. This decision can be based on evaluation of different candidate locations, such as by identifying edges within that region of the imagery. Desirably, the tags should not be placed over strong edges, as this placement may obscure perceptually relevant features of the captured imagery. Better to place the tags over relatively "quiet," or uniform, parts of the image—devoid of strong edges and other perceptually salient features, where the obstruction will likely matter less. Once a tag is initially placed, however, it is desirably left in that location—even if the underlying captured imagery shifts—so as to ease user interaction with such tag. If the imagery shifts, the tops of the tether lines desirably follow the moving features—stretching and repositioning as needed, akin to rubber bands. (In some cases, moving of tags may be required, such as when additional objects come into view—necessitating the presentation of additional tags. In such instance, the software seeks to maintain the original tags in as close to their original positions as possible, while still accommodating new tags. This may involve making the original tags smaller in size.)

Tether line(s), if used, are routed using an algorithm that identifies a simple curved path from the tag to the nearest handle on the corresponding object. Different paths, to different object handles, can be evaluated, and a selection of a route can be based on certain criteria (e g., minimizing crossings of strong edges; crossing strong edges at near a 90 degree angle—if unavoidable; identifying a route that yields a curve having a visually pleasing range—such as a curve angle of close to 25 degrees; identifying a route that approaches a handle on the edge of the object from outside the object, etc.) The color of a tether line may be adapted based on the captured imagery over which it is overlaid, so as to provide suitable contrast. As the camera's field of view shifts, the tether line route and color may be re-evaluated, and such line may terminate at a different handle on a given object in some circumstances. (This is the case, e.g., with the tether line connecting the shorts to the corresponding icon. In FIG. 33, a handle on the right side of the woman's shorts is employed; in FIG. 34, a handle on the left side is used.)

Figure 36:
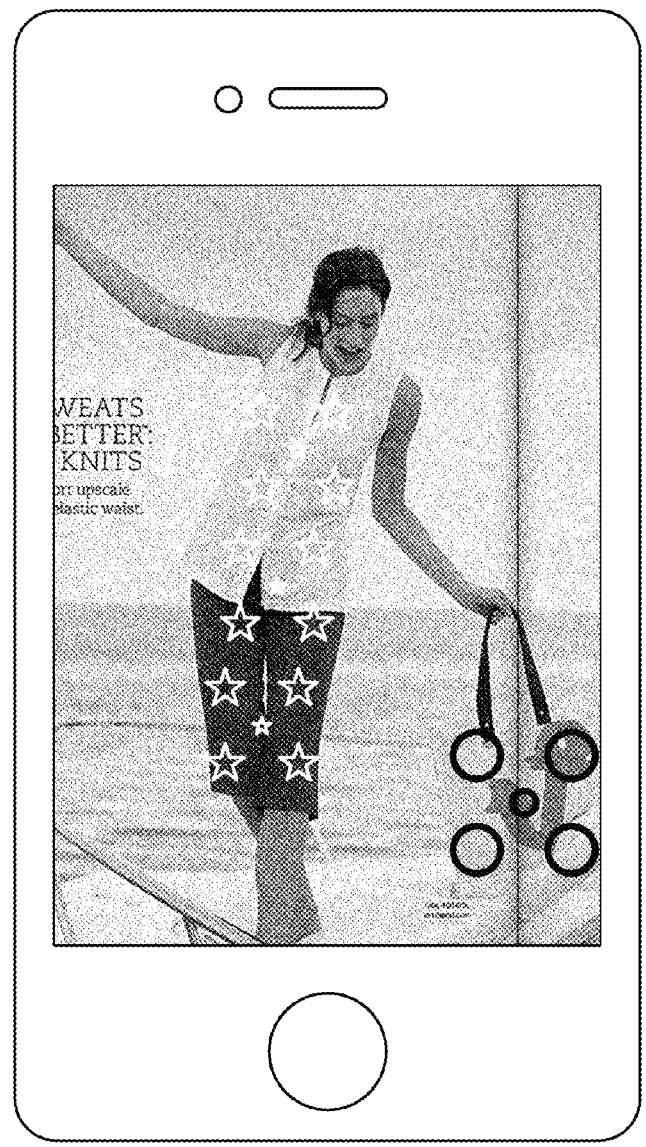
FIG. 36 shows how detection of different watermarks in different regions of imagery can be signaled to a user.

If the camera field of view encompasses several distinctly-watermarked objects, an indication of watermark detection can be presented over each of the objects. Such an arrangement is shown conceptually in FIG. 36, when the smartphone detects one watermark encoded in the region of imagery encompassing the woman's clothing, and another encoded in the region of imagery encompassing her handbag. Here, the smartphone modifies the region of imagery depicting the woman's shorts and blouse to present one particular graphical effect (shown as an overlaid star pattern), and it modifies the region of imagery depicting the woman's handbag to present a different graphical effect (shown as overlaid circles).

The graphical effect presented by the smartphone when evidence of a digital watermark is detected can have any appearance—far beyond those noted above. In one particular arrangement, a software API may be activated by such detection, and output the pixel coordinates of the apparent center of the watermarked region (perhaps with other information, such as radius, or vertical and horizontal extent, or vector area description). The API, or other software, may fetch a software script that defines what graphical effect should be presented for this particular watermark (e.g., for this payload, or for a watermark found in this area). The script can provide effects such as a magnifying glass, bubbles, wobbles, fire animation, etc., etc.—localized to the region where the API reports the watermark appears to be located.

In one particular embodiment, as soon as such a regional watermark is detected, the smartphone begins to display on the screen a tether line starting in, or at the edge of, the watermarked region, and animates the line to snake towards the edge of the screen. By the time the extending line reaches the edge, the smartphone has sent the decoded watermark to the remote database, and received in response information allowing it to finalize an appropriate display response—such as presenting a handbag icon where the animated line ends. (It may also snap the upper end of the line to a handle point defined by the received information.)

In the case of fingerprint-based image-object identification, there is typically no shimmering or other graphical effect to alert the user of interactivity associated with the presented imagery. And behavior like that described above would normally not be launched automatically, since there is no image feature to trigger it. (Some implementations, however, may use other triggers, such as barcodes or RFID/NFC-sensed data.) Instead, the user would initiate such action by a user instruction. In response, the phone transmits the imagery (or fingerprint data based thereon) to a remote system/web service. The remote system computes a fingerprint (if not already provided by the phone), and seeks to identify a matching reference fingerprint in a database. If a match is found, associated information in the database serves to identify the object/scene depicted by the imagery (e.g., a particular catalog and page). Once such identification has been performed, the behavior detailed above can proceed.

As described above, when the camera field of view is moved so that the handbag is no longer shown, the corresponding handbag tag is removed from the bottom of the screen. In other embodiments, the user can take an action that the smartphone interprets as a command to freeze the currently-displayed image view, and/or maintain the presently-displayed tags on the screen. Such functionality allows the user to point the camera at a catalog page to obtain the corresponding tags, and thereafter reposition the phone to a more convenient position for interacting with the image/tags.

While described in the context of captured imagery, it will be recognized that these embodiments, and those elsewhere in this specification, can be implemented with imagery obtained otherwise, such as received from a storage device, or from across a network.

Similarly, while object identification is performed in the detailed arrangement by watermarking (or image fingerprinting), other embodiments can be based on other forms of identification, such as barcodes, glyphs, RFID/NFC chips, etc.

Smartphone Hardware and RDF Triples

Smartphones are increasingly being equipped with graphics processing units (GPUs) to speed the rendering of complex screen displays, e.g., for gaming, video, and other image-intensive applications.

GPU chips are processor chips characterized by multiple processing cores, and an instruction set that is commonly optimized for graphics. In typical use, each core is dedicated to a small neighborhood of pixel values within an image, e.g., to perform processing that applies a visual effect, such as shading, fog, affine transformation, etc. GPUs are usually also optimized to accelerate exchange of image data between such processing cores and associated memory, such as RGB frame buffers. (Image data processed by GPUs is commonly expressed in three component planes, such as Red/Green/Blue, or YUV.) In addition to providing plural planes of integer data storage, frame buffers also differ from program storage memory in that frame buffers are configured to enable rapid swapping of buffered data to the device screen for display (e.g., by appropriate interface hardware). The pixel size of a frame buffer usually has a 1:1 correspondence with the pixel size of the display screen (e.g., a smartphone with a 960×640 pixel display screen would commonly have one or more 960×640 frame buffers).

While GPUs had their genesis in speeding graphics processing, they also have been applied to other uses. In the wider field of general purpose GPUs (GPGPU), such devices are now used in applications ranging from speech recognition to protein folding calculations. Many mainframe supercomputers rely on GPUs for massive parallelism. Increasingly, GPU vendors, such as NVIDIA, are providing software tools that allow specified functions from a normal "C" language computer program to be run on their GPU-equipped video cards.

In accordance with another aspect of the present technology, certain embodiments repurpose smartphone hardware provided for graphics purposes (e.g., GPUs and RGB frame buffers) for use instead with RDF triples, such as for searching and semantic reasoning.

(Semantic Reasoning is Sometimes Defined as Discerning (e.g., Inferring) Logical Consequences Based on a Set of Asserted Facts.)

Figure 22:
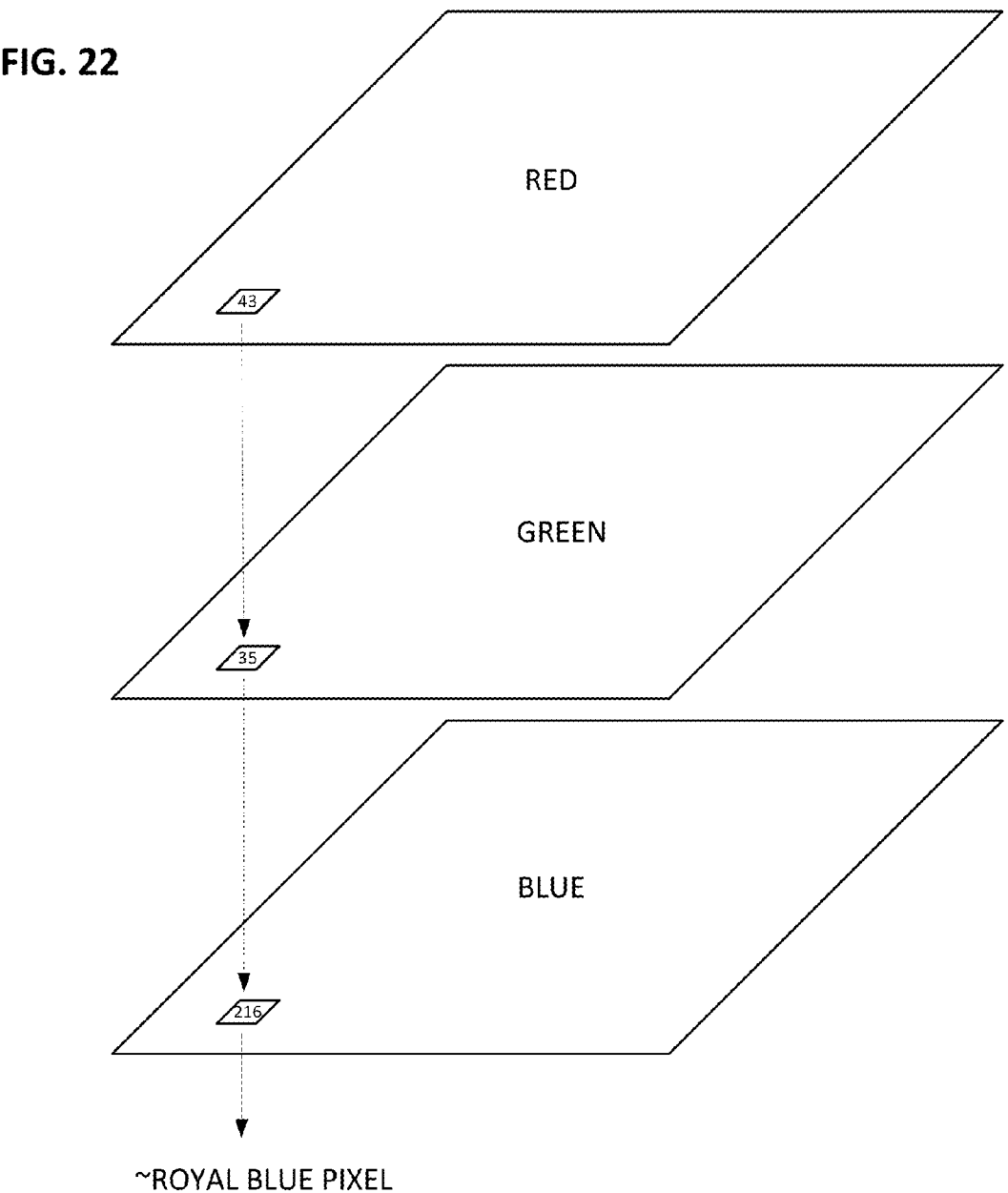
FIG. 22 shows an image memory in a smartphone, including three color bit plane of 8-bit depth each.

Consider FIG. 22, which is a conceptual view of a memory used to store a frame of image data, which may have dimensions of 128×128 pixels. Each pixel has three component color values: one red, one green, one blue. An illustrative pixel is shown with RGB color values {43, 35, 216}. These data correspond to a pixel having a color akin to royal blue.

This conceptual arrangement maps well to the storage of RDF triples. Instead of storing the three components of pixel representations, this memory serves to store the three components of RDF triples—commonly called the Subject, the Predicate, and the Object.

The data stored in image memory locations typically comprise 8-bit values (i.e., one each for red, green, blue). Each value can be an integer in the range of 0-255. When repurposed for RDF use, the RDF components are similarly expressed as integer codes in the range of 0-255. An auxiliary data structure, such as a table, can map different 8-bit RDF codes to associated strings, integers, or real number values.

An example follows in which semantic reasoning is applied to a set of input RDF data to discern unstated relationships between people. An example of such an input triple to which reasoning will later be applied is:

BOB HasChild TED

This triple expresses the information that a person named Bob has a child named Ted. "BOB" is the Subject; "HasChild" is the Predicate, and "TED" is the Object.

To store such data in image memory, one or more tables can be used to map different data to corresponding integer codes. For example, a first table may map people's names to integer codes, e.g.:

TABLE I

| | |
|---|---|
| 0 | |
| 1 | ALICE |
| 2 | DAVID |
| 3 | |
| 4 | TED |
| 5 | |
| 6 | BOB |
| ... | ... |
| 252 | CHUCK |
| 253 | HELEN |
| 254 | ... |
| 255 | ... |

Such a table may be dedicated to a single component of the RDF triples (e.g., the Subject data), or it can serve two or more. The data may be all of the same type (e.g., people's names), or data of different types may be included. Not every 8-bit code need be mapped to a corresponding datum.

In the present example, a further table is used to associate 8-bit codes with different Predicates involving people, e.g.:

TABLE II

| | |
|---|---|
| 0 | |
| 1 | |
| 2 | |
| 3 | HasChild |
| 4 | |
| 5 | HasBrother |
| 6 | |
| 7 | HasSister |
| 8 | HasGender |
| ... | ... |

The expression "BOB HasChild TED" can thus be expressed as the triple of 8-bit codes {6, 3, 4}. It will be recognized that the meanings of the first and third codes (6 and 4) are indicated by Table I, while the meaning of the second code (3) is indicated by Table II.

Figure 23:
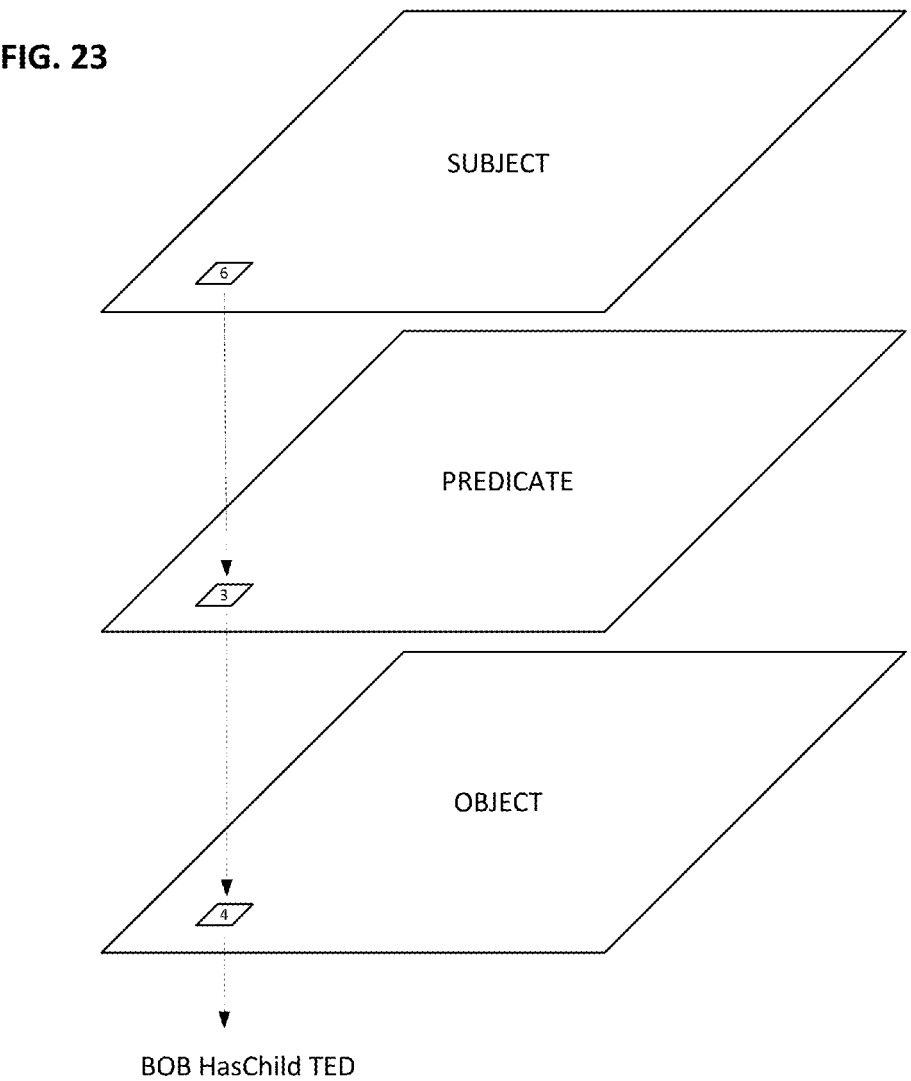
FIG. 23 shows a similar smartphone memory, but now utilized to store RDF triples.

FIG. 23 shows the same memory arrangement as FIG. 22, but now repurposed for RDF use. The 8-bit integer codes {6, 3, 4} are stored in corresponding memory locations in the three planes—which now represent Subjects, Predicates and Objects.

Figure 24:
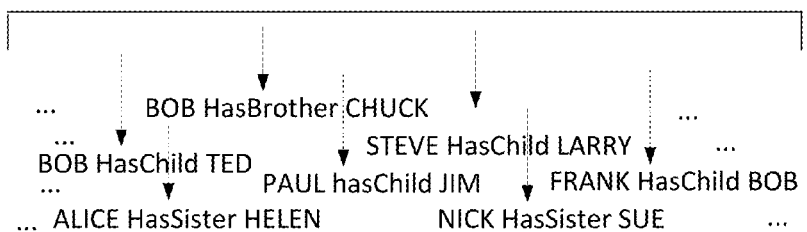
FIG. 24 shows some of the hundreds or thousands of RDF triples that may be stored in the memory of FIG. 23.

One triple is particularly detailed in FIG. 23, indicating "BOB HasChild TED." However, image memories are typically quite large, e.g., 1024×768. Even a small 128×128 pixel memory has 16,384 different data elements, so can store 16,384 triples. FIG. 24 shows a few of potentially thousands of such triples that may be stored in the memory.

(In Table II, not all of the Predicates use individuals' names for both their Subjects and their Objects. For example, one of the Predicates is "HasGender." While the Subject of this Predicate is an individual's name, the Object of this Predicate is "Male" or "Female." These latter two data may be assigned to codes 254 and 255 in Table II.)

Returning to FIG. 22, the royal blue pixel is stored in the memory at a location that corresponds to its position of desired presentation in a rendered image. As noted, frame buffers in smartphones typically have a one-to-one mapping with pixel elements in the display. Thus, the position at which the royal blue data {43, 35, 216} is stored in memory affects where, in the picture that will be rendered from the memory, that blue pixel appears.

When storing RDF triples, there is no inherent mapping between memory and display that dictates where—in memory—triples should be stored. For example, in FIG. 23, the {6, 3, 4} triple can be stored in any of the 16,384 locations in a 128×128 pixel memory.

Instead of processing pixel data in the image memory to achieve a desired graphics effect, RDF triple data in the FIG. 23 memory is processed to apply a semantic reasoning rule. In the illustrative example, the reasoning infers additional relationship information between people.

Consider FIG. 25, which shows a small excerpt of a smartphone memory, populated with a few RDF triples. (Both the 8-bit codes, and the corresponding text, are depicted for explanatory convenience.)

As can be seen, the RDF data asserts that Alice has a sister Helen. Moreover, the data asserts that Bob has two sisters (Mary and Sue), a child (Ted), and two brothers (Chuck and John).

In this example, the GPU is programmed to apply rule-based reasoning to discern a new type of relationship between individuals—that of being an uncle. Such an inferencing rule, stated in plain English, may be: if a person has both a child and a brother, then the brother is the child's uncle. Broken down in Boolean pseudo-code fashion, the rule may be expressed as:

IF (PERSON1 HasChild PERSON2),
 AND IF (PERSON1 HasBrother PERSON3),
  THEN PERSON2 HasUncle PERSON3.

If the GPU applies this reasoning rule to the data depicted in FIG. 25, it will conclude by making two new semantic assertions:

1. TED HasUncle CHUCK
2. TED HasUncle JOHN

These two new assertions may be added to the FIG. 25 RDF data store.

As noted above, there is no inherent mapping between memory and display that dictates where particular triples should be stored. However, in this example, applicant prefers to group similar Subjects together. In particular, the memory is conceptually divided into 3×3 blocks (302, 304, etc.)—each devoted to a different RDF Subject. This is shown by the dark lines in FIG. 25. Up to nine different triple assertions about each RDF Subject can be stored in such a 3×3 block.

Organizing data with such spatial locality provides an advantage—the multiple cores of the GPU—and the bus arrangements that provide each core with input and output—are commonly optimized to work on adjoining neighborhoods of pixels. By enforcing spatial locality on the data, all the assertions relating to a particular Subject can be processed by the same GPU core. This speeds processing, e.g., because data usually needn't be shared between cores.

The software that executes the reasoning can be implemented different ways. Assuming that each core works on a domain of nine triples, one implementation works as follows:

Check each of the nine Predicates to see if its code=5; if so, increment counter "i"
If i=0, End
Check each of the remaining Predicates to see if its code=3; if so, increment counter "j"
If j=0, End
Create i*j new assertions "X HasUncle Y" using all combinations of X and Y, where X are Objects whose Predicates have code=3, and Y are Objects whose Predicates have code=5.

In the depicted example, the GPU's operation table is loaded with instructions to execute the above procedure. When GPU operation is then invoked, the device finds i=1 and j=2, and creates two new assertions, as identified above.

The foregoing procedure can sometimes be shortened by imposing a further spatial constraint on the storage of triples in the memory. Namely, in addition to grouping triples with the same Subject together in a common block, the triples are also ordered within the block based on their Predicate codes. Such sorting often allows the nine predicates to be checked for a particular code without an exhaustive search.

For example, in FIG. 25, the Predicates are listed in descending order, starting with the upper left cell of each block. In the above-detailed procedure, when checking Predicates for the code "5," the check can stop when a code less than "5" is encountered. The fifth Predicate checked in block 304 of FIG. 25 (i.e., the center cell in the 3×3 block) has the code "3." At this point the checking for "5" can stop—there will be no more.

Likewise, when checking for the code "3," the checking can begin where the checking for "5" stopped—since a "3" can't occur earlier in the order. Similarly, the checking for a "3" can stop when the first Predicate less than "3" is found. (Empty cells store a value of "0," which is not shown for clarity of illustration.)

By sorting the triples in a block by Predicate in this fashion, it is not necessary to check nine Predicates, twice, to count the number of "5" and "3" codes. Instead, five are checked to tally all the "5"s (i.e., stopping when the first "3" is encountered), and two more are checked to tally all the "3"s (i.e., starting at the center cell, and stopping when the next cell—a "0" Predicate, is encountered).

A different implementation is based on template matching. Consider FIGS. 26 and 27. FIG. 26 shows a subset of the templates involved. In these templates, a blank box indicates "don't care." (FIG. 27 simply gives letter names to each of the triples in the block, to ease reference when discussing the templates of FIG. 26.)

The GPU core checks the 3×3 Predicate plane of a block in the triple memory (e.g., 304) against each of the templates, to identify matching code patterns. For each match, a new "HasUncle" assertion is generated.

For example, in applying the top left template of FIG. 26, the core checks whether triple "a" has Predicate=3 AND triple "c" has Predicate=5. If so, a new "HasUncle" triple is created, with the Object of input triple "a" as its Subject, and with the Object of input triple "c" as its Object.

Similarly, the GPU core applies the second template of FIG. 26 to check whether triple "b" has Predicate=3 AND triple "c" has Predicate=5. If so, a new "HasUncle" triple is created, with the Object of input triple "b" as its Subject, and with the Object of input triple "c" as its Object. Etc.

Although there are 64 templates to match against, such comparisons are quickly done by GPU cores. And since a hundred or more different blocks of triple data may be processed in parallel by the different GPU cores, high throughput is nonetheless achieved.

Applied to block 304 of FIG. 25, it will be recognized that the two bolded templates of FIG. 26 match patterns in the depicted data, yielding the two above-identified new assertions.

Just as sorting the triples in the FIG. 25 can aid the first-defined procedure, it can similarly aid the template-based procedure. In particular, the number of required templates can be halved by sorting the triples by Predicate.

More particularly, it will be recognized that—if sorted in descending order by Predicate (as shown in FIG. 25), the arrangement depicted in the top left template of FIG. 26 cannot occur. That is, there will never be a "3" in the top left corner of a block, and a "5" to its right. In like fashion, the second template is not needed, for the same reason. Indeed, half of the possible templates (i.e., those that place the "3" before the "5") are not needed.

Some implementations of the present technology make use of number theory, to help or speed reasoning.

In the examples given above, a number theory procedure may be applied first—as a check to determine whether there is any "HasUncle" assertion to be discerned from input data in a block. Only if this preliminary check is affirmative is the template matching procedure, or another such procedure, invoked.

An exemplary number theory that can be used in this case involves prime factors. It will be recognized that the "HasChild" and "HasBrother" predicates are both assigned prime integer codes (i.e., 3 and 5). If all of the non-zero predicate codes in a 3×3 block are multiplied together (or if all nine predicate codes are multiplied together, with "1"s substituted for "0"s), the resulting product will always be a multiple of 15 if the block contains at least one "3" and at least one "5."

The GPU core performs this calculation—multiplying together the Predicate codes within the block. The result is then divided by 15 (either by the GPU core, or otherwise). If there is a remainder (i.e., if the product is not evenly divisible by 15), then the block does not have both a 3 and a 5. It therefore cannot generate any "HasUncle" assertions, and the template-matching procedure (or other such procedure) can be skipped as moot.

The same multiplication product can also be used to screen for presence of one or more "HasAunt" relationships within a block of input data. The rule for "HasAunt" is similar to that for "HasUncle," but uses "HasSister" instead. In plain English, if a person has both a child and a sister, then the sister is the child's aunt.

In Table II, the "HasSister" Predicate is assigned a (prime) code of 7. If there is any "HasAunt" relationship in a block of input triples, the product of its Predicates will always be evenly divisible by 21 (i.e., 3*7).

There are 54 different primes among the integers 0-255. If these prime codes are assigned to Predicates that may be ANDed together by semantic reasoning rules (with such assignment perhaps skipping other values, as in Table II), then the presence (or co-presence) of any group of them within a block of Predicate data can be determined by checking whether the product of all nine Predicate codes is evenly divisible by the product of the group of primes. (E.g., to check for the co-occurrence of 2, 3 and 11, check for divisibility by 66.)

The GPU may not have one core for each 3×3 block triple data. For example, the memory may have 1000 3×3 blocks of triple data, while the GPU may have only 200 cores. There are many ways this can be dealt with. One is for the GPU to apply the prime-screening procedure to the first 200 blocks, and to copy blocks found to have "HasUncle" relations to a frame buffer. The process repeats for the second, third, fourth, and fifth 200 blocks, with copies of blocks determined to have "HasUncle" relations being added to the frame buffer. Finally, the earlier-detailed pattern matching (or another procedure) is run on the blocks in the frame buffer (all of which are known to have latent "HasUncle" relations), to generate the new assertions.

Product-of-primes is one type of number theory that can be applied. There are many others. Another class involves additive number theory. Consider the following table of predicate codes, for a simple example:

TABLE III

| | |
|---|---|
| 0 | |
| 1 | HasChild |
| 2-9 | <reserved> |
| 10 | HasBrother |
| 11-99 | <reserved> |
| 100 | HasSister |
| 101-255 | <reserved> |

This table is sparse; most 8-bit codes are reserved from assignment in order to yield desired number theory results when Predicates are combined. In fact, the only codes in this table are 1, 10 and 100.

This assignment of Predicate values enables another check of whether one or more "HasUncle" relationships may be reasoned from a given block of triples. In this particular implementation, the nine Predicate codes in a block are summed. (Again, a "0" is used for any empty cells.) This particular sparse assignment of integers is designed so that, if there is at least one "HasChild" Predicate, and at least one "HasBrother" Predicate, each of the last two decimal digits of the sum will be non-zero. A GPU core performs this check and, if it is met, the GPU can then further process the block to extract the new "HasUncle" assertion(s), such as with one of the above-described procedures.

(A variant of this additive procedure can also check for one or more "HasAunt" relationship. In this check, a value of 100 is first subtracted from the sum. The core then checks that (1) the result is positive; and (2) the last digit of the result is non-zero. If these conditions are met, then one or more "HasAunt" relationships can be asserted from the data.)

The foregoing number theory examples are simple and a bit contrived, but demonstrate underlying principles. Actual implementations will usually be different. (The particular operations involved are usually selected from the basic instruction set of the GPU core(s) being used.)

While the prior example checked for non-zero decimal digits, many applications will instead apply number theory principles to binary or hexadecimal representations.

Implementations will often differ in other ways from the examples illustrated. For example, the reasoning rules may involve more than two Predicates. The number of triples in each block may be different than nine. Indeed, uniform block organization of memory is not required; some implementations may have blocks of varying sizes, or dispense with block organization altogether. Sometimes the GPU cores may access overlapping areas of memory (e.g., overlapping blocks). Each plane of the triple memory may have a bit-depth other than 8 (e.g., 16). Where spatial locality in memory is employed, the data may be grouped by identity of Predicate or Object, rather than identity of Subject. Similarly, depending on the application, it may be desirable to sort by Subject, Predicate, or Object—either within each block, or across the entire triple memory. Naturally, the selection of particular 8-bit codes to assign to different Predicates (or Subjects or Objects) will often depend on the particular context.

Just as the "HasUncle" assertions that are output by the above-detailed reasoning operations can be added to the triple database (e.g., FIG. 25), so can outputs from inverse operations. For example, the inverse of "HasChild" is "HasParent." So the triple "BOB HasChild TED" can be processed to yield the new, inverse, triple "TED HasParent BOB." Similarly, the results of reasoning operations can often be inverted to provide still richer expressions of relationships. For example, the output generated above, "TED HasUncle CHUCK" can be inverted to yield "CHUCK HasNephew TED."

Inverse relationships can, themselves, be expressed as triples in the FIG. 25 memory or elsewhere, e.g., "HasUncle HasInverse HasNephew."

Consider a different example, in which the triple store contains information about vehicles for sale. This information may have been automatically downloaded to a smartphone's memory in response to a user capturing an image of a vehicle section of a classified advertising publication, using a smartphone camera (see, e.g., application Ser. No. 13/079, 327).

In this example, the 8-bit Subject codes may correspond to text strings identifying different vehicles, e.g.:

TABLE IV

| | |
|---|---|
| 0 | |
| 1 | 1990 Honda CRX |
| 2 | 2005 Ford Ranger |
| 3 | 1985 Winnebago Chieftan |
| 4 | 2007 Toyota Sienna |
| 5 | 2007 Toyota Tacoma |
| 6 | 22' car hauling trailer |
| 7 | 2007 Ducati ST3 |
| ... | ... |

This Table IV may be regarded as the main Subject table.

Associated with each of these Subjects will typically be multiple Predicates and Objects. The 8-bit Predicate codes, and their associated meanings, may be:

TABLE V

| | |
|---|---|
| 0 | |
| 1 | HasExteriorColor |
| 2 | HasPassengerCapacity |
| 3 | HasGrossVehicleWeight |
| 4 | HasPrice |
| 5 | HasSellerPhone |
| 6 | HasEngineSize |
| 7 | HasLinkForMoreInfo |
| 8 | HasTowingCapacity |
| 9 | HasDoors |
| 10 | HasUpholsteryColor |
| 11 | HasEngineType |
| 12 | HasVehicleType |

TABLE V-continued

| | |
|---|---|
| 13 | HasModelYear |
| 14 | HasMfr |
| ... | ... |

Table V may be regarded as the main Predicate Table. (The Predicates in this table are chosen for purposes of illustration. Many implementations will employ standardized vocabularies, such as those of established OWL ontologies.)

The 8-bit Subject codes, and their associated meanings may be:

TABLE VI

| | |
|---|---|
| 0 | <Check aux table> |
| 1 | 0 |
| 2 | 1 |
| 3 | 2 |
| 4 | 3 |
| 5 | 4 |
| 6 | 5 |
| 7 | 6 |
| ... | ... |
| 16 | 15 |
| 17 | White |
| 18 | Blue |
| 19 | Tan |
| ... | ... |
| 35 | <100 lbs |
| 36 | 100-200 lbs |
| 37 | 200-400 lbs |
| ... | ... |
| 58 | 2-3 tons |
| 59 | 3-4 tons |
| 60 | 4-5 tons |
| 61 | 5-6 tons |
| 62 | 6-7 tons |
| ... | ... |
| 110 | Trailer |
| 111 | Motorcycle |
| 112 | Sedan |
| 113 | Station Wagon |
| 114 | SUV |
| 115 | Truck |
| 116 | RV |
| 117 | Family Van |
| ... | ... |
| 153 | Gasoline |
| 154 | Diesel |
| 155 | Hybrid |
| ... | ... |
| 188 | 2011 |
| 189 | 2010 |
| 190 | 2009 |
| ... | ... |

Table VI may be regarded as the main Object table.

As before, triples in the smartphone memory can express assertions using 8-bit codes selected from these three vocabulary tables, e.g.

1985 Winnebago Chieftan HasGrossVehicleWeight 6-7 tons, is expressed {3, 3, 62}; and 1985 Winnebago Chieftan HasExteriorColor White, is expressed {3, 1, 17}.

Note that some entries in the main Object table may be used only with one of the entries in the main Predicate table. For example, Object code 62 (e.g., 6-7 tons) may be used only with the HasGrossVehicleWeight predicate. Other entries in the Object table may be used with several entries in the Predicate table. For example, Object codes 2-5 might be used both with the HasPassengerCapacity predicate, and with the HasDoors predicate. (Similarly, Object codes 17-19 might be used both with the HasExteriorColor predicate, and with the HasUpholsteryColor predicate.)

Often, the number of possible Object values exceeds the 256 that can be accommodated in the 8-bit memory plane. For example, each of 250 vehicles may have both a different price and different telephone number associated with it, i.e., 500 different values.

For Predicates whose Objects cannot be accommodated among the 256 different values that can be associated with 8-bit codes in the main Object table, an Object code of "0" can be specified in such triples. This directs the smartphone software to consult an auxiliary data structure (e.g., table), instead of the main Object table, for corresponding Object information. This different structure may be identified by the Predicate name (or its number equivalent).

For example, the triple {3, 4, 0} concerns the price of the Winnebago. However, the Object code "0" indicates that the price is not indicated by a value indexed by an 8-bit code in the main Object table (i.e., Table VI above). Instead, the "0" directs the smartphone to consult auxiliary memory table #4 (referring to Predicate value 4). Auxiliary memory table #4 may have the prices for all the vehicles, associated with their corresponding Subject codes (given in parentheses for ease of understanding), e.g.:

TABLE VII

| 0 | | |
|---|---|---|
| 1 | (1990 Honda CRX) | $1,200 |
| 2 | (2005 Ford Ranger) | $5,300 |
| 3 | (1985 Winnebago Chieftan) | $4,000 |
| 4 | (2007 Toyota Sienna) | $15,995 |
| 5 | (2007 Toyota Tacoma) | $24,500 |
| 6 | (22' car hauling trailer) | $4,000 |
| 7 | (2007 Ducati ST3) | $8,995 |
| 8 | | ... |
| ... | | ... |

In some embodiments, such auxiliary tables may be sorted by the associated Object values (here, price), rather than the Subject codes—to facilitate searching.

The smartphone GPU can near-instantly filter the data stored in the main Subject-Predicate-Object memory to identify vehicles with certain sought-for parameters (i.e., those expressed in the main Object table). For example, if the user is interested in (1) trucks, (2) that can seat 4-6 passengers, these parameters can be entered using a conventional smartphone graphical user interface (GUI), and the results can be quickly determined.

One illustrative GUI presents drop-down menus, or scrollable selection wheels, that are populated with literals drawn from the Predicate and Object main tables. An auxiliary GUI table may be used to facilitate the display of information, e.g., to provide plain English counterparts to the Predicates, and to indicate the particular codes by which searches can be keyed.

FIGS. 28, 29A and 29B show an example. One or more tables 400, or other data structure(s), stores information used in generating GUI menus. A sequence of GUI menus, 402, 404, etc., is presented on the smartphone screen, and enables the user to enter desired search parameters.

The illustrated GUI 402 has a first scrollable window portion 420 in which different menu legends from column 410 of table 410 are selectably displayed. As depicted, the user has scrolled to the "What are you looking for?" option.

A second scrollable window 422 is populated with second level menu choices that correspond to the selection shown in window portion 420, as determined by reference to table 400. For example, since the user has scrolled window portion 420 to "What are you looking for?" the smartphone responds by presenting choices such as "Car," "Truck" "Motorcycle," and "Other" in the second window portion 422. These particular text strings are drawn from column 412 of table 400, where they correspond to the "What are you looking for?" top level menu. As depicted, the user has scrolled the window 422 to indicate "Truck."

The GUI 402 further includes a button 424 that the user can tap to enter more search parameters. Alternatively, the user can tap a "Get Results" button 426 that presents results of a search based on the user-entered parameter(s).

Assuming the user taps button 424, the GUI stores the values just-entered by the user (i.e., "What are you looking for?" and "Truck"), or 8-bit code values associated with such values, and then allows the user to interact with window 420, and then window 422, again. This time the user selects "What passenger capacity?" from window 420.

By referring to column 412 of table 400, the smartphone knows to populate the second window 422 with corresponding options, such as "1," "2," "3," "4," "5" and "6" (since these labels are associated with the "What passenger capacity?" menu selection). A flag (not shown) in table 400 can signal to the software that it should render a second window 422a, in which the user can specify an upper range limit, when the "What passenger capacity?" menu option is selected. (The original window 422 then serves as a lower range limit.) In FIG. 29B, the user has scrolled window 422 to "4," and window 422a to "6." The user is thus interested in trucks that can seat between 4 and 6 passengers.

The user can then request search results by tapping the "Get Results" button 426.

When the user taps button 426, the search of the triple store can commence. (Alternatively, it may have commenced earlier, i.e., when the user completed entry of a first search parameter ("Truck") by tapping button 424. That is, the search can be conducted in a series of successive screening operations, so that when the user taps the "Get Results" button, only the final parameter needs to be searched within a previously-determined set of interim search results.)

Table 400 indicates how the smartphone processor should search the stored data to identify vehicles meeting the user's search criteria.

For example, since the user selected "Truck" as a search condition, row 432 of table 400 indicates that this corresponds to a Predicate code of 12 (HasVehicleType), and an Object code of 115 (Truck). The GPU searches the memory for triples that meet these criteria.

One way this may be implemented is by thresholding—an operation at which GPU cores excel. That is, the memory can be filtered to identify triples having Predicates greater than 11 and less than 13. The interim results from this initial operation—which comprise all triples with the HasVehicleType Predicate—may be copied to a new frame buffer. (Or triples not meeting this threshold text can be set to {0, 0, 0}—"black" in image processing terms.)

In the example given above, multiple triples may be identified by this step for further processing—typically one triple for each of the vehicles, e.g., {1, 12, 112}—the Honda CRX; {2, 12, 115}—the Ford Ranger; {3, 12, 116}—the Winnebago; (the Toyota Tacoma); {4, 12, 17}—the Toyota Sienna; etc.

A second search is then conducted across these interim results (e.g., in the frame buffer)—this time to identify triples having Object code 115 (i.e., for "Truck" objects). Triples that don't have an Object code of 115 can be deleted (or set to "black").

What remains after these two search steps (in this example) are two triples: {2, 12, 115} and {5, 12, 115}. The Subject=2 triple corresponds to the Ford Ranger; the Subject=5 triple corresponds to the Toyota Tacoma. The "Truck" part of the search has been completed, by identification of these two Subject codes.

(Another way the foregoing phase of search can be implemented is by template matching, with a paired set of templates—one looking for a code of 12 in the Predicate memory plane, and one looking for a code of 115 in the Object memory plane. Again, two triples are thereby identified.)

The smartphone next applies the second search criteria—passenger capacity of 4-6. The software finds, in row 434*a* and 434*b* of table 400, that this range corresponds to a Predicate code of 2 (HasPassengerCapacity), and an Object code of 5, 6 or 7. From the first phase of the search, it also knows the Subject code must be either 2 or 5. Data meeting these Subject/Predicate/Object conditions are then identified (e.g., by a thresholding operation), either by examining data in the main triple memory, or by operating on a subset of the data (i.e., all triples having Subject=2 or Subject=5) in a frame buffer. A single triple is found to meet all these criteria: {5, 2, 7}. This is the triple that expresses the 6 person passenger capacity of the Toyota Tacoma truck.

From the results of this second phase of search, the smartphone knows the Subject code for the vehicle matching the user's query: 5. (There is one match in this example, but in other instances, there may be several matches.) The smartphone next prepares search result information for presentation to the user. This result-reporting phase of operation is illustrated by reference to FIG. 30.

Figure 30:
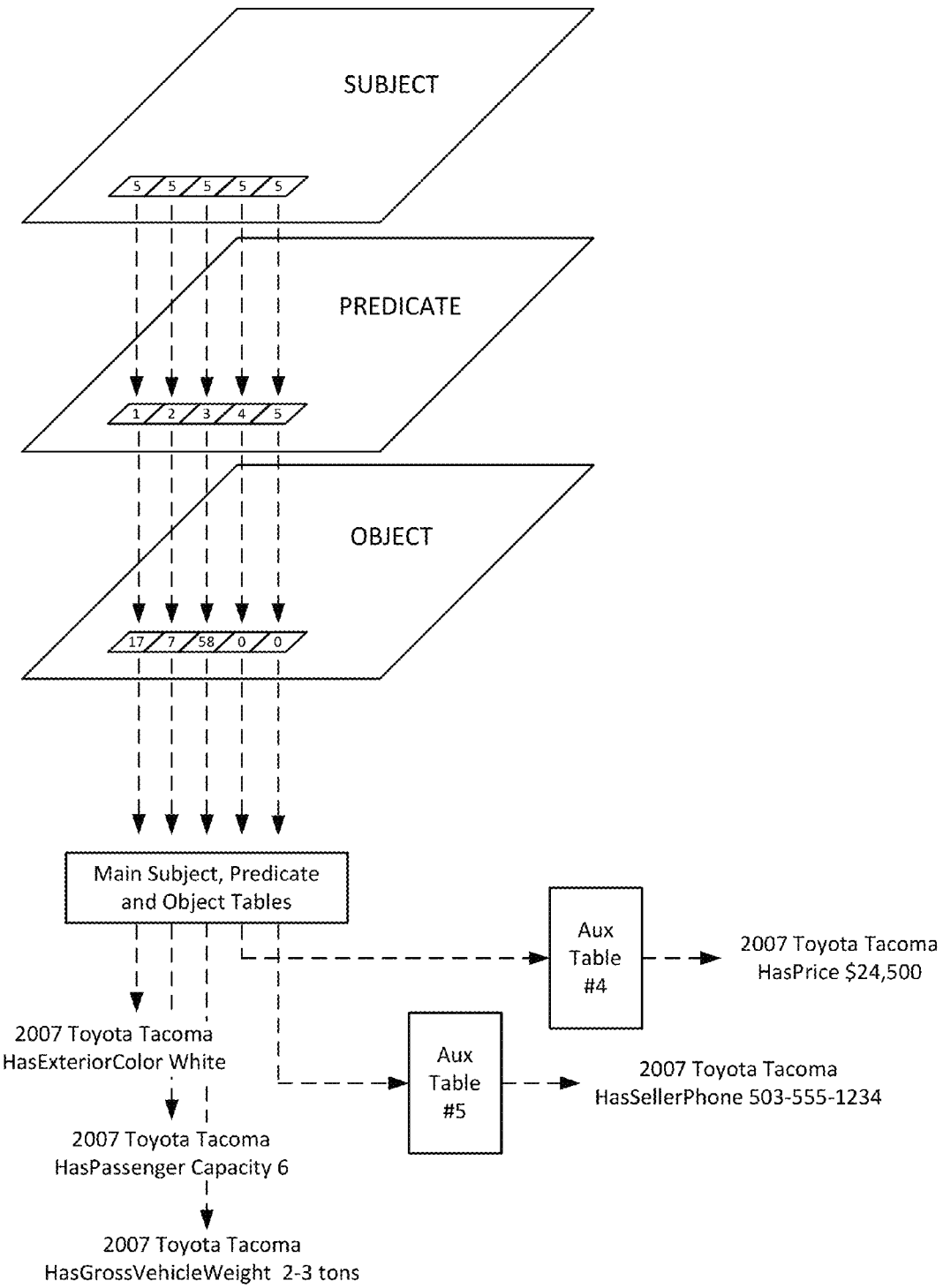
FIG. 30 shows use of a memory storing triples, and associated tables, to generate data used in generate a search query report to a user.

Knowing which Subject code(s) corresponds to the vehicle meeting the user's queries, the smartphone now identifies all triples in the memory having a Subject code of 5. Multiple triples are found—a few of which are shown in FIG. 30 (e.g., {5, 1, 17}, {5, 2, 7}, {5, 3, 58}, etc.).

The main Subject, Predicate and Object tables (tables IV, V and VI, above) are consulted for the strings or other values associated with the respective Subject, Predicate and Object Codes. For example, the first triple, {5, 1, 17} indicates "2007 Toyota Tacoma HasExteriorColor White." The second triple, {5, 2, 7} indicates "2007 Toyota Tacoma HasPassengerCapacity 6." The smartphone software fills a template form, which may label different data with plain English titles (e.g., "Color" instead of "HasExteriorColor"), and presents a listing (e.g., including all available parameters from the Predicate table V, above) to the user on the smartphone screen. (The phone may use different templates based on certain parameters, e.g., the template used for a Truck may be different than that used for a Car. The templates may be obtained, as needed, from cloud storage, or they may be resident in smartphone memory.)

As noted, some of the parameters, such as price and phone number, may not be stored in the main Object table. These are indicated by triples having an Object code of "0." To present data from such triples, the software consults auxiliary tables corresponding to the Predicates (e.g., Auxiliary table #4 provides HasPrice values). By reference to such auxiliary table information, the software populates the form with information indicating that the price of the Toyota Tacoma is $24,500, and the seller's phone number is 503-555-1234.

Some parameters may not be specified in the data downloaded with the triples into the smartphone, but may instead be pulled from remote triple stores, e.g., in the cloud (or from Google-like text searches). For example EPA mileage is a government statistic that is readily available on-line, and can be obtained to augment the other vehicle information.

An exemplary screen presenting results of such a user query may include one or more photographs (e.g., obtained from a URL indicated by the HasLinkForMoreInfo Predicate), together with text composed using the referenced template form. Such text may read, e.g.:

"2007 TOYOTA TACOMA, $24,500, white (tan interior) with 53,000 miles. 2.7 liter gas engine, with an EPA fuel economy of 21 mpg. This truck features seating for 6, and has a towing capacity of 3500 pounds. Call 503-555-1234."

A single vehicle may be detailed per screen display, with additional vehicles brought into view by a swiping motion across the touch screen display. More details about presenting such information is found, e.g., in application Ser. No. 13/079,327.

In other embodiments, triple stores utilizing more than three 8-bit data planes can be used. (Some images are stored in 4-plane representations, e.g., Cyan/Magenta/Yellow/Black, or RGBA—where the A stands for alpha, or transparency.) While generally regarded as an enhanced form of "triple," such set of data may also be called a "quadruple," or more generically an "N-tuple" (where N=4). A fourth 8-bit data plane enables various features.

As noted, prices are ill-suited for coding by the main Object table, since there may be 256 different values that need to be coded—leaving no 8-bit codes available to represent other information. However, 8-bit codes representing 256 different prices can be stored in a sparsely populated fourth 8-bit data plane.

Figure 31:
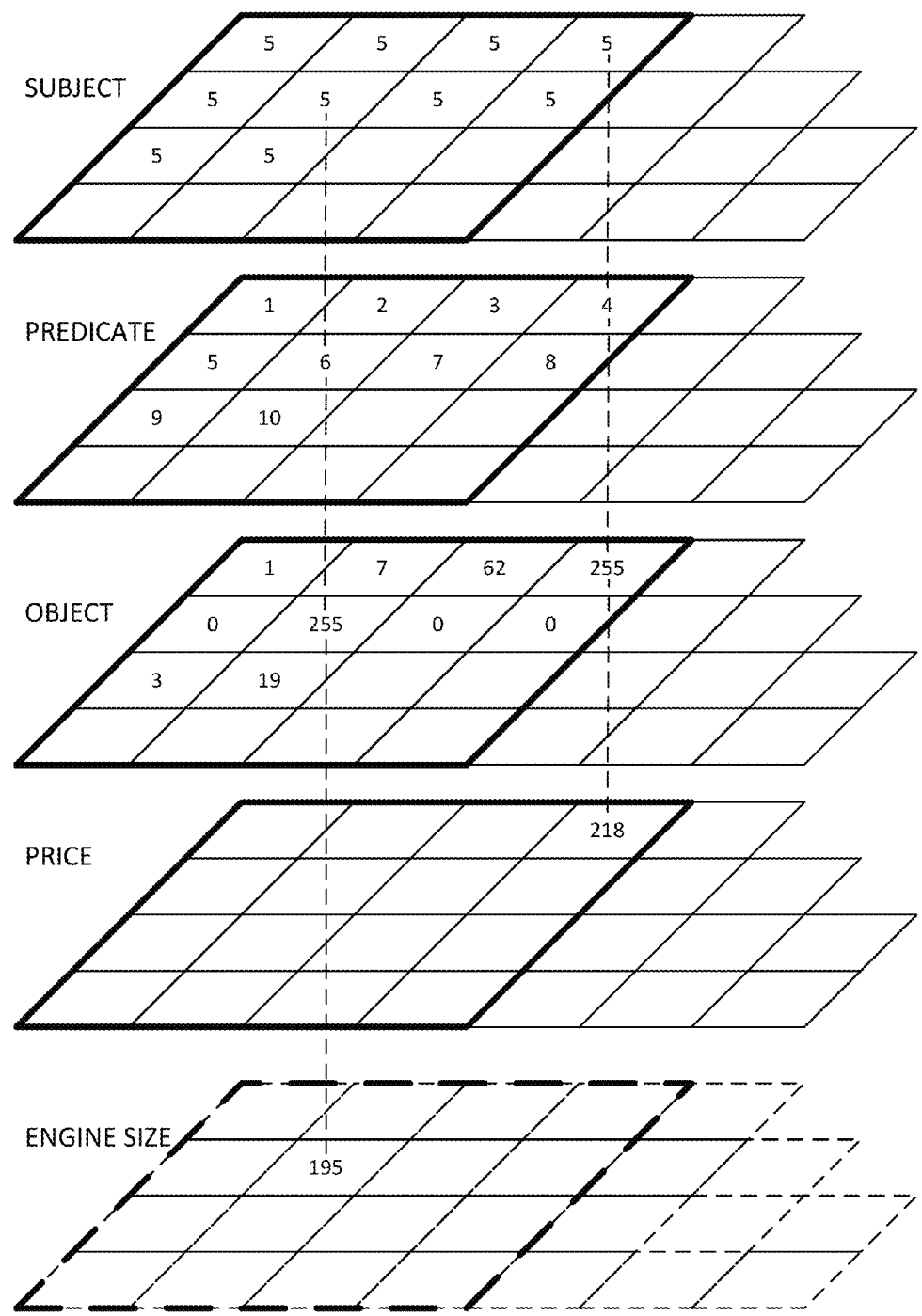
FIG. 31 shows another store of memory in a smartphone, depicting four of more planes of integer (e.g., 8-bit) storage.

FIG. 31 shows a portion of an illustrative memory that includes the three 8-bit planes discussed earlier, together with a fourth 8-bit plane dedicated to storage of codes for price. This memory is virtually organized into 4×4 blocks—each dedicated to a different Subject. The depicted excerpt details codes associated with Subject 5 (the Toyota Tacoma truck).

As can be seen, the triple with Predicate code 4 (i.e., HasPrice) has 255 for its Object code. In this implementation, a code of 255 instructs the software to refer to a further 8-bit plane for an associated code (the particular plane being indicated by the Predicate code). In this example, the associated code is 218.

As in the earlier examples, a table can associate different 8-bit codes with different values. It is advantageous, in some implementations, to assign the price codes in a sorted order, e.g., with smaller codes corresponding to smaller prices. For this 8-bit Price code memory plane, a sample table may be:

TABLE VII

| | |
|---|---|
| 0 | |
| 1 | $400 |
| 2 | $999 |
| 3 | $1,200 |
| 4 | $1,500 |
| 5 | $1,600 |
| ... | ... |
| 218 | $24,500 |
| ... | ... |

By reference to FIG. 31 and this table, it can be determined that the price associated with Subject 5 is $24,500.

An advantage of this arrangement is that it facilitates searching, since the techniques detailed above—exploiting the GPU's speed at processing 8-bit integers from image storage—can be utilized. The user interface of FIG. 29B can inquire "What price?" A pair of windows 422, 422*a* then presents controls thru which the user can scroll among actual prices of vehicles detailed in the memory—setting a lowest price and a highest price. Thresholding, or other such GPU operation, is then applied to the corresponding codes in the Price memory plane to quickly identify Subjects meeting the specified price criteria.

Multiple such further 8-bit code planes can be provided. (These may be swapped into a fourth image memory plane if the hardware is so-arranged, or they can be stored and accessed elsewhere.) FIG. 31 shows another such code plane—dedicated to Engine size (which corresponds to Predicate 6). Again storage of corresponding codes in this 8-bit plane allows search queries to be executed rapidly. (GPU shaders typically are sync'd with the display screens they drive. Even the modest GPU in the iPhone 4 phone refreshes its 640×960 pixel display screen at about 25 frames per second.)

In some implementations, most—or even all—of the Predicates may have their own plane of 8-bit memory for storage of codes, like those depicted for Price and Engine Size in FIG. 31.

It may be recognized searching is facilitated by assigning Object codes to express a semantic ordering. This is clear from the foregoing example concerning passenger capacity, where the different numeric values are ordered in ascending fashion, with corresponding ascendency of the associated 8-bit codes. This enables range-based searching by specifying upper and lower codes, and performing a thresholding operation.

A similar ordering can be effected with parameters that are not purely numeric. For example, colors may be ordered in a semantic manner, e.g., based on corresponding wavelength maxima, and/or intensity or luminance. Thus, all of the blues (Navy Blue, Royal Blue, Sky Blue, Aquamarine, etc.) may have similar codes, and all the reds may have similar codes, with the blue and red codes being spaced apart from each other in a 0-255 code space. Range-based color searching can then readily be performed. (E.g., a user may select "Navy Blue" in window 422 of FIG. 29B, and select "Aquamarine" in window 422*a*, and vehicles having any color code between the color codes of these two range limits are identified.)

(Another way of dealing with colors and other features is by using an RDF ontology, which groups and associates items semantically. For example, the myriad different car manufacturer color names can be distilled into searchable parameters by an ontology such as:

AQUA METALLIC HasColor BLUE
DEEP NAVY HasColor BLUE
DEEP CARDINAL HasColor RED
CRYSTAL RED HasColor RED
CHARCOAL HasColor GREY
GRANITE HasColor GREY The smartphone can invert these triples, and present the resulting Subjects (e.g., BLUE, RED, etc.) in a GUI, such as in windows 422 and 422*a* of FIG. 29B. In this case, the two values selected in windows 422 and 422*a* do not define a range of parameters, but rather define two different values that are ORed together in the search, so that triples meeting either value are selected.)

The foregoing examples are somewhat rudimentary, but serve to illustrate the principles involved. More elaborate semantic reasoning can naturally be implemented. For example, if the phone captures an image of automotive classified advertising, the phone may query the user to learn some facts, such as the number of miles the user drives per year. (This information may be available elsewhere, such as in a user profile stored on a networked computer, or in a database in the user's present car.) If the user responds to this query by indicating that 50,000 miles is a typical annual mileage, the phone may employ semantic reasoning to discern that per-mile vehicle operating costs are likely of importance to the user. With this inferred information, the phone may decide to render results of user-directed vehicle searches by presenting vehicles having the highest fuel economy first among the search results (absent other instruction from the user).

If EPA mileage is not available for vehicles in the search results, the phone can reason using other data. For example, semantic reasoning can be used to conclude that an engine with a 1300 cc engine likely has better fuel economy than an engine with a 4.7 liter engine. Similarly, such reasoning, or a networked knowledge base, may indicate that diesel engines tend to have better fuel economy than gas engines. Again, such knowledge can inform presentation of the search results—simply based on the fact that the user drives 50,000 miles per year.

While the foregoing techniques are particularly described in the context of smartphone implementations, the principles are more widely applicable. Moreover, while use of GPU cores is preferred, the detailed features are likewise applicable in memories that are processed with other types of processors.

Synchronized Background

Augmented reality techniques are known for recognizing image features, and overlaying information such as labels. The superimposed overlay may be geometrically registered with the image feature(s), so that as the image features move within the field of view, the overlay moves with a corresponding motion.

Another aspect of the present technology builds on such techniques by providing augmentation in the form of a background, rather than an overlay.

Consider an image depicting a subject in the foreground, and a surrounding background. An exemplary image is the Beatle's Abbey Road record album, depicting the four Beatles walking across a crosswalk on Abbey Road.

Using Photoshop, GIMP, or another tool, the four Beatles may be excerpted from the image. Two images can thereby be formed—a first image with just the four Beatles (surrounded by a void, or a uniform color—such as white), and a second image with just the background (which may have a void (or white) where the Beatles were, or not).

The first image may be printed on a substrate, and a smartphone is used to capture imagery of the substrate, e.g., in a video capture mode. Software in the smartphone determines the pose of the camera relative to the first image. With this information, the software geometrically warps the second (background) image, so that it has a scale, and perspective, as if viewed from the same pose. The phone then composites the two images—the phone-captured imagery of the four Beatles, and the background—warped to provide the original backdrop of the image. The two images complement each other to present a unified image that appears like the original album cover, as if viewed from the phone's pose relative to the substrate.

Other background images may be used, instead of the original. Thus, instead of an image of Abbey Road, the background image may depict Broadway in Times Square, N.Y. The excerpted Beatles—imaged from the printed substrate (or from an electronic display screen) may be superimposed on the new background image—which again is warped and scaled so that it appears with the same pose as the camera relative to the substrate. Thus, the augmentation is more akin to an underlay rather than the traditional augmented reality overlay.

Geometric warping and registration of the background image to match the substrate-camera pose can be done in various ways, such as using digital watermarks, salient image points, etc. If the first image has a QR code or other barcode, such feature can itself be used to discern pose information. Such techniques are further detailed elsewhere in this disclosure.

Once the pose of the phone relative to the first image is discerned, the second (background) image can be modified based on changes in pose—to give a 3D effect. For example, additional background scenery may move into the frame if the user pans the camera. If the user tips the camera to point more downwardly, more of the street imagery can come into view (and some sky imagery recedes out of the top of the frame). As the camera pose changes, certain features of the second image become occluded—or become revealed—by changed perspective of nearer features depicted in the second image. Some such embodiments employ a 3D model to generate the background image—computing appropriate 2D views based on the phone's viewpoint.

While the exemplary embodiment used a first image in which the subject depiction was surrounded by a void, or a uniform color, in other embodiments this is not necessary. Once the identity of the subject is learned (e.g., by fingerprinting, machine readable encoding, etc.), contours of such subject can be determined by reference to a database. The camera can then stitch the second image around the first image—occluding portions of the first image that are outside the database-defined contours of the main subject of the image (e.g., the four Beatles).

Desirably, if a user taps on the display screen, the phone software provides a response that is appropriate to the location of the tap. If the user taps on John Lennon, content related to John Lennon is presented. Such taps invoke this behavior regardless whether the tapped part of the display depicts imagery actually captured by the phone camera, or whether it depicts other imagery laid-in by the phone as an augmentation. (The phone software outputs X– and Y– locations of the user's tap, which are then mapped to a particularly location in the displayed imagery. Content corresponding to such location in the presented display of imagery can then be determined by known ways, such as by indexing a database with the tap coordinates, by decoding a watermark at that region, etc.)

Linking Displays to Mobile Devices

In accordance with this aspect of the present technology, a watermark is embedded in an image/content/advertisement/video/user interface (e.g., a web page) that is to be presented on a display device, such as an LCD monitor. The embedding can be performed by the display device, by an associated computer, or by a remote source of the imagery. The watermark is readable with a detector present in a smartphone or other mobile device. The payload from the watermark logically links, through a table or other data structure, to a source of information that corresponds to the presented display. (For a web page, the information may be the URL address for the page.) Advantages over other techniques include real estate savings (for an image displayed on screen, the watermark does not take up any additional space), embedding costs (cheaper than printed barcodes), all-digital workflow, covert feature (where required), communication channel between displayed content and mobile device. Applications are many—a few examples are detailed below.

One application concerns mapping. Suppose a user is looking for directions on a desktop/laptop by using a mapping tool such as MapQuest, Yahoo Maps or Google Maps. After the desired map/directions are presented on the screen display (which is watermarked), the user points a mobile phone at the map/directions displayed on the screen. On reading the encoded watermark, the phone obtains a URL for the displayed directions, and loads the same page (using either a WiFi internet connection or through a communication link such as GPRS). At that point the user is ready to go with the map/directions directly on the mobile phone.

If the mobile phone has GPS capability, then, on reading the watermark, the smartphone can directly link the map/directions with the GPS functionality, without having to manually enter all the location/address information.

If the mobile phone does not have GPS capability, but the user has a GPS-equipped device in their car, then the payload information decoded by the phone from the watermarked desktop screen display can be transferred to the GPS device using a wireless (e.g. Bluetooth) connection.

Another application concerns facilitating E-commerce. Suppose a person is looking at an ad for a shoe on their desktop/laptop, and this ad is watermarked. Pointing the mobile phone at the ad could directly take the person to a "checkout" page displayed on the mobile phone.

Another application concerns syncing imagery. A user may like a particular image shown on a desktop screen, and want it on their smartphone. This can be accomplished by simply capturing an image of the screen display, using the phone. The phone decodes the watermark, and uses the payload thereby extracted to obtain a copy of the image from its original location.

Relatedly, calendar syncing can be accomplished by capturing an image from a calendar program (e.g., Microsoft Outlook) on a desktop display. The phone decodes the watermark payload, and by reference to this information, obtains data to sync a local calendar with the displayed Outlook calendar.

Another application is a visual bookmark. Suppose a user is viewing a web page on a desktop/laptop, and wants to bookmark that page for further browsing on the mobile phone (say on the commute home). If the web page has a watermark, the user can just point the phone at the page, and the bookmark for the page (or its corresponding mobile version) would automatically appear on the mobile phone.

Yet another application concerns active links. As opposed to links on web pages that are static (meaning a user has to take an action, such as clicking on a link, to make interesting things happen), the watermark can facilitate an "active links" That is, just pointing the mobile device at the web page (or other relevant display) and reading the watermark automatically triggers an action—either on the mobile device, or on the computer connected to the display (through a wireless link).

The foregoing concepts can be extended to video, to enable reading of dynamically changing watermarks by pointing the mobile device to a video streaming on a display screen.

Additional information useful in implementing certain of the foregoing arrangements is found in the paper Modro, et al, Digital Watermarking Opportunities Enabled by Mobile Media Proliferation, Proc. SPIE, Vol 7254, January, 2009.

Migrating Tasks Between Devices

The assignee's published patent application 20100205628 notes the desirability of being able to transfer a game, or entertainment content, from one computer system (e.g., a desktop computer) to another computer system (e.g., a smartphone), without losing the user's place in the game/content flow. By such arrangements, a user can seamlessly continue an activity despite switching devices.

In accordance with another aspect of the present technology, the display data presented on a computer's screen is routinely digitally watermarked with an app-state-variant payload. That is, a display driver or other module in the computer regularly steganographically encodes the displayed data with a multi-bit identifier. This identifier is changed occasionally (e.g., every frame, or every 1-10 seconds, or at irregular intervals—such as when a threshold amount of change has taken place in the program or computer state). Each time the identifier is changed, the computer writes data that enables the "full state" of the computer system, or of a program being displayed on the screen, to be recovered. The data store in which this information is written can include several entries—one providing a base data state, and others providing successive updates (akin to how a video frame is sometimes encoded simply with data detailing its difference from a prior frame). A database (which can be as simple as a look-up table) identifies which part of the stored data is needed to recreate the device state corresponding to each watermark payload.

Figure 37:
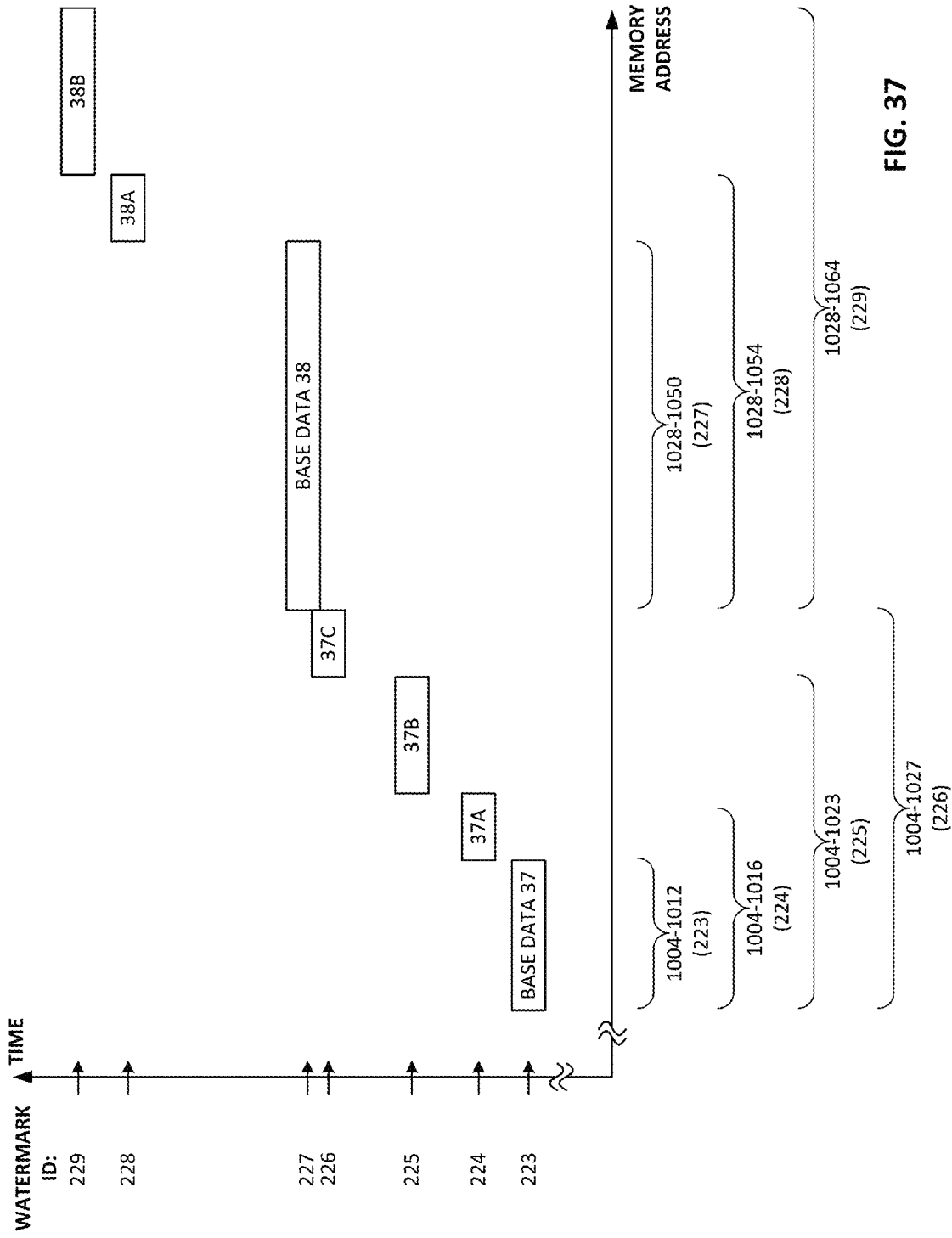
FIG. 37 illustrates an arrangement in which display data on a screen is digitally watermarked with an app-state-variant payload.

FIG. 37 further details such an arrangement. Referring first to the vertical axis, at occasional intervals a first computer (e.g., a desktop computer) stores state data in a memory. This state data is desirably adequate to recreate the computer's state (or that of the program being displayed) on a different device. Each time such state data is stored, a new watermark ID is assigned (223, 224, etc.), and the screen display is thereafter encoded with this identifier. A corresponding update is made to a watermark look-up table.

The stored state data is commonly of variable length (indicated by the lengths of the rectangles in FIG. 37). Occasionally a large block of data will be written ("Base Data" in FIG. 37). Subsequent blocks of stored data can simply be differential updates to the base data. After a further interval, another new, large, base data block may be written (e.g., "Base Data 38").

The stored state data, in this example, is written to a linear memory, with consecutive addresses (corresponding to the horizontal axis in FIG. 37). The "Base Data 37" is stored beginning at memory address 1004, and continues up through 1012. A first update, "37A" is stored beginning at address 1013, and continues up through 1016. Similarly, a second update, "37B" is stored beginning at address 1017, and continues up through 1023. This continues with a third update "37C." Then a new block of base data ("Base Data 38") is written.

If a consumer uses a smartphone to take a picture of a display screen in which watermark 223 is encoded, the consumer's smartphone decodes the watermark, and inputs it to a data structure (local or remote) that provides address information where corresponding state data is stored. In the depicted example, the data structure returns the memory range 1004-1012. (FIG. 38 shows such a watermark look-up table.) The smartphone retrieves this range of data and, using it, recreates the executing program as it existed when watermark 223 was first encoded, albeit on a different device.

If the consumer takes a picture of a display screen in which watermark 224 is encoded, the FIG. 38 table returns a memory range that encompasses the corresponding base data ("Base Data 37") and also extends to include the differential update "37A." Thus, it returns the memory address range 1004-1016. Again, the consumer's smartphone can use this information to recreate—on the smartphone—the execution state that existed on the desktop computer when watermark 224 was first encoded.

The bottom of FIG. 37 graphically shows the different memory ranges associated—in the FIG. 38 watermark look-up table—with each of the different watermark payloads.

A functionally-similar arrangement, although more complicated in implementation, is detailed in Chang et al, Deep Shot: A Framework for Migrating Tasks Across Devices Using Mobile Phone Cameras, Proceedings of the 2011 ACM Conference on Human Factors in Computing Systems (CHI 2011), pp. 2163-2172. Applicants' just-described technology can be advantageously incorporated into the Chang system, and the teachings of the Chang system can similarly be employed in the just-described arrangement.

LED Lighting

LED office lighting is being used as an optical carrier for data signals—akin to an optical DSL network—communicating with optical modems attached to desktop computers. (See, e.g., patent publication US20090129782, and commercial offerings from LVX System, Inc.)

The Greenchip line of lighting by NXP Semiconductor includes LED lights (sometimes termed "SSLs"—solid state lights) with integrated IP6 connectivity. That is, every light has its own internet address. "JenNet"-IP network software provides wireless connectivity for the LED devices. JenNet is a 6LoWPAN mesh-under tree network employing IEEE 802.15.4-based networking. Through arrangements such as these, an LED's operating parameters can be changed based on IP6 data transmitted across the wiring network.

In accordance with a further aspect of the present technology, LED lighting can communicate with smartphones, and other camera-equipped devices. The luminance or chrominance of the illumination is varied, at a human-imperceptible degree, to convey additional data. These subtle variations are reflected in imagery captured by the smartphone camera. A watermark decoding process executed by the smartphone processor then extracts the encoded information from the camera data.

Unlike optical modems, smartphone cameras often capture image frames at less than 100 frames per second (more typically, 10-30 fps). But while small, this data rate nonetheless can convey useful information. If the illumination is modulated in two or more of the different color channels sensed by common smartphones—red, green, and blue—somewhat higher data rates can be achieved.

In some applications, it may be desirable to maintain constant luminance—despite color modulation. This can be accomplished by modulating two of the color channels to convey data, and modulating the third channel as needed to compensate for the luminance change due to the other colors, yielding a constant net luminance. Due to the eye's different sensitivity to different wavelengths of light, luminance is most dependent on the amount of green, and is least dependent on the amount of blue (Y=0.59G+0.30R+0.11B). An illustrative embodiment may vary red and blue to convey data, and vary green for luminance-compensation.

In other applications, it may be desirable to maintain constant hue—despite luminance modulation. Again, this can be achieved by suitable control of the driving signals.

As with known digital watermarking systems (e.g., U.S. Pat. No. 6,590,996), the watermark data payload can be represented using an error-correcting code, such as BCH ("trellis") or convolutional coding, to provide robustness against data errors. The resulting time-varying luminance or chrominance change can be applied to existing LED control signals (whether the LED is modulated with high speed data or not) to effect broadcast to proximate camera sensors.

Normally, cameras decode plural bits of digital watermark data from a single frame of imagery, e.g., detecting slight differences in luminance or chrominance between different spatial parts (e.g., pixels) of the imagery. In contrast, the present application decodes plural bits of digital watermark data from a sequence of frames, detecting slight differences in luminance or chrominance over time. Within a single frame, all parts of the captured imagery may be similarly influenced by the LED lighting signal. Accordingly, the watermark can be decoded from signals output from a single pixel, or from plural pixels, or from all of the pixels. In the latter case, for example, the decoding application can sum or average the luminance and/or chrominance across all of the camera pixels, and analyze this aggregate signal for variations caused by the watermark encoding.

One particular application of such technology is to signal location within a retail store. LED bulb fixtures in the shoe section may be encoded with one particular identifier; those in the menswear section may be encoded with a different identifier. By briefly sampling the ambient illumination, the phone can determine its location within a store.

Another application is an LED lighting fixture equipped with a microphone or camera to sense data from the ambient media environment, and extract information based on the sensed environment. (This may comprise detecting an audio watermark, or generating audio fingerprint data and recognizing a song based thereon, or recognizing a person's face from captured imagery, etc.) Data related to this extracted information is then encoded in light emitted from the lighting fixture.

Still further, LED automobile headlights can be modulated to convey—to oncoming vehicles—parameters of the automobile's operation, such as its speed and compass bearing. (Such signal is preferably decoded using a light sensor system built into the car, rather than a user's smartphone. Such sensor system can be configured to capture data at a higher bandwidth than is possible with smartphone cameras. For example, the headlamps may be encoded at a data rate of 1000 or 10,000 bits/second, and the sensor system can be configured to decode such rates.)

Relatedly, outdoor illumination at a business or residence address (e.g., a front porch light) can be modulated to encode a street number.

Once such information has been obtained, the user (or the user's device) can take action on it. For example, in the retail example, the phone can give the user directions to another location within the store, or can present coupons for merchandise nearby. In the car example, the phone can signal a warning if the oncoming vehicle is traveling at a rate more than ten percent above the speed limit (or the user's own speed). In the outdoor illumination case, the street number can be presented on the user's phone, or the name of a business/resident at that location can be looked-up from public databases.

It will be recognized that light sources other than general purpose LED lighting can be controlled in the manner just described. For example, television and laptop lighting can be modulated in this fashion. While chrominance modulation may be unsuitable for color-critical television scenes (e.g., depicting skintone), other information displays are forgiving of chrominance variations (e.g., desktop color, web page backgrounds, etc.).

Figure 39:
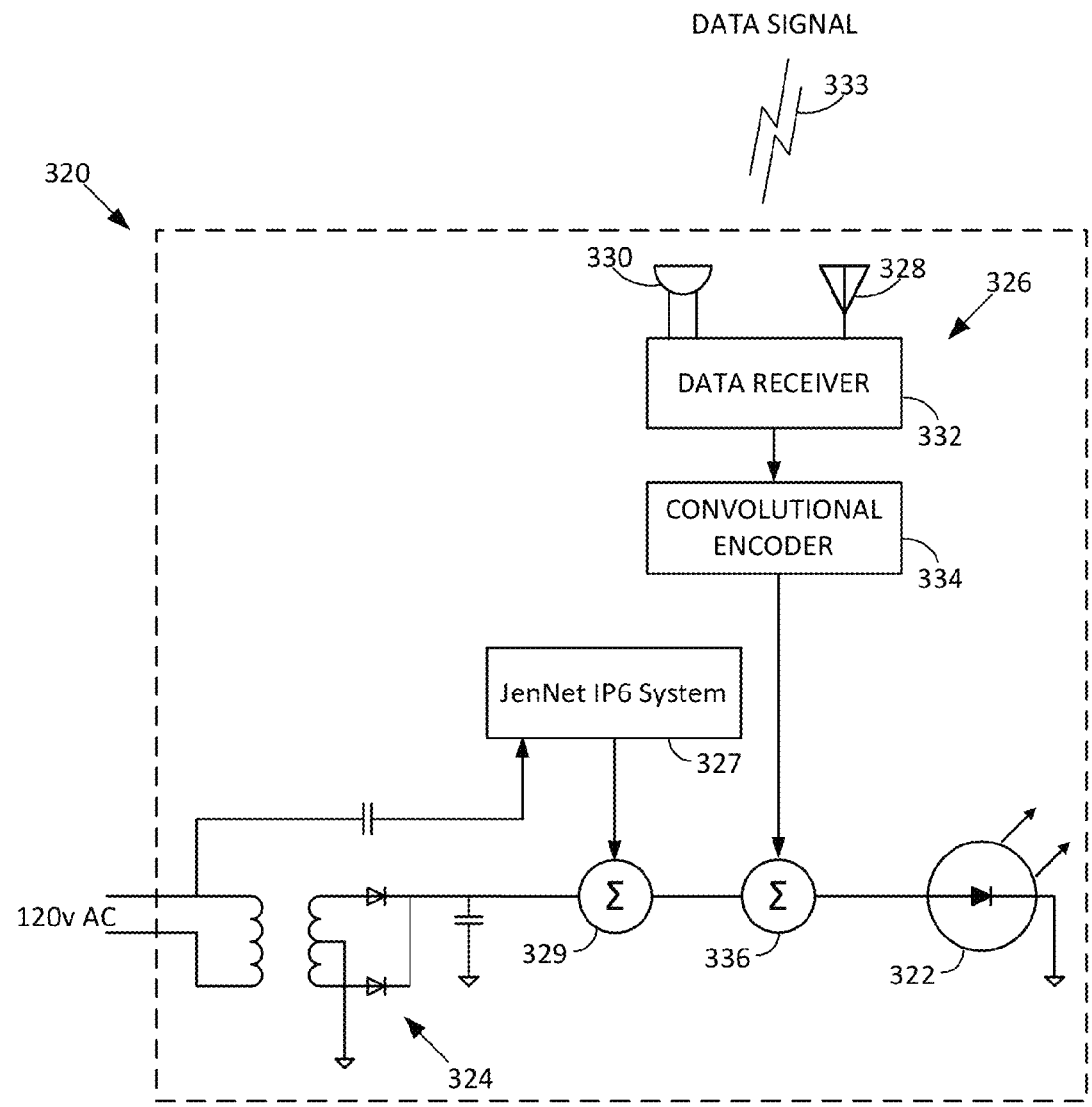
FIG. 39 shows an LED-based communication system, incorporating both high bandwidth and low bandwidth channels.

FIG. 39 shows an illustrative embodiment employing luminance LED modulation. A light fixture-mounted device 320 includes one or more LEDs 322, a DC power supply 324, and a modulation arrangement 326. The depicted arrangement also includes a JenNet IP6 remote control system (including a logic block 327 and an associated modulator 329), although this is not essential.

The power supply 324 is conventional, and converts fixture AC power (e.g., 120 volts) into a DC voltage suitable for the LED(s) 322. (Although not particularly shown, the same power supply can provide needed voltage(s) to the modulation arrangement 326 and the JenNet system 327.) The modulation arrangement 326 includes a data receiver 332 that receives an input data signal 333, e.g., conveyed to the device by a radio or audio signal, and sensed by an antenna 328 or a microphone 330. The data receiver provides appropriate decoding (e.g., a watermark extraction process, in the case of an audio signal) to provide binary output data. This data is input to a convolutional encoder 334, which provides an output signal to a modulator 336, which varies the DC signal applied to the LED(s) 322 accordingly. (While the modulators 329, 336 are depicted as adders, multipliers or other arrangements can alternatively be used.)

In actual practice, the system 320 typically employs red/green/blue/white LED sources, which are driven with tri-stimulus pulse width modulation (PWM) control signals at a frequency of 1 KHz-30 KHz. In such arrangement, the durations of the driving pulses are lengthened and/or shortened to effect steganographic encoding of the data signal 333. (Typically, the changes to pulse lengths are less than 25%, and may be less than 10%, 5% or 2%. Larger changes are acceptable if both positive and negative changes are made, e.g., corresponding to "1" and "0" outputs from the convolutional encoder, since their time average is typically zero.) The particular modulation percentage depends on the application being served, and can be determined by simple experimentation. (E.g., for a given convolutional encoder, increase the percentage change to the PWM driving signals until unwanted visual effects just begin to appear under the most demanding illumination conditions—such as nighttime, and then reduce the percentage change until these effects are imperceptible.)

In a variant embodiment, the data receiver 332 of FIG. 32 is replaced with a GPS receiver, or other location-sensing module. (A technology more accurate than GPS is taught in U.S. Pat. Nos. 7,876,266 and 7,983,185, and in patent publications 2009313370, 2009233621, and 2009213828). In such arrangement, the light source emits illumination encoded with geolocation data.

In another arrangement, the system 320 does not employ a data receiver 332, but instead is hard-coded with a fixed plural-bit data payload (which may be set, e.g., by a ROM or a dip-switch arrangement). Such a payload can serve as a unique identifier for the system. When a receiving smartphone senses illumination from such system, and decodes the plural-bit identifier, this phone can transmit the identifier to a remote database (e.g., over the internet), which returns associated information (e.g., a house number, a store department name, etc.) for the phone's use.

In still another arrangement, the data to be steganographically conveyed (i.e., at a bit rate sensible by a smartphone) is conveyed over the power-lines. This can be done using known power line communication (PLC) technologies, such as PDSL or BPL. Alternatively, the technology employed by the Greenchip line of devices can be used.

Just as a smartphone can serve as a receiver of LED-based optical communication signals, it can similarly serve as a transmitter of such signals. Most smartphones (and many less capable "feature" phones) include an LED "torch" to illuminate camera-captured scenes. Such an LED can be modulated, using the arrangements detailed above, to convey data optically from the phone. Unlike Bluetooth and other short range communications technologies, such LED communication affords some measure of privacy, since a clear line of site is typically required.

In one particular embodiment, a receiving system (e.g., another smartphone) responds to the LED signals with responsive data. This data response can include information indicating the strength of the received optical signal (e.g., a number corresponding to a signal-to-noise metric). The originating phone can then reduce its LED driving power so as to provide an adequate, but not excessive, received signal strength at the second device. In addition to saving power, such reduction of LED driving current in this fashion further reduces the capability of unintended optical receivers to eavesdrop. (This responsive data sent back to the originating smartphone can be conveyed by wireless, optically, or otherwise.)

Review

To review, a few of the novel arrangements detailed herein may be summarized as follows:

A method that includes receiving, in a device, data representing content (e.g., audio content). An algorithm is applied to the received data to derive identification data therefrom. By reference to the derived identification data, a particular software program is selected for use with the content. This selecting is performed by a processor in the device that is configured to perform such act. The selected software program is then launched. By this arrangement, selection of the particular software program used with the data is based on identification data derived from the data itself.

A further method again involves receiving, in a device, data representing content (e.g., audio content), and applying an algorithm to the received data to derive identification data therefrom. By reference to the derived identification data, a favored software program for use with the content is selected. This selecting is performed by a processor in the device that is configured to perform such act. The favored software program is then indicated to a user. By this arrangement, the favored software program used with the data is selected based on identification data derived from the data itself.

Yet another method involves receiving, in a device, data representing content (e.g., audio content). This content is of a type that can be rendered by first software in the device. In response to an attempt to render the content with this first software, the device indicates that second software should be used instead. In this case, a creator of the content designated the second software as preferred, for that creator's content.

Still another method includes, with a microphone of a device, receiving audio from an ambient environment. An algorithm is applied to audio data representing the received audio to derive identification data therefrom. By reference to the derived identification data, a corresponding fulfillment service is selected to be used for commerce involving the audio. By this arrangement, first received audio leads to selection of a first fulfillment service to be used for commerce involving the first audio, and second, different, received audio leads to selection of a second, different fulfillment service to be used for commerce involving the second audio.

A further method involves identifying content in a user's ambient environment (e.g., audio), the content having been earlier sampled by a user device. Information about the identified content is then published, optionally with user context information. In response to this published information, one or more third party bids is received. A determination is made as to a winning bid, and a third party associated therewith. Software identified with the determined third party is then enabled to present a buying opportunity to the user on the user device.

Yet another method includes receiving a set of digital data, corresponding to received content of a given type (e.g., audio, imagery or video). Identification data corresponding to the received content is generated, by which the received content can be distinguished from other content of the given type. By reference to the identification data, N application program(s) associated with the received content and not associated with all other content of the given type are determined, where N is one or more. Action is then taken with one or more of the determined application program(s).

Another aspect of the technology is a computer readable storage medium having operating system (OS) software stored thereon. The OS software serves to configure a processor to provide OS services to requesting application programs through defined interfaces. These OS services include deriving content identification data from signal data representing visual or auditory information, and publishing same for use by one or more application programs that subscribe to same through a defined interface.

Another aspect of the technology is an apparatus that includes a processing device and a memory. The memory contains operating system (OS) instructions that configure the processing device to provide OS services to requesting application programs through defined interfaces. The apparatus further includes a sensing system for sensing ambient visual and/or sonic stimulus from an environment of the device and for producing content data corresponding thereto. One of the OS services derives content identification data from the produced content data, and publishes same to requesting application programs that subscribe through a defined interface.

Another aspect of the technology is an apparatus that includes a processing device and a memory. The memory contains operating system (OS) instructions that configure the processing device to provide OS services to requesting application programs through defined interfaces. One of these defined interfaces provides a content identification message queue that publishes content identification data corresponding to visual or sonic stimulus processed by the device, to which queue one or more application programs can subscribe.

Another aspect of the technology is a method that includes sensing sonic or visual stimuli from a user's ambient environment for a prolonged period (e.g., more than 15 minutes, an hour, or 6 hours), thereby noting content to which the user has been exposed during the period. By reference to this sensed stimuli, a configured hardware processor is used to generate content identification data corresponding to several different items of content to which the user has been exposed during this period. Then, in the course of a subsequent user interaction with a user interface, the method identifies to the user, by title, plural different items of content noted from the user's environment, and enables the user to select among plural different actions with respect to at least one of the identified items of content.

Another method involves sensing sonic or visual stimuli from a user's ambient environment, thereby noting content to which the user has been exposed. By reference to the sensed stimuli, a configured hardware processor is used to generate content identification data corresponding to at least one such item of content. Two or more different software applications are then primed with information based, at least in part, on such generated content identification data. By this arrangement, when the user next utilizes each of the different software applications, the user will find that it already reflects the user's exposure to the item of content.

A further method involves receiving content data representing audio, image and/or video content using a consumer electronic device, where the content data is received in a file format of a type that the electronic device is capable of rendering to produce a content-related experience, by reason of a first software rendering program earlier installed or otherwise made available for use with the device. By reference to the received content data, one or more software rendering program(s) prescribed by a proprietor of the content data for producing a content-related user experience with the received content data is determined. The method then determines that none of these determined software rendering programs is presently installed or available for use with the device, and consequently refuses to render the received content data on the device, despite the capable first software rendering program. By such arrangement, the consumer electronic device respects the prescription of the proprietor regarding the software rendering program(s) by which a content-related user experience is to be delivered to the user.

Yet another method concerns rendering art using a user's device, where the art has been produced by a proprietor thereof. The art is represented in a data format that can be rendered by several different software programs. The method further includes consulting proprietor-specified metadata, using a programmed processor, to determine a subset of these programs that may be utilized to render the art data, and rendering the art data with one program of this subset. By such arrangement, the proprietor is afforded a measure of control of how the art is rendered.

Another aspect of the technology is an apparatus including a processing device, a computer readable storage medium that stores several software programs for configuring the processing device, and a sensing system for generating data representing ambient visual or sonic content in an environment of the apparatus. At least one of the software programs is stored in the computer readable storage medium as a result of the apparatus sensing certain ambient content from the apparatus environment.

Another aspect of the technology is a portable device (e.g., a smartphone) that includes a processor and a memory, the memory containing operating system software and plural software programs. A first of these programs serves to analyze data representing sonic or visual content to produce corresponding identification data, and publishes results of such analysis to an output. A second of these programs serves to monitor the output of the first program for certain content to which the second program is attuned, and take action when the certain content is noted.

Still another method involves capturing imagery of a subject from a viewing pose, and presenting the captured imagery on a screen of a portable device. Optimality of the viewing pose is assessed by reference to the captured imagery. The method then overlays, on the presentation of captured imagery, an indicia that indicates a result of the assessment. This overlaid indicia changes with changes in the assessed optimality.

A further method involves capturing plural frames of imagery using a portable device, the portable device having an image sensor and a second sensor. A subset of at least two of the captured frames are selected, based on data from the second sensor. These selected frames are then combined. The combination can make use of salient points, and the combined output can be provided to a digital watermark decoder in the portable device.

Another aspect of the technology is a portable device (e.g., a smartphone) that includes a processor, a memory, and plural sensors including at least a camera and a microphone. The device components cooperate to define plural recognition agents, such as an audio fingerprint recognition agent, a barcode recognition agent and an image watermark recognition agent. The agents are configured to read data from and write data to a blackboard data structure of the memory. This blackboard data structure is also configured to receive data from the sensors and to compile queues of stored image data and audio data that the agents process. These elements cooperate under the control of an event controller defined by instructions in the memory.

Yet another method involves determining network relationships between a person and plural objects and, from these network relationships, discerning an object's relative importance to the person. An action is then taken based on the discerned relative importance.

Still another method involves, with a portable device, capturing imagery of a person's hand gestures. The imagery is processed to discern sign language from the gestures, and an action is taken based thereon.

A further method includes defining an information-carrying pattern having first and second spatial frequency portions, and printing this pattern on a substrate. The first portion defines a visible background weave pattern that cues human viewers to the presence of encoded information, and the second portion includes spatial frequencies that are beyond the range of human vision, and conveys at least certain of the encoded information.

Yet another method involves, in a first device, receiving audio or image content data having payload data encoded by digital watermarking. This payload data is decoded, and then at least part is transmitted to a second device by a technique other than digital watermarking.

Still a further method involves, in a home entertainment system, receiving audio or image content, and determining media fingerprint information therefrom. Media fingerprint information is then wirelessly transmitted to a portable device (e.g., smartphone) of a user to whom the content is being rendered by the home entertainment system.

Another method involves, in a retail store, receiving a signal indicating a product interest by a shopper in the store, and then taking an action based on the received signal. This action includes at least one of: entering the shopper in a queue for service, informing the shopper of a wait time for service, providing the shopper information about a retail store staffer who will provide service, and providing the shopper an enticement for waiting for service. (Such enticement may be entertainment content for which a charge would otherwise be assessed.)

A further method involves, by reference to data sensed from a first product displayed in a retail store by a shopper's smartphone, determining whether a second product is compatible with the first product, and then taking an action based on such determination.

Still another method involves capturing imagery from a digitally watermarked object, where the digital watermark includes known reference features. Then, these known reference features are used in estimating a blur kernel by which the captured imagery may be processed to reduce image blur.

Yet another method involves, by reference to information sensed by a user's portable device (e.g., smartphone), determining an interest of the user, and then taking an action based on the determined interest.

Still another method involves displaying an arrangement of text characters on a screen of a portable device from which a user can select; sensing a user's gaze towards a part of the screen to make a text selection; and then changing the arrangement of characters on the screen from which the user can next select.

A further method involves capturing a video sequence of image data using a smartphone camera; identifying a first machine readable symbology in the captured data; storing information related to the first identified symbology; identifying a second machine readable symbology in the captured data; and storing information related to the second identified symbology. By such arrangement the device operates in a streaming mode to collect information related to machine readable symbologies found in the captured video sequence.

Another aspect of the technology is a system including a processor, a memory, one or more sensor sub-systems, and a touchscreen. The system is characterized in that the device is configured to store information from a sensor sub-system in the memory as RDF triples, and the processor is configured to take action based on the stored RDF triples.

Still another aspect of the technology is a method that includes receiving sensor data, representing the sensed information for storage as RDF triples, and then processing the stored RDF triples.

Another aspect of the technology is a device including a camera, a processor, and a memory. The memory stores a set of imagery captured by the camera, and also stores plural RDF triples that make assertions about the set of imagery. The device processor is configured to perform an operation on the stored set of imagery, by reference to one or more of the stored RDF triples.

Another method enables a first computer process to request a service from one or more other computer processes, and includes including posting a request to a data structure, where the request is expressed as an RDF triple.

Yet another method involves receiving audio information at a consumer electronic device, where the audio information was provided by a content distributor, and includes at least first and second audio tracks. In this device, a control signal is received that sets a ratio between the first and second tracks. The audio is then rendered to a consumer in accordance with this ratio. The second audio track includes a noise-like digital watermark signal that conveys auxiliary information.

Another aspect of the technology is a computer readable medium that contains content data which, if rendered by a first device, controls a function of a second device. This content data includes at least first and second tracks of audio information. The first track includes audio for consumer enjoyment, and the second track includes a noise-like digital watermark signal that conveys control data for the second device.

Another aspect of the technology is an apparatus that includes a memory that stores content information, including data corresponding to at least first and second tracks of audio. An audio portion is provided for rendering the content information to an output device (e.g., a speaker). This audio portion includes a control operable by a user to set a level at which the second track should be rendered relative to the first track. The stored data that corresponds to the second track of audio represents a noise-like digital watermark signal for controlling a function of a second apparatus.

Another aspect of the technology is a method that includes receiving a first set of data corresponding to imagery captured by a camera-equipped portable device, where the imagery depicts a subject. Steganographically-encoded digital watermark payload data is decoded from the first set of data. By reference to this payload data, a second set of data is obtained. This second set of data includes salient point data corresponding to the subject.

Another aspect of the technology is a computer readable medium containing software instructions that, if executed by a computing device, cause the computing device to perform operations including: receiving a first set of data corresponding to imagery depicting a subject; decoding steganographically-encoded digital watermark payload data from the first set of data; and by reference to the payload data, obtaining a second set of data. The second set of data includes salient point data corresponding to the subject.

A further aspect of the technology is a method that includes, in a portable device, receiving identification data sensed from a passive chip device associated with an object. By reference to this identification data, a second set of data is obtained. This second set of data includes salient point data corresponding to the object.

Another aspect of the technology is a portable device that includes a memory and a processing portion, disposed in a pocket-sized housing. The memory includes a first portion that stores code data representing plural code-based semantic triples, where each of the triples includes first, second and third codes, one of the codes being a subject code, one being a predicate code, and one being an object code. The memory further includes a second portion that stores literal data associating different text literals with different of the codes. The processing portion further includes a GPU that processes code data in the first portion of the memory, to perform operations on information represented by the text literals in the second portion of the memory.

Another aspect of the technology is a portable device that includes a memory and a processing portion, disposed in a pocket-sized housing. The memory includes a frame buffer portion that stores code data representing plural code-based semantic triples, where each triple includes a subject code, a predicate code, and an object code. The memory further includes a second portion that stores literal data associating different text literals with different of the codes. The processing portion includes a GPU that processes code data in the first portion of the memory, to perform semantic reasoning involving concepts expressed using the text literals in the second portion of the memory.

A further aspect of the technology is a portable device that includes a memory and a processing portion, disposed in a pocket-sized housing. The processing portion is configured by instructions stored in the memory, and includes a GPU. The memory stores code data representing plural code-based semantic triples, each triple including a subject code, a predicate code, and an object code. The instructions configure the processing portion to apply a series of templates to the stored code data, to perform operations based on the triples.

Another aspect of the technology is a method that includes receiving a set of data corresponding to imagery captured by a camera-equipped portable device, where the imagery depicts a subject. Identification data is determined based on the received set of data. By reference to the identification data, a second set of data is obtained, where this second set of data includes plural N-tuples, each including subject, predicate and object elements. These N-tuples are processed, and an action is taken based on such processing.

A further aspect of the technology is a portable device that includes a touch-screen, a memory and a processing portion, disposed in a pocket-sized housing. The memory contains data representing plural code-based semantic triples, where each triple includes a subject code, a predicate code, and an object code. The memory further includes a portion containing text literals that indicate respective textual meanings for different of the codes. The memory also contains software instructions that configure the processing portion to present, on the touch-screen, a user interface that is populated with certain of the text literals, through which a user can define a query of the code-based semantic triples.

Another aspect of the technology is a portable device that includes a touch-screen, a memory and a processing portion, disposed in a pocket-sized housing. The memory is logically organized as plural planes of storage, containing plural data N-tuples, where elements of the N-tuples correspond to text literals. The processing portion includes a GPU configured to operate on the data N-tuples as part of responding to a user query entered via a touchscreen user interface.

Another method involves receiving data corresponding to a user query. A first plane-thresholding test is applied to values stored in one plane of an N-tuple data store, where the data store is logically organized to include N planes of data, storing plural data N-tuples, where N is at least 3. This plane-thresholding test identifies a first subset of the stored data N-tuples that meet a first aspect of the user query.

Still another method involves receiving a first set of data corresponding to imagery captured by a camera-equipped portable device, where the imagery depicts a subject at a first resolution. Identification data is determined based on the first set of data. By reference to this identification data, a second set of data is obtained, where the second set of data corresponds to imagery that also depicts the subject. The second set of data depicts the subject from a different perspective than the first set of data, and may depict the subject at a second resolution higher than the first resolution.

Yet another method involves receiving NFC identification data sensed from an object and, by reference to the identification data, obtaining a set of image data that depicts the object.

A further method concerns transferring application state between first and second devices, each device including a processor and a display screen. The method includes, using a camera in a the first device, sensing imagery presented on a display screen of the second device. Digital watermark data is decoded from the sensed imagery. Based on the decoded digital watermark data, stored data is identified that memorializes an application state of the second processor. This stored data can then be used to initialize the second processor to the application state.

Still another method involves a device having a processor and a display screen. The method includes occasionally storing application state data, and digitally watermarking imagery to encode an identifier therein, where the identifier facilitates access to the stored application state data. This digitally watermarked imagery may then be presented on the display screen.

Yet another method involves, using a camera in a portable device, sensing light (e.g., ambient light). An identifier is decoded from the sensed light, and information is then obtained based on the decoded identifier.

A further method involves generating a signal that encodes the direction and/or velocity of a moving vehicle, and controlling one or more exterior lights on the vehicle (e.g., headlamps) in accordance with such signal.

Another method involves sensing data from an environment illuminated by a lighting fixture, and processing the sensed data to determine information corresponding thereto. Light emitted from the lighting fixture is then encoded in accordance with the determined information.

Still another method involves, with a microphone of a device, receiving audio from a user's ambient environment over a prolonged interval (e.g., at least 15 minutes, an hour, or 6 hours). An algorithm is then applied to data representing the received audio to derive identification data therefrom. By reference to the derived identification data, at least first and second different items of audio content to which the user was exposed during the interval are determined. By reference to these two items of audio content, software is primed for later use by the user. This priming includes receiving first and second items of auxiliary content at the device from one or more remote repositories. The first item of auxiliary content is associated with the first determined item of audio content, and the second item of auxiliary content is associated with the second determined item of audio content. The user can then be presented a listing that identifies the determined first and second items of audio content. In response to a user selection of one of these determined items of audio content as being of interest, an action can be taken in accordance with the primed software, using a corresponding item of auxiliary content. By such arrangement, items of audio content to which the user is exposed are monitored, and associated auxiliary content is received by the device in advance of the user selecting a particular item of audio content as being of interest.

Yet another method involves, with a microphone of a portable device, receiving audio from a user's ambient environment over a prolonged interval. The user's location during this interval is sensed. An algorithm is applied to data representing the received audio to derive identification data therefrom. By reference to the derived identification data, at least first and second different items of audio content to which the user was exposed during the interval are determined. Through a user interface of the portable device, the determined first and second different items of audio content are identified to the user, and a user signal entered through the user interface is received selecting the first item. In response, an identification of the first item of audio content is posted to an online social network, together with data indicating the user's sensed location.

Another aspect of the technology is a system that includes a processor configured by instructions in a memory. These instructions include operating system software. The operating system software provides an audio identification service that receives input audio data, or a pointer to stored audio data, and returns metadata corresponding thereto to an audio identification message queue of the operating system software.

A further method involves frames of imagery depicting a first subject, captured using a camera portion of a mobile phone device, and displayed on a screen of the device. The method includes producing an identifier related to the first subject, by analyzing captured image data. A first tag is displayed on the screen with a first frame of imagery. This first tag is located at a first position on the screen, and is user-selectable to initiate an action associated with the first subject. A visual indicia is presented on the screen that associates the first subject as depicted in the first frame, with the displayed first tag. The method further includes displaying this first tag on the screen with a second frame of imagery that depicts the first subject. The first subject is depicted at different locations within the first and second frames of imagery, yet the first tag is displayed at the same first position on the screen with both the first and second frames of imagery.

Another method involves identifying physical objects depicted in imagery captured by a camera portion of a user's mobile phone, to thereby discern physical object preference information relating to the user. Physical object preference profile data based thereon is then stored in a memory. Electronic media may thereafter be processed, based at least in part on the stored physical object preference profile data.

Yet another method involves, with a camera portion of a portable device, capturing a sequence of imagery. One excerpt of the sequence is analyzed to discern calibration information, where the calibration information includes fleshtone data characterizing color of a person's hand depicted in this excerpt. Other excerpts of the sequence are analyzed to identify American Sign Language handforms depicted in the imagery, by matching captured imagery with stored reference handform data. Words, phonemes and/or letters may then be output to an output device, based on said analysis.

Other Comments

Having described and illustrated the principles of our inventive work with reference to illustrative examples, it will be recognized that the technology is not so limited.

For example, while reference has been made to smartphones, it will be recognized that this technology finds utility with all manner of devices—both portable and fixed. Portable music players, desktop computers, laptop computers, tablet computers, set-top boxes, televisions, netbooks, ultraportables, wearable computers, servers, etc., can all make use of the principles detailed herein.

Particularly contemplated smartphones include the Apple iPhone 4, and smartphones following Google's Android specification (e.g., the Verizon Droid Eris phone, manufactured by HTC Corp., and the Motorola Droid 2 phone). The term "smartphone" (or "cell phone") should be construed to encompass all such devices, even those that are not strictly-speaking cellular, nor telephones.

(Details of the iPhone, including its touch interface, are provided in Apple's published patent application 20080174570.)

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc).

While this specification earlier noted its relation to the assignee's previous patent filings, it bears repeating. These disclosures should be read in concert and construed as a whole. Applicants intend that features and implementation details in each disclosure be combined and used in conjunction with such teachings in the others. Thus, it should be understood that the methods, elements and concepts disclosed in the present application be combined with the methods, elements and concepts detailed in those related applications. While some have been particularly detailed in the present specification, many have not—due to the large number of permutations and combinations. However, implementation of all such combinations is straightforward to the artisan from the provided teachings.

Elements and teachings within the different embodiments disclosed in the present specification are also meant to be exchanged and combined.

The processes and system components detailed in this specification may be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of content signal data may also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Cell phones and other devices according to certain implementations of the present technology can include software modules for performing the different functions and acts.

Known browser software, communications software, and media processing software can be adapted for many of the uses detailed herein.

The service by which content owners ascribe certain attributes and experiences to content (e.g., through invocation of specified software) typically uses software on the user device—either in the OS or as application software. Alternatively, this service can be implemented—in part—using remote resources.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a server at a remote service provider, different tasks can be performed exclusively by one device or the other, or execution can be distributed between the devices. Extraction of fingerprint and watermark data from content is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

(In like fashion, description of data being stored on a particular device is also exemplary; data can be stored anywhere: local device, remote device, in the cloud, distributed, etc.)

In actual practice, data structures used by the present technology may be distributed. For example, different record labels may maintain their own data structures for music in their respective catalogs. A system may need to navigate a series of intermediate data structures (often hierarchical) to locate the one with needed information. (One suitable arrangement is detailed in Digimarc's U.S. Pat. No. 6,947,571.) Commonly accessed information may be cached at servers in the network—much like DNS data—to speed access.

Although reference was made to GPUs, this term is meant to include any device that includes plural hardware cores operable simultaneously. Intel, for example, uses the term "Many Integrated Core," or Intel MIC, to indicate such class of device. Most contemporary GPUs have instruction sets that are optimized for graphics processing. The Apple iPhone 4 device uses a PowerVR SGX 535 GPU (included in a system-on-a-chip configuration, with other devices). Most such devices include, in their instruction sets, instructions that are tailored to work with 3- or 4-plane imagery, to accelerate the building of images in a frame buffer intended for output to a display. For example, many instructions take data triples as input, and provide data triples as output. Other instructions facilitate operating on spatial neighborhoods of data values in stored image frames.

Similarly, while reference has been made to NFC chips, it will be recognized that this encompasses all manner of chips—including those known by other names (e.g., RFID chips) that issue a signal conveying a plural-bit identifier when interrogated by an NFC reader.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated.

While detailed primarily in the context of systems that perform audio capture and processing, corresponding arrangements are equally applicable to systems that capture and process imagery and video, or that capture and process multiple forms of media.

Publish/subscribe functionality can be implemented not just in a device, but across a network. An ad hoc network may be formed among users in a common location, such as in a theatre. Content recognition information generated by one user's smartphone may be published to the ad hoc network, and others in the network can subscribe and take action based thereon.

Apple's Bonjour software can be used in an exemplary implementation of such arrangement. Bonjour is Apple's implementation of Zeroconf—a service discovery protocol. Bonjour locates devices on a local network, and identifies services that each offers, using multicast Domain Name System service records. (This software is built into the Apple Mac OS X operating system, and is also included in the Apple "Remote" application for the iPhone—where it is used to establish connections to iTunes libraries via WiFi.) Bonjour services are implemented at the application level largely using standard TCP/IP calls, rather than in the operating system. Apple has made the source code of the Bonjour multicast DNS responder—the core component of service discovery—available as a Darwin open source project. The project provides source code to build the responder daemon for a wide range of platforms, including Mac OS X, Linux, *BSD, Solaris, and Windows. In addition, Apple provides a user-installable set of services called Bonjour for Windows, as well as Java libraries. Bonjour can also be used in other embodiments of the present technology, involving communications between devices and systems.

(Other software can alternatively, or additionally, be used to exchange data between devices. Examples include Universal Plug and Play (UPnP) and its successor Devices Profile for Web Services (DPWS). These are other protocols implementing zero configuration networking services, through which devices can connect, identify themselves, advertise available capabilities to other devices, share content, etc. Other implementations may use object request brokers, such as CORBA (aka IBM WebSphere).)

Technology for encoding/decoding watermarks is detailed, e.g., in Digimarc's patent documents U.S. Pat. Nos. 6,614,914, 6,590,996, 6,122,403, and 20100150434, and in pending application Ser. No. 12/774,512; and in Nielsen's U.S. Pat. Nos. 6,968,564 and 7,006,555.

Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Auditude), and U.S. Pat. Nos. 6,990,453 and 7,359,889 (both Shazam). Examples of image/video fingerprinting are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC).

To provide a comprehensive disclosure, while complying with the statutory requirement of conciseness, applicants incorporate-by-reference the patent applications and other documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

I claim:

1. In a lighting fixture comprising:
   a connection to a power line;
   at least one LED light emitter to illuminate an environment; and
   a control unit to receive a first signal and vary intensity of light output by the light emitter in response to the first signal;
   an improvement wherein:
   the first signal is a digital control signal received over the power line, and the fixture also includes:
   a content sensor for capturing audio or image information;
   a data processing unit coupled to the sensor to generate content identification information based on the captured audio or image information, said content identification information being different than the captured information; and
   a modulator to encode light output by the light emitter with a second signal, where the second signal is based on the content identification information;
   wherein the fixture is adapted to vary light output by the emitter in accordance with both the first and second signals.

2. The lighting fixture of claim 1 in which the LED light emitter comprises plural differently-colored LED, and the modulator is adapted to produce plural different pulse-width-modulated control signals, for respectively driving said plural differently-colored LED sources.

3. The fixture of claim 1 in which the modulator is adapted to vary chrominance of light emitted by the light emitter in accordance with the second signal, wherein the fixture is adapted to vary both the intensity and chrominance of the light output by the emitter, based on said first and second signals.

4. The fixture of claim 1 in which the content sensor comprises an image sensor.

5. The fixture of claim 4 in which the processing unit comprises a facial recognizing unit operative on data from the image sensor, and the second signal conveys data identifying a person recognized by said facial recognizing unit.

6. The fixture of claim 1 in which the modulator includes a convolutional or trellis encoder, to provide robustness against data errors.

7. A system that includes the lighting fixture of claim 1, and that further includes a camera-equipped smartphone adapted to decode the second signal from light data received by the camera of said smartphone.

8. The lighting fixture of claim 1 in which the data processing unit comprises an audio watermark decoder.

9. A lighting fixture for coupling to a power line, comprising:
- a light emitter, including one or more light sources;
- first control means for varying intensity of light output by the light emitter, in response to first data received over the power line;
- a sensor for sensing information from an environment of the fixture;
- processing means coupled to the sensor, for generating second data based on said information sensed from the environment of the fixture; and
- modulator means for encoding the second data in light output by the light emitter;
- wherein the fixture is adapted to vary the light output by the light emitter in accordance with both the first and second data.

10. The lighting fixture of claim 9 in which the processing means comprises an audio watermark decoder.

11. A method of operating a lighting fixture that is powered from a power line, comprising the acts:
- extracting first digital data from the power line;
- varying intensity of light output by the lighting fixture in response to said first data;
- capturing audio or image content information;
- using a processor configured by software instructions in a memory to derive second data from the captured content information; and
- modulating the light output by the lighting fixture with the second data;
- wherein the light output from the lighting fixture varies in accordance with both the first and second data.

12. The method of claim 1 that includes using said processor to derive second data by detecting audio watermark data from the captured content information.

\* \* \* \* \*